(12) United States Patent
Ohsawa

(10) Patent No.: US 8,285,275 B2
(45) Date of Patent: Oct. 9, 2012

(54) COMMUNICATION TERMINAL DEVICE AND COMMUNICATION METHOD

(75) Inventor: Hiroshi Ohsawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 12/866,253

(22) PCT Filed: Feb. 2, 2009

(86) PCT No.: PCT/JP2009/051718
§ 371 (c)(1),
(2), (4) Date: Aug. 5, 2010

(87) PCT Pub. No.: WO2009/099033
PCT Pub. Date: Aug. 13, 2009

(65) Prior Publication Data
US 2010/0317338 A1 Dec. 16, 2010

(30) Foreign Application Priority Data

Feb. 6, 2008 (JP) .................... 2008-025993
Feb. 8, 2008 (JP) .................... 2008-028442

(51) Int. Cl.
*G06F 15/16* (2006.01)

(52) U.S. Cl. ................... 455/422.1; 455/424

(58) Field of Classification Search .............. 455/422.1, 455/424, 435.1, 450; 370/331, 335, 338
See application file for complete search history.

(56) References Cited

U.S. PATENT DOCUMENTS

2005/0085258 A1* 4/2005 Ishii et al. ................ 455/552.1

FOREIGN PATENT DOCUMENTS

| JP | 2003-124872 A | 4/2003 |
| JP | 2003-309647 A | 10/2003 |
| JP | 2004-363700 A | 12/2004 |
| WO | WO 2007/015067 A2 | 2/2007 |

* cited by examiner

*Primary Examiner* — Sam Bhattacharya
(74) *Attorney, Agent, or Firm* — Birch, Stewart, Kolasch & Birch, LLP

(57) ABSTRACT

It is considered that a user selects a communication channel in accordance with a communication object when performing communication via a second base station (femto cell base station). Accordingly, it is desirable that a communication terminal device which can perform communication via a second base station have a function for selecting a communication path. Provided is a communication terminal device which can be used for communication via a second base station by selecting and transmitting request information for using a mobile telephone network connection with an Internet service.

24 Claims, 44 Drawing Sheets

Fig.9

| Destination address | Communication path to be used |
|---|---|
| https://keitaisite-x.com/keitai.htm l | Mobile telephone network connection |
| https://iwebsite-y.com/iweb.html | Internet service etc. |
| https://jweb-jkeitaisite.com/jj.html | Mobile telephone network connection |
| ⋮ | ⋮ |

Fig.13

|  | Number of usages of communication path ||
|---|---|---|
| Destination address | Internet service etc. | Mobile telephone network connection |
| https://keitaisite-x.com/keitai.html | 10 | 105 |
| https://iwebsite-y.com/iweb.html | 15 | 0 |
| https://jweb-jkeitaisite.com/jj.html | 3 | 35 |
| ⋮ | ⋮ | ⋮ |

COMMUNICATION TERMINAL DEVICE AND COMMUNICATION METHOD

FIELD OF THE INVENTION

The present invention relates to a communication terminal, in which connection to the internet service etc. and connection to the mobile telephone network are appropriately switched, and are used upon communication via the second base station (femtocell).

BACKGROUND ART

Generally, a macro base station (macrocell base station) of a communication terminal is placed on a tower having a height of several tens of meters or on the roof of a building or structure. A communication area covered by the macro base station is called as a 'macrocell', and the base station configures the mobile telephone network. However, recently, different from the conventional base station, a base station for communication terminal covering a narrow area is proposed. That is a base station for communication terminal (femtocell base station), which can be installed in the user's house. The communication area covered by the femtocell base station is called as 'femtocell', this base station is connectable with the mobile telephone network via the internet protocol network. By utilizing this femtocell base station, it is expected that communication between the communication terminals is easily established inside a building, and communication speed can be improved comparing with the outside base station shared by a plurality of users. Moreover, by installing the femtocell base station, it is possible to solve the traffic problems of increasing voice and data communication without enhancement of existing macrocell base station. However, as described below, this femtocell base station requires a new communication method.

Patent Reference 1: Japanese Unexamined Patent Application Publication No. 2003-124872

DISCLOSURE OF THE INVENTION

Problems that the Invention Tries to Solve

FIG. 1 is a schematic diagram of communication via a femtocell base station (second base station). As shown in FIG. 1, in the communication via the femtocell (second base station) and a modem (IP connection device), two different communication paths exist. As the first communication path, the communication path 1 provided by the internet service provider (ISP) etc. exists. This communication path is expected to be used when downloading the content data from the communication destination on the internet, or when the communication destination is an IP phone. As the second communication path, the communication path 2, which is connected to the mobile switching station via a gateway, exists. This communication path is used, for example, when the communication destination is a mobile phone, a fixed-line phone, or information service for mobile phone. Therefore, the user, who uses the femtocell base station, selects the communication path depending on a use of communication or a purpose of communication. Therefore, the communication terminal, which communicates via the femtocell base station (second base station), has a function of selecting a different communication path, enables effective communication.

Means for Solving the Problems

In order to solve the above deficiencies, the communication terminal of the present invention enables transmission of request information to use the internet service etc. or the mobile telephone network connection when communicating via the second base station.

Effects of the Invention

According to the communication terminal of the present invention, the user can select the communication path when communicating via the second base station, thereby providing a communication method matching the user's needs.

BRIEF DESCRIPTION OF THE DRAWINGS

FIG. 9 is a diagram showing a table stored in the communication terminal of the third embodiment.

FIG. 13 is a diagram showing an example of a history stored in the communication terminal of the fourth embodiment.

DESCRIPTION OF REFERENCE NUMERALS

0200 Communication terminal
0201 Communication unit
0202 Reception unit for communication establishment request
0203 Output unit for request information for internet service etc.
0204 Output unit for request information for mobile telephone network connection

DETAILED DESCRIPTION OF THE INVENTION

Hereinbelow, embodiments of the present invention will be described. Relations between the embodiments and claims are as follows. The first embodiment will mainly describe Claims 1 and 14. The second embodiment will mainly describe Claim 2. The third embodiment will mainly describe Claim 3. The fourth embodiment will mainly describe Claim 4. The fifth embodiment will mainly describe Claim 5. The sixth embodiment will mainly describe Claims 6 and 15. The seventh embodiment will mainly describe Claim 7. The eighth embodiment will mainly describe Claim 8. The ninth embodiment will mainly describe Claim 9. The tenth embodiment will mainly describe Claim 10. The eleventh embodiment will mainly describe Claim 11. The twelfth embodiment will mainly describe Claim 12. The present invention is not to be limited to the above embodiments and able to be embodied in various forms without departing from the scope thereof.

First Embodiment

Concept of First Embodiment

A communication terminal of a first embodiment has a function of transmitting request information to use the internet service etc. or the mobile telephone network connection upon communication via the second base station. In the communication via the second base station, the communication path connected to the communication destination using the internet service provider (ISP) etc. and the communication path, connected to the communication destination using the mobile telephone network exist. Here, the user selects the communication path depending on a use of communication or a purpose of communication. The communication terminal of the present invention enables the user to select the communication path when communicating via the second base station.

<Configuration of First Embodiment>

Figure 1:
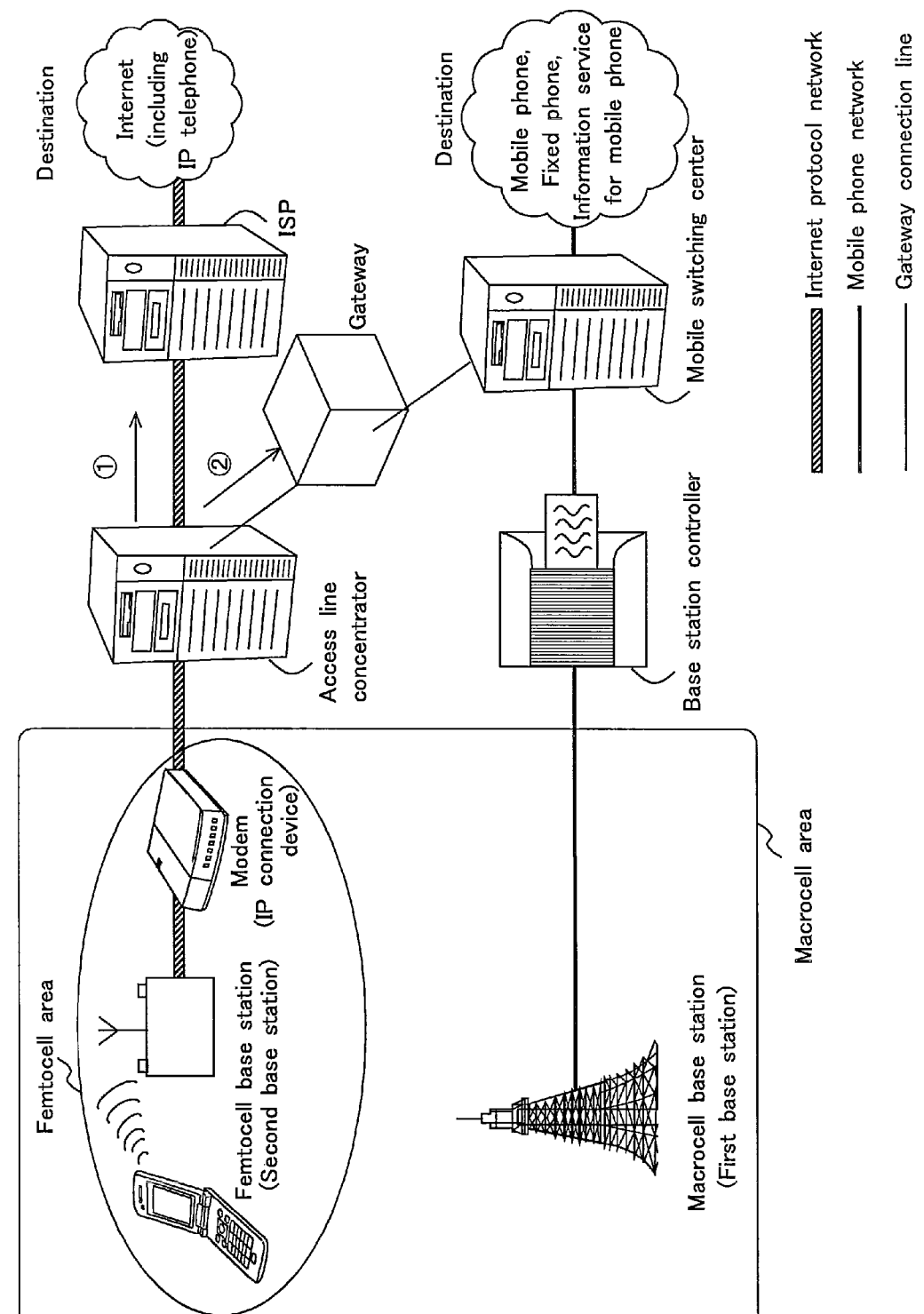
FIG. 1 is a schematic diagram of communication via a femtocell base station (second base station).
Figure 2:
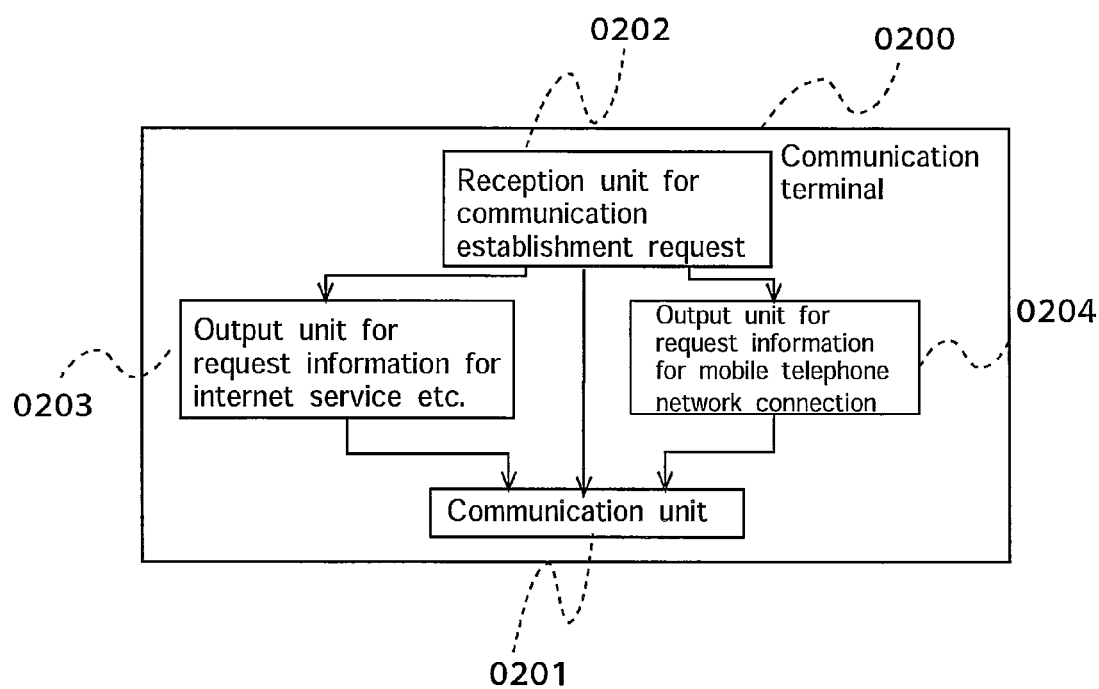
FIG. 2 is a functional block diagram of a communication terminal of the first embodiment.

FIG. 2 is a functional block diagram of the communication terminal of the first embodiment. The respective units of the present invention can be configured by hardware, software, or both hardware and software. For example, in the case of using a computer, the respective units are implemented by the hardware configured by a CPU, a memory, a bus, an interface, and other peripheral devices etc., and by the software operable on the hardware. Concretely speaking, by sequentially carrying out programs in the memory, the data in the memory and the data inputted via the interface are processed, stored, and outputted etc., thereby implementing functions of the respective units.

In FIG. 2, a 'communication terminal' 0200 of the first embodiment comprises, a 'communication unit' 0201, a 'reception unit for communication establishment request' 0202, an 'output unit for request information for internet service etc.' 0203, and an 'output unit for request information for mobile telephone network connection' 0204. Moreover, the present invention can be implemented not only as an apparatus but also as a method (the same applies throughout the entire specification).

The 'communication unit' 0201 is configured to communicate with a first base station configuring a mobile telephone network, and communicating with a second base station connectable to the mobile telephone network.

Here, the communication area (femtocell) for the communication terminal covered by the second base station (femtocell base station) is an extremely small area having a radius of several tens of meters. Meanwhile, the communication area (macrocell etc.) for the communication terminal covered by the first base station (macrocell base station etc.) is a comparatively large area having a radius of several hundreds of meters or even dozens of kilometers. Here, the 'macrocell etc.' means a communication area such as macrocell, microcell, nanocell, or picocell, which is larger than the femtocell. Therefore, the second base station can secure the communication in a narrow area that is not covered by the first base station. Note that, in the communication terminal, the communication between the first and second base stations can be carried out by utilizing the same hardware and software, and it is possible to determine the base station, with which the communication is done by using ID etc. included in the communication information.

The 'reception unit for communication establishment request' is configured to receive communication establishment information. Here, the 'communication establishment information' is information to establish the communication. Specifically, examples of the information include a URL address of the communication destination, and information to specify the communication path (e.g., IP address and domain name of internet service provider or gateway). As an input method for the communication establishment information, it is possible for the user to directly input the above information, or to select a communication destination or a communication path from choices displayed on a display screen etc.

Moreover, when there are a plurality of available base stations upon communication (when the first and second base station are available), for example, by specifying the base station code in the communication establishment information, it is possible to specify the base station to be used. Moreover, upon the communication via the second base station (femtocell base station), for example, by specifying the communication path code in the communication establishment information, it is possible to specify the 'communication path using the internet service etc.' or the 'communication path using the mobile telephone network'. Note that, when the communication path is automatically determined (e.g., the second, third, or fifth embodiment), it is not always essential to specify the communication path.

The 'output unit for request information for internet service etc,' is configured to output request information for internet service etc, the request information is to use the internet service etc. as a communication path via the second base station. Here, examples of the 'internet service etc' include internet connection service and IP telephone connection service by an internet service provider etc. Moreover, the outputted request information is transmitted to a communication information processing circuit according to a predetermined mobile phone format and a predetermined communication process, and is transmitted from an antenna to the second base station as a communication wave.

Moreover, the 'output unit for request information for mobile telephone network connection' is configured to output request information for a mobile telephone network, the request information is to use the mobile telephone network as a communication path via the second base station. Here, the 'connecting to mobile telephone network' means connection from the internet protocol network to the mobile telephone network, and is carried out via the gateway etc.

<Concrete Configuration of First Embodiment>

Figure 3:
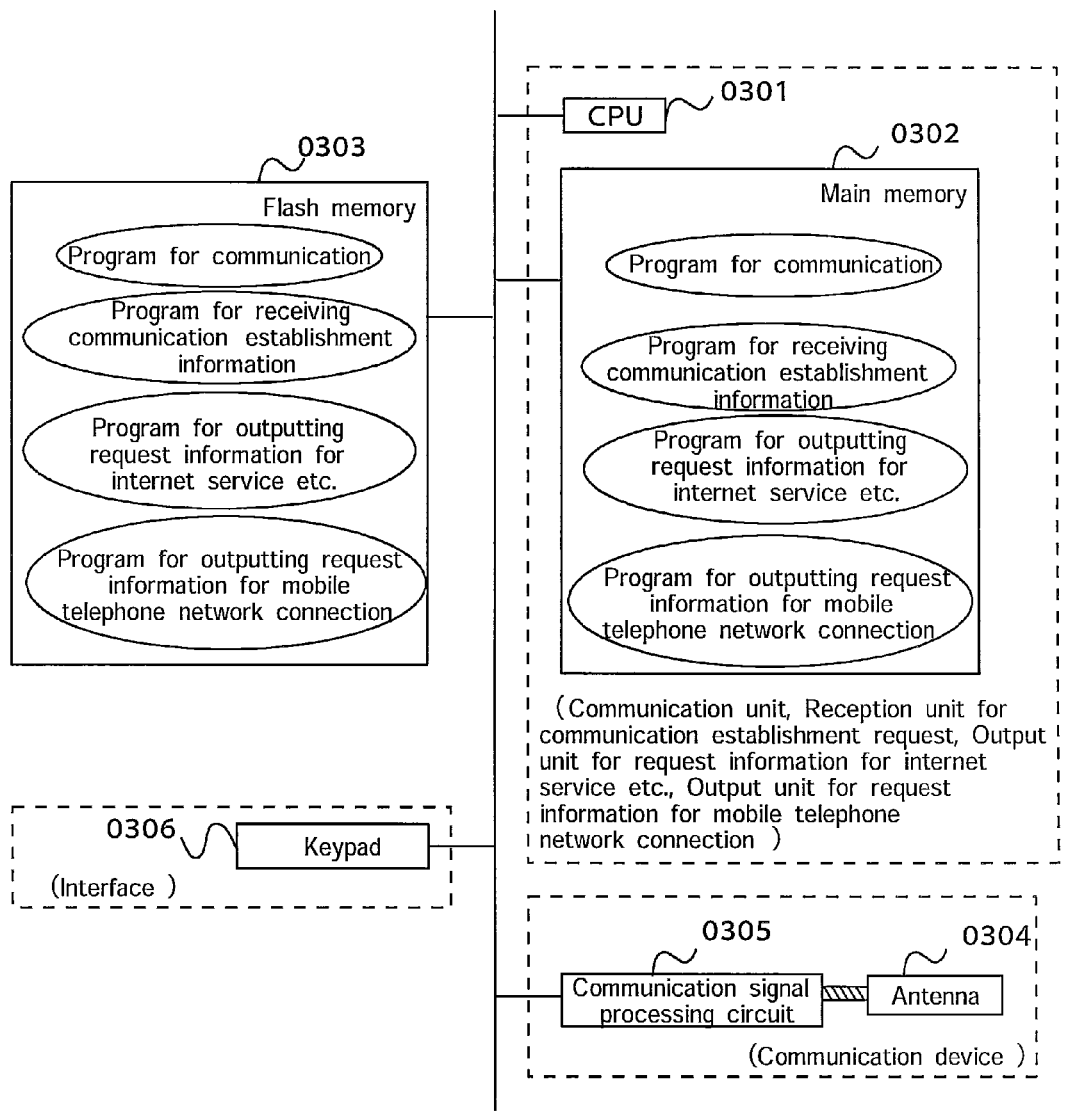
FIG. 3 is a diagram showing a hardware configuration of the communication terminal of the first embodiment.

Subsequently, the respective hardware configurations of the communication terminal of the first embodiment will be described. FIG. 3 is a schematic diagram showing an example of a hardware configuration of the communication terminal of the first embodiment. With reference to this diagram, the respective hardware configurations of the communication terminal of the first embodiment will be described.

As shown in FIG. 3, the communication terminal comprise a 'CPU' 0301 and a 'main memory' 0302 as the communication unit, the reception unit for communication establishment request, the output unit for request information for internet service etc. and the output unit for request information for mobile telephone network connection. Moreover, the communication terminal comprises a 'flash memory' 0303 for storing program etc. Moreover, as communication devices, an 'antenna' 0304 and a 'communication information processing circuit' 0305 are comprised. Moreover, as an interface for receiving input of the communication establishment information, a 'keypad' 0306 is comprised. These are mutually connected through a system bus, thereby carrying out transmission/reception and processing of the information. Note that, the 'flash memory' and the 'main memory' may be configured by the same component.

The flash memory carries out nonvolatile storage of various programs executed by the CPU. The main memory provides work area used upon execution of the programs by the CPU. In addition, a plurality of memory addresses are assigned to the main memory and the storage respectively, so that the program executed by the CPU specifies the memory address and accesses thereto, thereby mutually exchanging data and carrying out processing. Moreover, in the description below, although the program is preliminarily developed and resident in the work area of the main memory, it is possible to call the program from the flash memory as necessary.

When receiving the input of the communication establishment information via the interface, a program for receiving communication establishment request stores the input information at a predetermined address in the main memory, and causes the CPU to execute a processing for determination as to which of the communications, the communication via the first base station or the communication via the second base station, is carried out. Specifically, the processing for determining from the input information that the base station code to be used is of the first base station or of the second base station is executed. Here, when the communication via the second base station is used, the program for receiving communication establishment request causes the CPU to execute a processing for determination from the input information as to which of the communication paths, the communication path of the internet service etc. or the communication path of the mobile telephone network, is used. Specifically, the IP address indicating the respective communication paths, stored at the predetermined address in the flash memory, is stored at the predetermined address in the main memory, so that it is determined which IP address is identical with the IP address indicating the communication path to be used. Note that, when the information such as the IP address indicating the communication path is installed in the second base station etc, the communication terminal may acquire the information from the received information and use the information.

Here, a program for communication causes the CPU to execute a processing for generating a communication instruction to carry out a predetermined communication, thereby transmitting the instruction to the communication information processing circuit. The communication information processing circuit carries out transmission of the predetermined communication information from the antenna.

Moreover, when acquiring the input information indicating the communication using the internet service etc. as the communication path via the second base station, a program for outputting request information for internet service etc. causes the CPU to execute a processing for specifying the communication path. Specifically, a processing for including the IP address indicating the communication path to be used in the communication instruction generated by the program for communication is executed. Moreover, when acquiring the input information indicating the communication using the mobile telephone network connection as the communication path via the second base station, a program for outputting request information for mobile telephone network connection executes a processing for including the IP address indicating the communication path to be used in the communication instruction generated by the program for communication.

<Processing Flow of First Embodiment>

Figure 4:
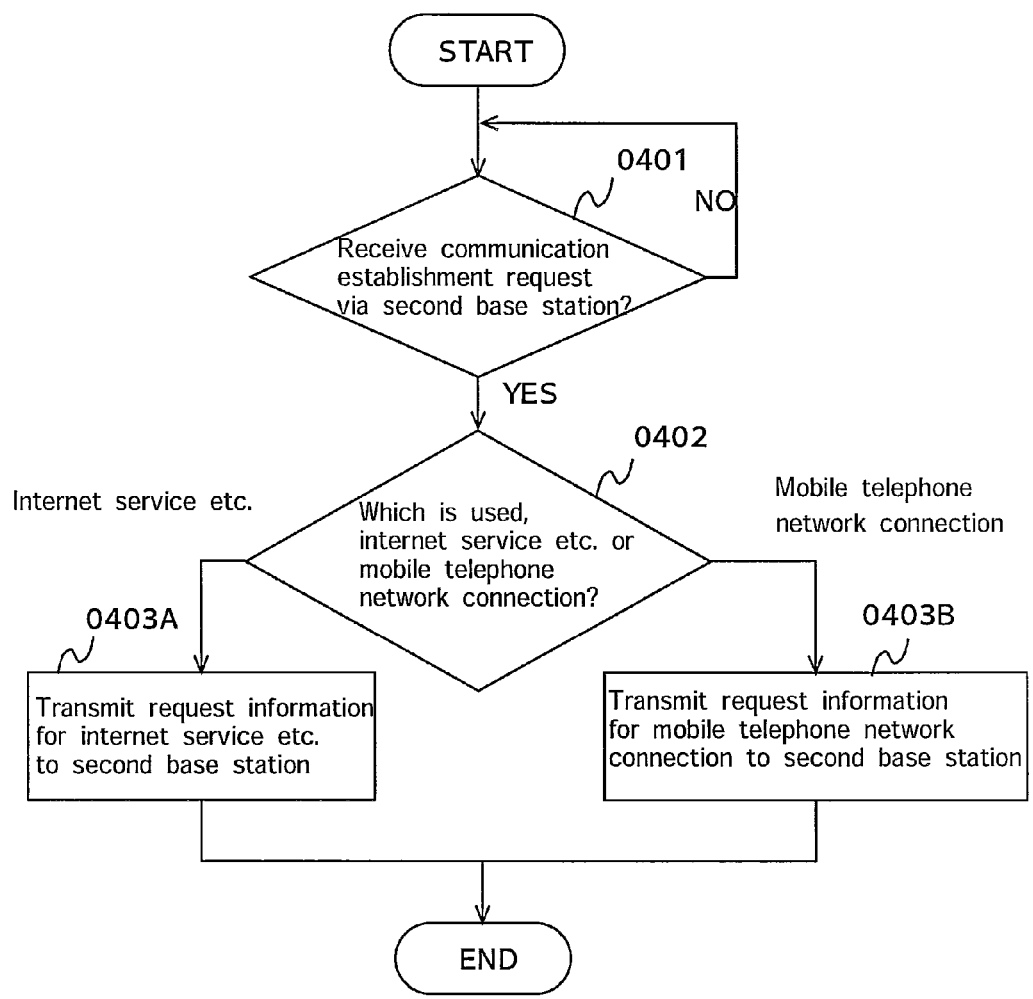
FIG. 4 is a flowchart of process in the communication terminal of the first embodiment.

FIG. 4 is a flowchart showing processes in the communication terminal of the first embodiment. The processes in FIG. 4 include the following steps. At the outset, in step S0401, it is determined whether the communication establishment request via the second base station has been received. Here, if it is determined that the communication establishment request has been received, step S0402 is carried out. If it is determined that the communication establishment request has not been received, the processing stays in a standby state.

In step S0402, it is determined which of the communication paths, the communication path of the internet service etc. or the communication path of the mobile telephone network, is used upon the communication via the second base station. Here, if it is determined that the internet service etc. is used, step S0403A is carried out. If it is determined that the mobile telephone network is used, step S0403B is carried out. In step S0403A, the request information to connect to the communication destination using the internet service etc. is transmitted to the second base station. This processing is mainly carried out by the output unit for request information for internet service etc. and the communication unit. In step S0403B, the request information to connect to the communication destination using the mobile telephone network is transmitted to the second base station. This processing is mainly carried out by the output unit for request information for mobile telephone network connection and the communication unit.

The above processes can be executed by the program to cause a computer to execute, and the program can be recorded in a recording medium readable by the computer (the same applies to the entire specification).

<Brief Description of Effects of First Embodiment>

As described above, according to the communication terminal of the first embodiment, it is possible to select the communication path upon the communication via the second base station, thereby providing a communication method matching the user's needs.

Second Embodiment

Concept of Second Embodiment

A communication terminal of a second embodiment is basically the same as that of the first embodiment, and has functions of selecting and transmitting request information to use the internet service etc. or the mobile telephone network upon communication via the second base station. Moreover, the communication terminal of the second embodiment carries out control such that the mobile telephone network is used by default when the second base station is available. Therefore, upon communication via the second base station, the user is required to select the communication path only when the selection is necessary, thereby reducing the operational load on the user.

<Configuration of Second Embodiment>

Figure 5:
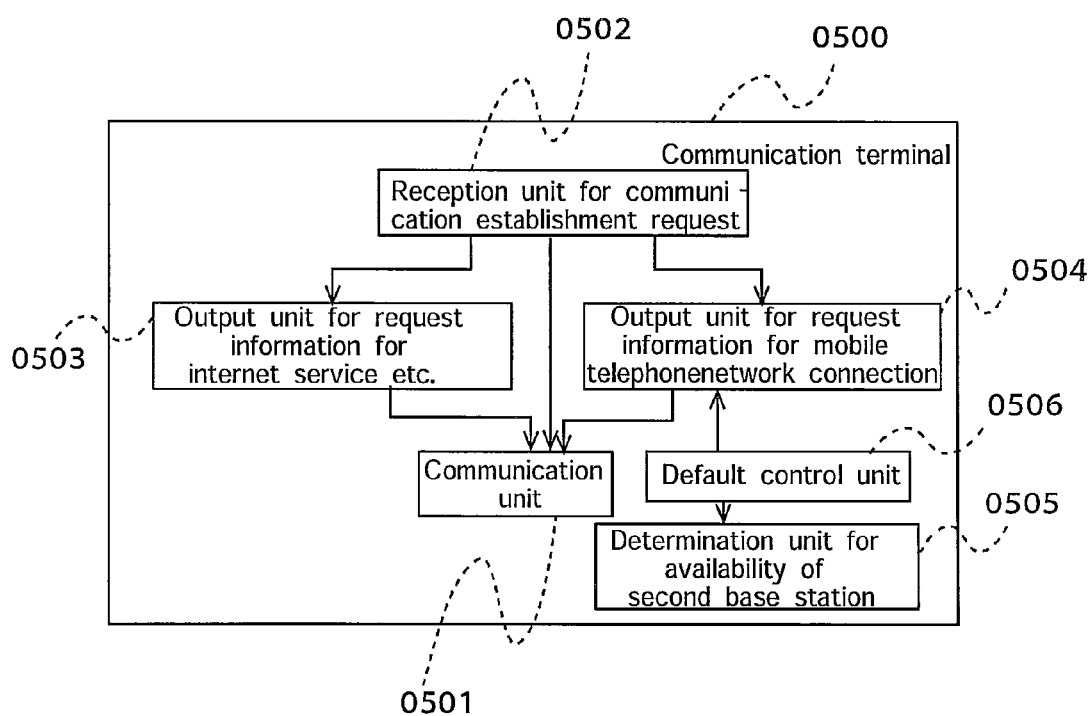
FIG. 5 is a functional block diagram of a communication terminal of a second embodiment.

FIG. 5 is a functional block diagram of a communication terminal of a second embodiment. In FIG. 5, a 'communication terminal' 0500 of the second embodiment comprises, a 'communication unit' 0501, a 'reception unit for communication establishment request' 0502, an 'output unit for request information for internet service etc.' 0503, an 'output unit for request information for mobile telephone network connection' 0504, a 'determination unit for availability of second base station' 0505, and a 'default control unit' 0506. The configuration is basically the same as that of the first embodiment, so that descriptions of the determination unit for availability of second base station and the default control unit as differences are provided hereinbelow.

The 'determination unit for availability of second base station' is configured to determine whether the second base station is available. In the determination method for the availability of the second base station, for example, an intensity of the communication information from the second base station is acquired in the communication information processing circuit of the communication terminal, and if the intensity of the communication information is more than or equal to a predetermined threshold, the second base station is available.

In another method, based on the information of error rate included in the communication information from the second base station, if the error rate is less than or equal to a predetermined threshold, the second base station is available.

The 'default control unit' is configured to carry out control such that the request information for mobile telephone network connection is outputted by default upon communication via the second base station when a determination result by the determination unit for availability of second base station indicates that the second base station is available.

Therefore, upon the communication via the second base station, the communication using the mobile telephone network is carried out by default. Moreover, when acquiring information of an explicit instruction to select the communication path using the internet service etc. from the user, the communication may be carried out in accordance with the instruction.

<Concrete Configuration of Second Embodiment>

Figure 6:
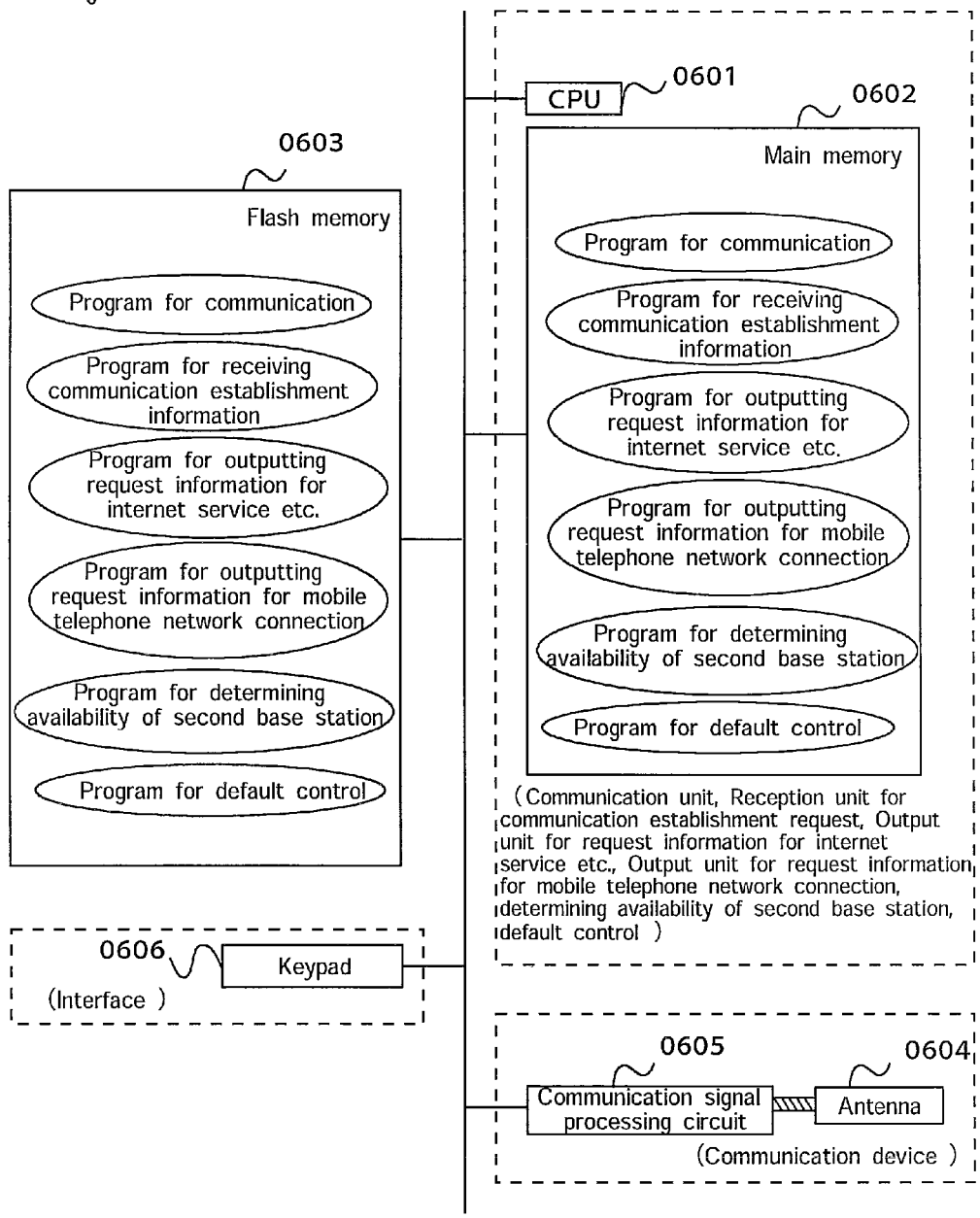
FIG. 6 is a diagram showing a hardware configuration of the communication terminal of the second embodiment.

FIG. 6 is a schematic diagram showing an example of a hardware configuration of the communication terminal of the second embodiment. The configuration is basically the same as the hardware configuration of the apparatus of the first embodiment described with reference to FIG. 3. However, in the apparatus of the second embodiment, a 'CPU' 0601 and a 'main memory' 0602 have functions of the determination unit for availability of second base station and the default control unit.

A program for determining availability of second base station acquires the intensity of the communication information from the second base station from the communication information processing circuit. The program stores the information at a predetermined address in the main memory, and causes the CPU to execute a processing for determination whether the information intensity is more than a predetermined threshold. If the information intensity is more than the predetermined threshold, a result indicating that the second base station is available is stored at a predetermined address in the main memory.

A program for default control causes the CPU to execute a processing for activating a program for outputting request information for mobile telephone network connection upon the communication via the second base station when the second base station is available. Specifically, the program for connecting to mobile telephone network is called from the communication program, thereby controlling such that the IP address indicating the communication path for connecting to the mobile telephone network is included in the communication instruction.

<Processing Flow of Second Embodiment>

Figure 7:
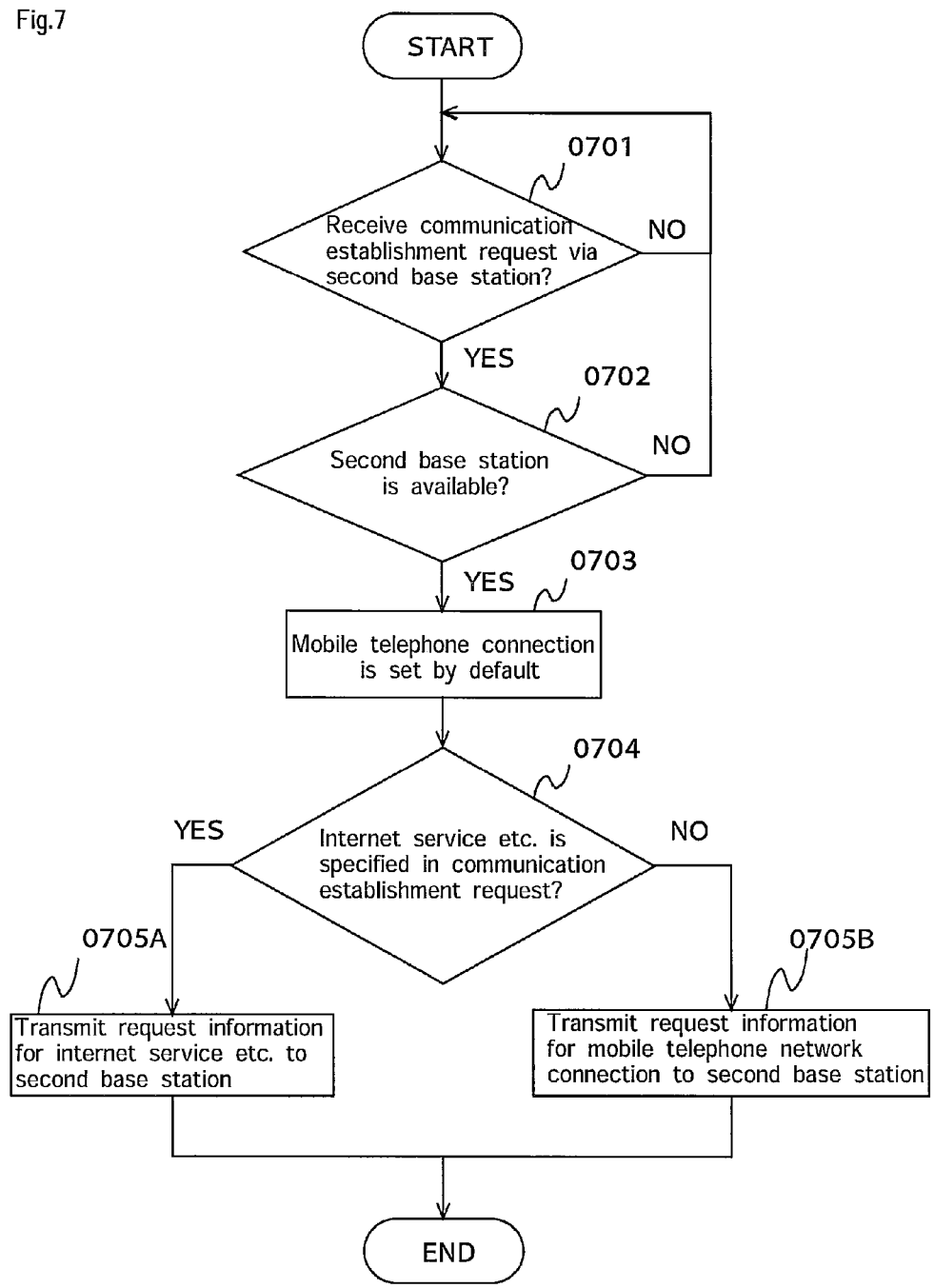
FIG. 7 is a flowchart of process in the communication terminal of the second embodiment.

FIG. 7 is a flowchart showing processes in the communication terminal of the second embodiment. The processes in FIG. 4 include the following steps. At the outset, in step S0701, it is determined whether the communication establishment request via the second base station has been received. Here, if it is determined that the communication establishment request has been received, step S0702 is carried out. If it is determined that the communication establishment request has not been received, the processing stays in a standby state. This process is mainly carried out by the reception unit for communication establishment request. In step S0702, it is determined whether the second base station is available. Here, if it is determined that the second base station is available, step S0703 is carried out. If it is determined that the second base station is not available, the processing returns to step S0701. This process is mainly carried out by the determination unit for availability of second base station. In step S0703, the control is carried out such that the request information for mobile telephone network connection is outputted by default upon the communication via the second base station. This process is mainly carried out by the default control unit. In step S0704, it is determined whether the internet service etc. is specified as the communication path in the communication establishment request. If it is determined that the internet service etc. is specified, step S0705A is carried out. If it is determined that the internet service etc. is not specified, step S0705B is carried out. In the step S0705A, the request information to connect to the communication destination using the internet service etc. is transmitted to the second base station. This processing is mainly carried out by the output unit for request information for internet service etc. and the communication unit. In step S0705B, the request information to connect to the communication destination using the mobile telephone network is transmitted to the second base station. This processing is mainly carried out by the output unit for request information for mobile telephone network connection and the communication unit.

<Brief Description of Effects of Second Embodiment>

As described above, according to the communication terminal of the second embodiment, it is possible to select the communication path upon the communication via the second base station, thereby providing a communication method matching the user's needs. Moreover, upon communication via the second base station, the user is required to select the communication path only when the selection is necessary, thereby reducing the operational load on the user.

Third Embodiment

Concept of Third Embodiment

A communication terminal of a third embodiment is basically the same as that of the first embodiment, and has functions of selecting and transmitting request information to use the internet service etc. or the mobile telephone network upon communication via the third base station. Moreover, in the communication terminal of the third embodiment, upon the communication via the second base station, the communication path is selected based on information, in which a destination address for specifying a communication destination and the communication path are correlated, thereby reducing the operational load on the user.

<Configuration of Third Embodiment>

Figure 8:
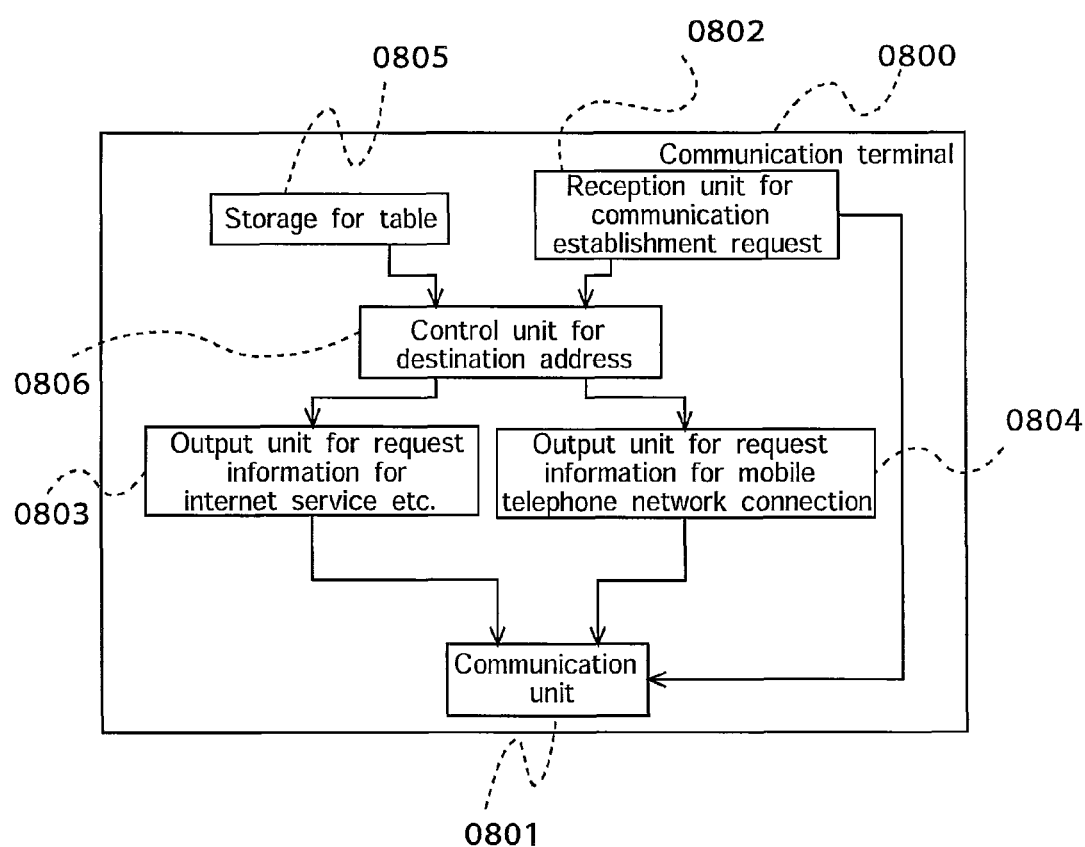
FIG. 8 is a functional block diagram of a communication terminal of a third embodiment.

FIG. 8 is a functional block diagram of a communication terminal of a third embodiment. In FIG. 8, a 'communication terminal' 0800 of the third embodiment comprises, a 'communication unit' 0801, a 'reception unit for communication establishment request' 0802, an 'output unit for request information for internet service etc.' 0803, an 'output unit for request information for mobile telephone network connection' 0804, a 'storage for table' 0805, and a 'control unit for destination address' 0806. The configuration is basically the same as that of the first embodiment, so that descriptions of the storage for table and the control unit for destination address as differences are provided hereinbelow.

The 'storage for table' is configured to store a table for determination as to which is used, the internet service etc. or the mobile telephone network. Here, the destination address corresponds to letters or symbols etc. for specifying a communication destination. Specifically, examples of the destination address include URL, IP address, or domain name, and for example, can be acquired from the communication establishment information. When the communication with the destination address is possible only by the communication path using the internet service etc., or when the communication path for the destination is always fixed, it is not appropriate that the communication path is selected by the user. In such cases, if it is possible to automatically determine the communication path for use by preliminarily correlating the destination address with the communication path, the operational load on the user can be reduced. As the information of the table, for example, information in FIG. 9 is stored. As shown in FIG. 9, it is possible to make one-to-one correspondence between the URL indicating the destination address and the information of communication path to be used, and to store them. Note that the information of the table stored in the storage for table may be edited by the user through an interface such as a keypad.

The 'control unit for destination address' is configured to carry out control as to which of the request information is outputted, the request information for internet service etc. or the request information for mobile telephone network connection, based on the destination address and on the table stored in the storage for table upon the communication via the second base station. Explained using FIG. 9, when the destination address is 'https://keitaisite-x.com/keitai.html', the request information for mobile telephone network connection is outputted for carrying out the mobile telephone network connection.

<Concrete Configuration of Third Embodiment>

Figure 10:
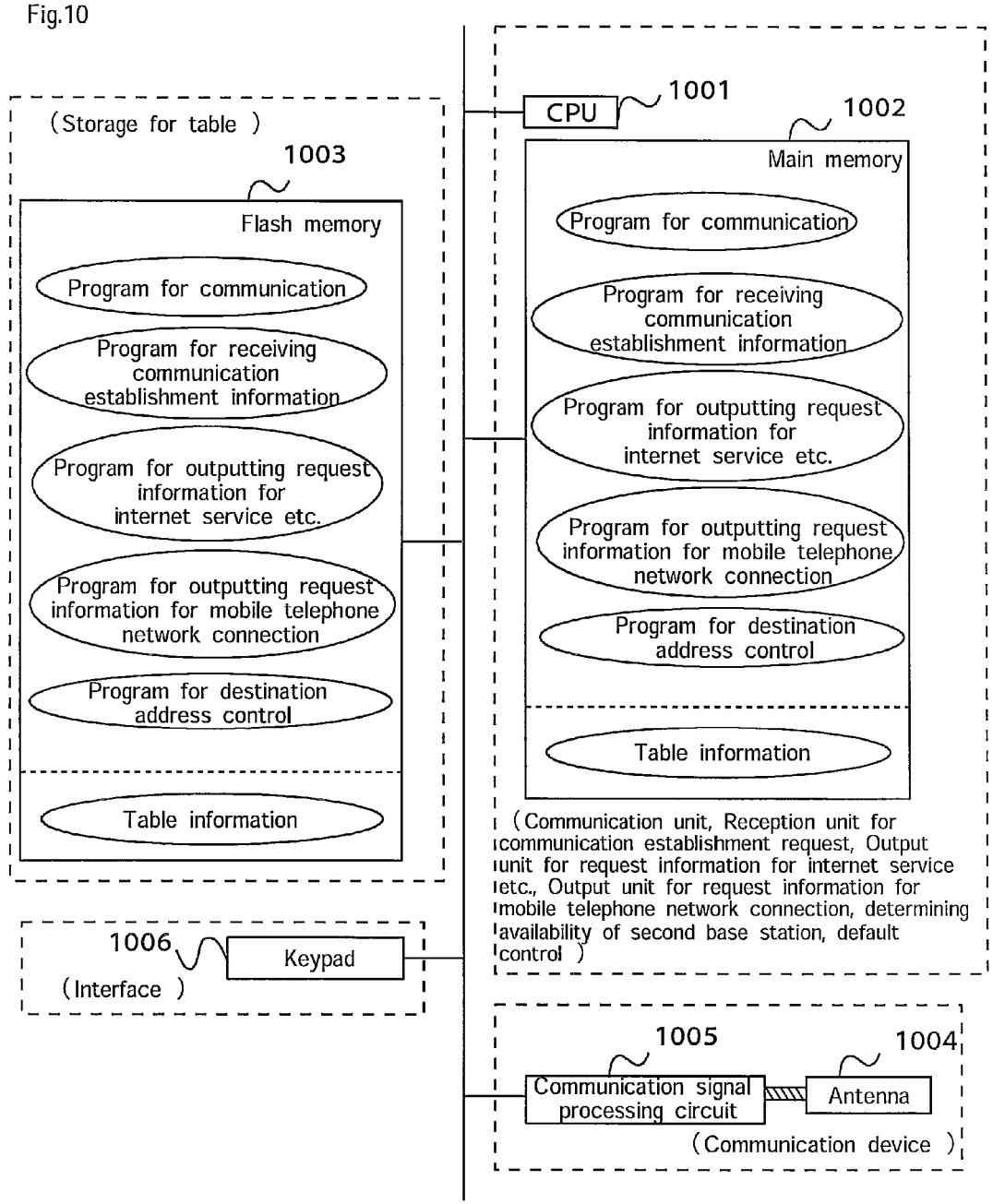
FIG. 10 is a diagram showing a hardware configuration of the communication terminal of the third embodiment.

FIG. 10 is a schematic diagram showing an example of a hardware configuration of the communication terminal of the third embodiment. The configuration is basically the same as the hardware configuration of the apparatus of the first embodiment described with reference to FIG. 3. However, in the apparatus of the third embodiment, a 'CPU' 1001 and a 'main memory' 1002 also have functions of the control unit for destination address and a 'flash memory' 1003 also has a function of the storage unit for table.

A program for destination address control acquires the table information from the flash memory and stores the information at a predetermined address in the main memory, and acquires the information of corresponding communication path based on the destination address and on the table information. Here, if the acquired destination address information is not included in the table information, an input of the information of the communication path may be in a waiting state without determining the communication path.

<Processing Flow of Third Embodiment>

Figure 11:
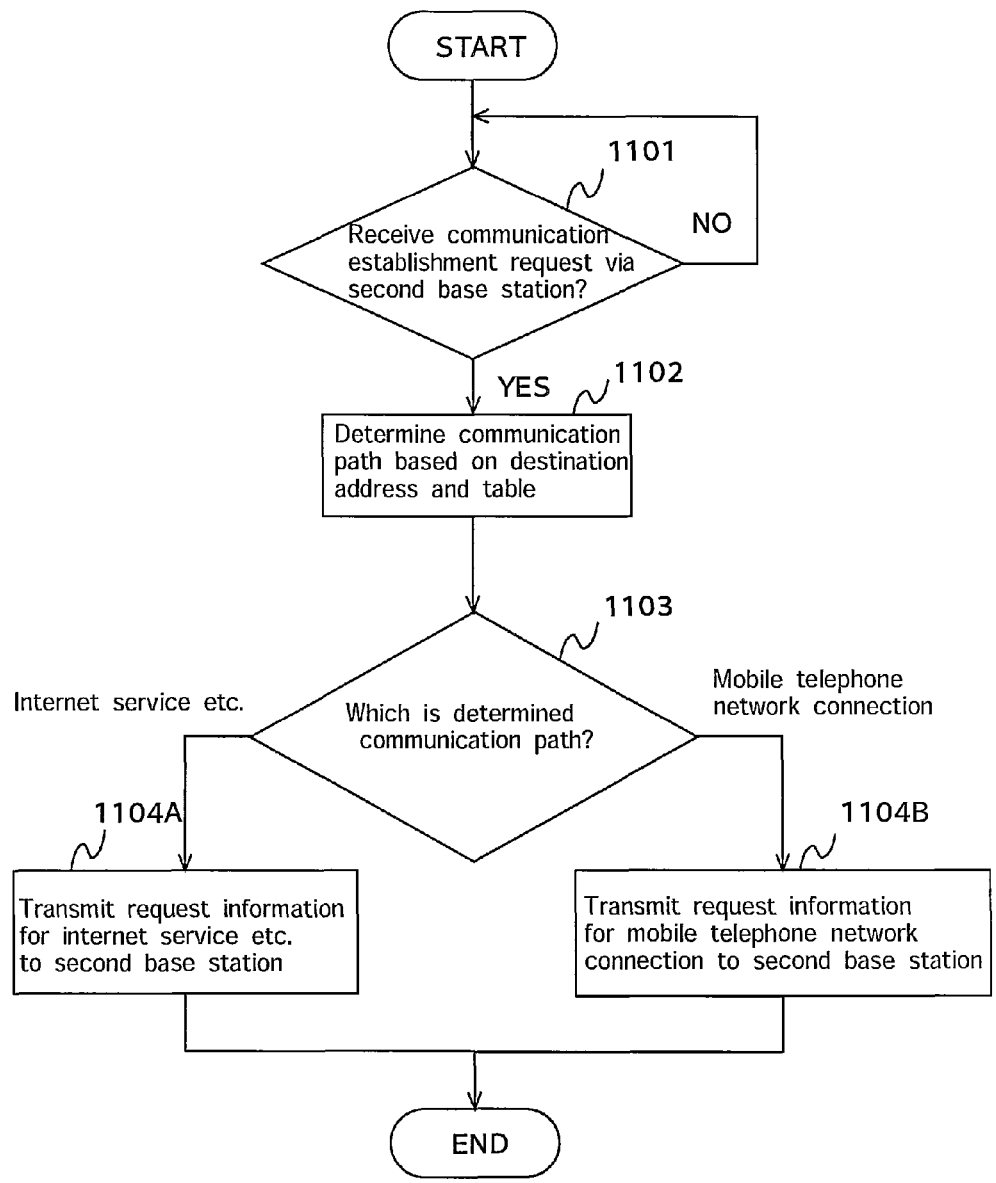
FIG. 11 is a flowchart of process in the communication terminal of the third embodiment.

FIG. 11 is a flowchart showing processes in the communication terminal of the third embodiment. The processes in FIG. 11 include the following steps. At the outset, in step S1101, it is determined whether the communication establishment request via the third base station has been received. Here, if it is determined that the communication establishment request has been received, step S1102 is carried out. If it is determined that the communication establishment request has not been received, the processing stays in a standby state. This process is mainly carried out by the reception unit for communication establishment request. In step S1102, the communication path is determined based on the destination address and on the table. This process is mainly carried out by the control unit for destination address. In step S1103, it is determined which of the communication paths, the communication path of the internet service etc. or the communication path of the mobile telephone network, is used upon the communication via the second base station. Here, if it is determined that the internet service etc. is used, step S1104A is carried out. If it is determined that the mobile telephone network is used, step S1104B is carried out. In the step S1104A, the request information to connect to the communication destination using the internet service etc. is transmitted to the third base station. This processing is mainly carried out by the output unit for request information for internet service etc. and the communication unit. In step S1105B, the request information to connect to the communication destination using the mobile telephone network is transmitted to the third base station. This processing is mainly carried out by the output unit for request information for mobile telephone network connection and the communication unit.

<Brief Description of Effects of Third Embodiment>

As described above, according to the communication terminal of the third embodiment, it is possible to select the communication path upon the communication via the third base station, thereby providing a communication method matching the user's needs. Moreover, upon the communication via the second base station, the communication path is selected based on the table information, in which the destination address for specifying the communication destination and the communication path are correlated, thereby reducing the operational load on the user.

Fourth Embodiment

Concept of Fourth Embodiment

A communication terminal of a fourth embodiment is basically the same as that of the first embodiment, and has functions of selecting and transmitting request information to use the internet service etc. or the mobile telephone network upon communication via the third base station. Moreover, in the communication terminal of the fourth embodiment, upon the communication via the second base station, a frequency in use of the communication path to be used is low with reference to a history of use of the communication path, this is notified to the user. Therefore, even if the user selects a wrong communication path, the notification is carried out such that the user can select an appropriate communication path <Configuration of Fourth Embodiment>

Figure 12:
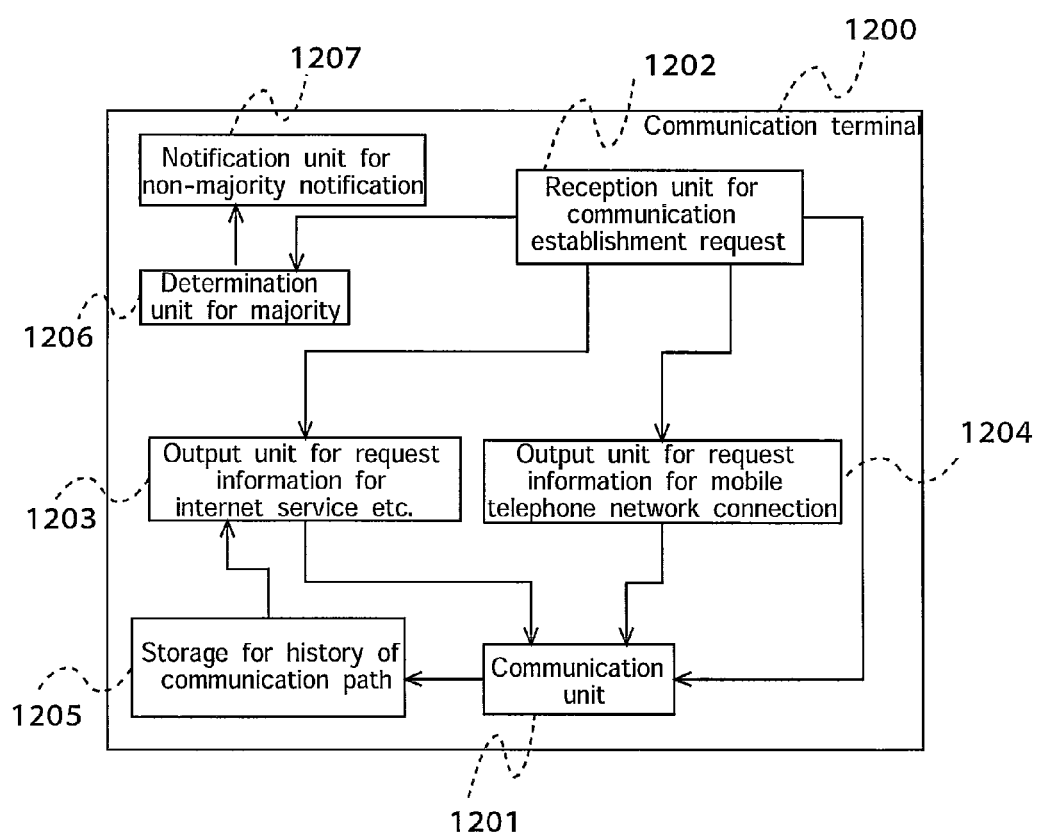
FIG. 12 is a functional block diagram of a communication terminal of a fourth embodiment.

FIG. 12 is a functional block diagram of a communication terminal of a fourth embodiment. In FIG. 12, a 'communication terminal' 1200 of the fourth embodiment comprises, a 'communication unit' 1201, a 'reception unit for communication establishment request' 1202, an 'output unit for request information for internet service etc.' 1203, an 'output unit for request information for mobile telephone network connection' 1204, a 'storage for usage history of communication path' 1205, a 'determination unit for majority' 1206, and a 'notification unit for non-majority notification' 1207. The configuration is basically the same as that of the first embodiment, so that descriptions of the storage for usage history of communication path, the determination unit for majority notification, and the notification unit for non-majority notification as differences are provided hereinbelow.

The 'storage for usage history of communication path' is configured to store a history, in which the destination address via the second base station and information indicating the use of the internet service etc. or the mobile telephone network are correlated. Here, the destination address corresponds to letters or symbols etc. for specifying a communication destination. Specifically, examples of the destination address include URL, IP address, or domain name, and for example, can be acquired from the communication establishment information.

As an example of the history, information as shown in FIG. 13 may be stored. Here, number of usages of the respective communication paths for the destination address is stored. In FIG. 13, it is found that, for the URL indicating the destination address 'https://iwebsite-y.com/iweb.html', the user has used the communication path using the internet service etc. 15 times in the past, and the communication path using the mobile telephone network 0 times in the past. Note that, a predetermined area is assigned to the history, and deletion may be carried out from the history of destination address relating to the oldest use.

The 'determination unit for majority' is configured to determine whether the communication path used in the communication via the second base station is major in the history. Here, in determining whether or not majority, for example, the number of usages of the respective communication paths stored in the history are compared, the communication path having large number of usages is determined as the majority, so that it may be determined whether the communication path and the communication path to be used are the same.

The 'notification unit for non-majority notification' is configured to output a non-majority notification to a user when the determination result by the determination unit for majority indicates that the path is not major.

Figure 14:
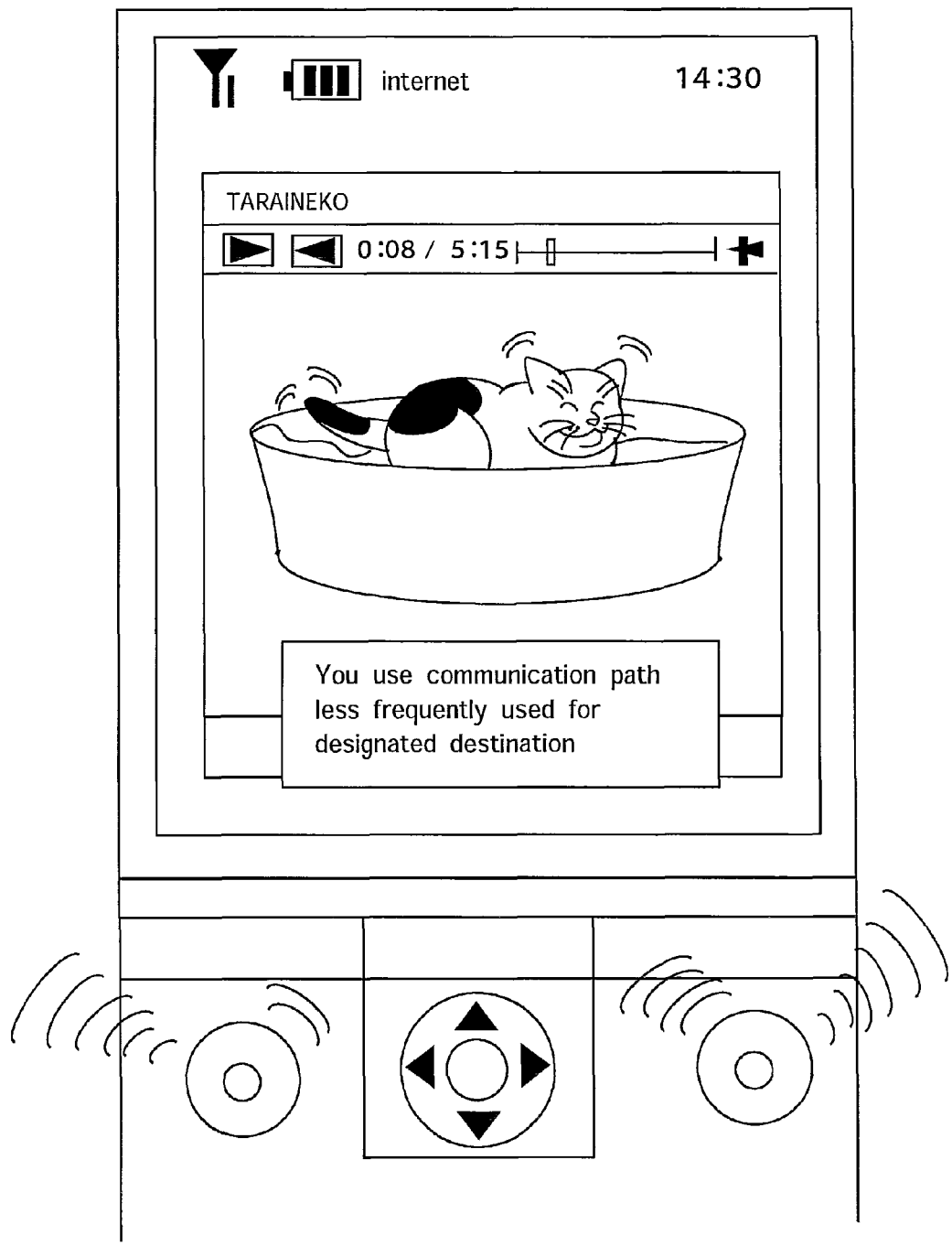
FIG. 14 is a diagram showing an example of a notification method in the communication terminal of the fourth embodiment.

In the notification method, for example, as shown in FIG. 14, a text etc. indicating that the communication path to be used by the user has low frequency usage in the history is displayed on a display screen, a similar voice message is outputted from a speaker, or control of vibration device for drawing attention is carried out. These notifications make the user recognize that the communication path to be used by the user has low frequency usage, and the user can take an appropriate action.

<Concrete Configuration of Fourth Embodiment>

Figure 15:
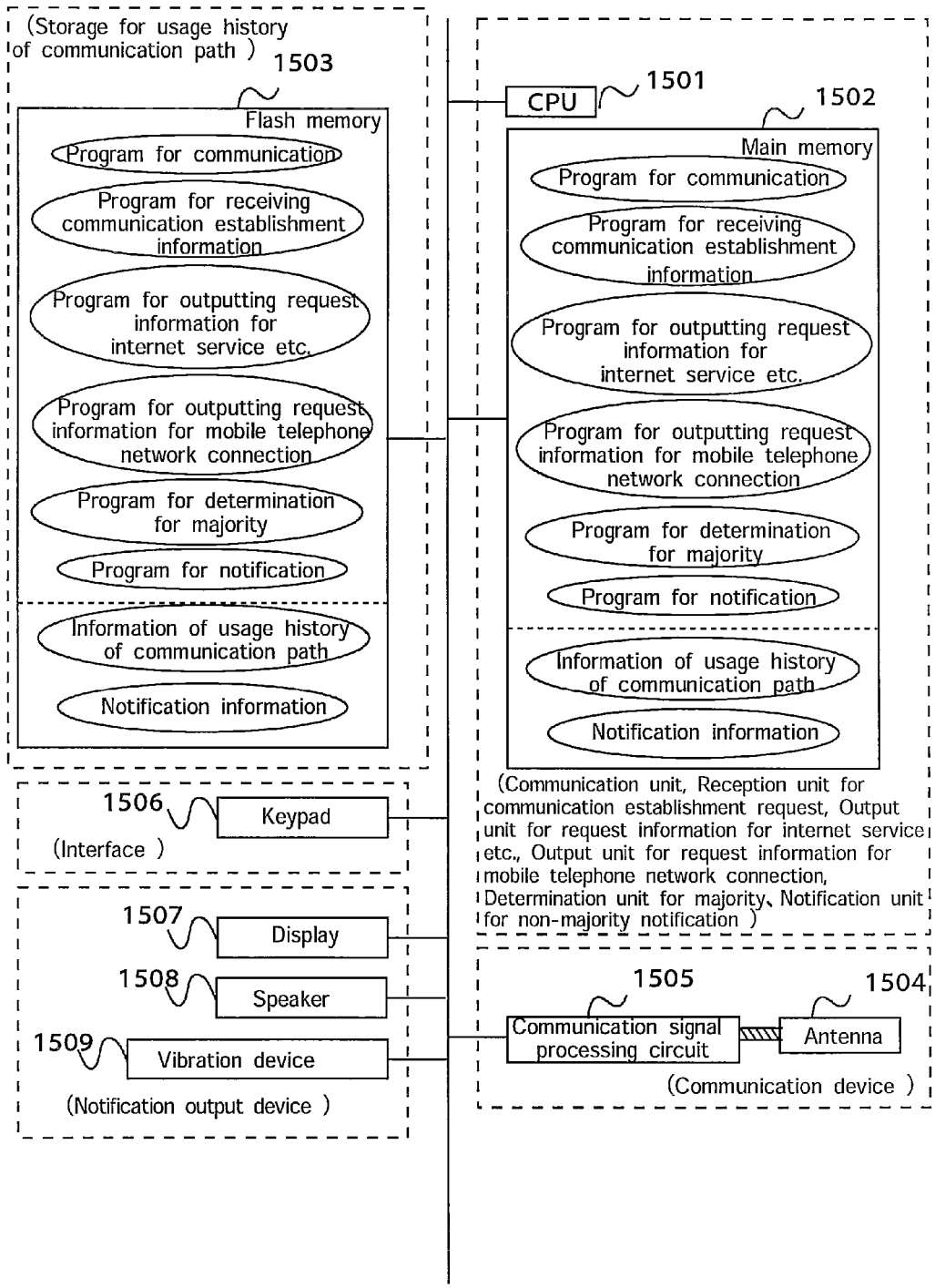
FIG. 15 is a diagram showing a hardware configuration of the communication terminal of the fourth embodiment.

FIG. 15 is a schematic diagram showing an example of a hardware configuration of the communication terminal of the fourth embodiment. The configuration is basically the same as the hardware configuration of the apparatus of the first embodiment described with reference to FIG. 3. However, in the apparatus of the fourth embodiment, a 'CPU' 1501 and a 'main memory' 1502 also have functions of the determination unit for majority and the notification unit for non-majority notification, and a 'flash memory' 1003 also has a function of the storage for usage history of communication path.

A program for determining majority acquires the communication address of the destination and the information of the communication path to be used from the communication establishment information, thereby determining whether the communication path is a majority. Specifically, the program stores the history information of use of communication path at a predetermined address in the main memory, and causes the CPU to execute a processing for determining the communication path mostly used for the destination address. Specifically, a processing for comparing the numbers of usages of the respective communication paths corresponding to the destination addresses is executed. Subsequently, a program for determining majority causes the CPU to execute a processing for determining whether the major communication path acquired by the processing and the communication path to be used are the same.

A program for non-majority notification executes a processing for outputting a non-majority notification to the user when the communication path to be used is not major. Specifically, the non-majority notification information, stored in the flash memory, is stored at a predetermined address in the main memory, and the non-majority notification information is outputted through the notification output device such as the display, speaker, and vibration device.

<Processing Flow of Fourth Embodiment>

Figure 16:
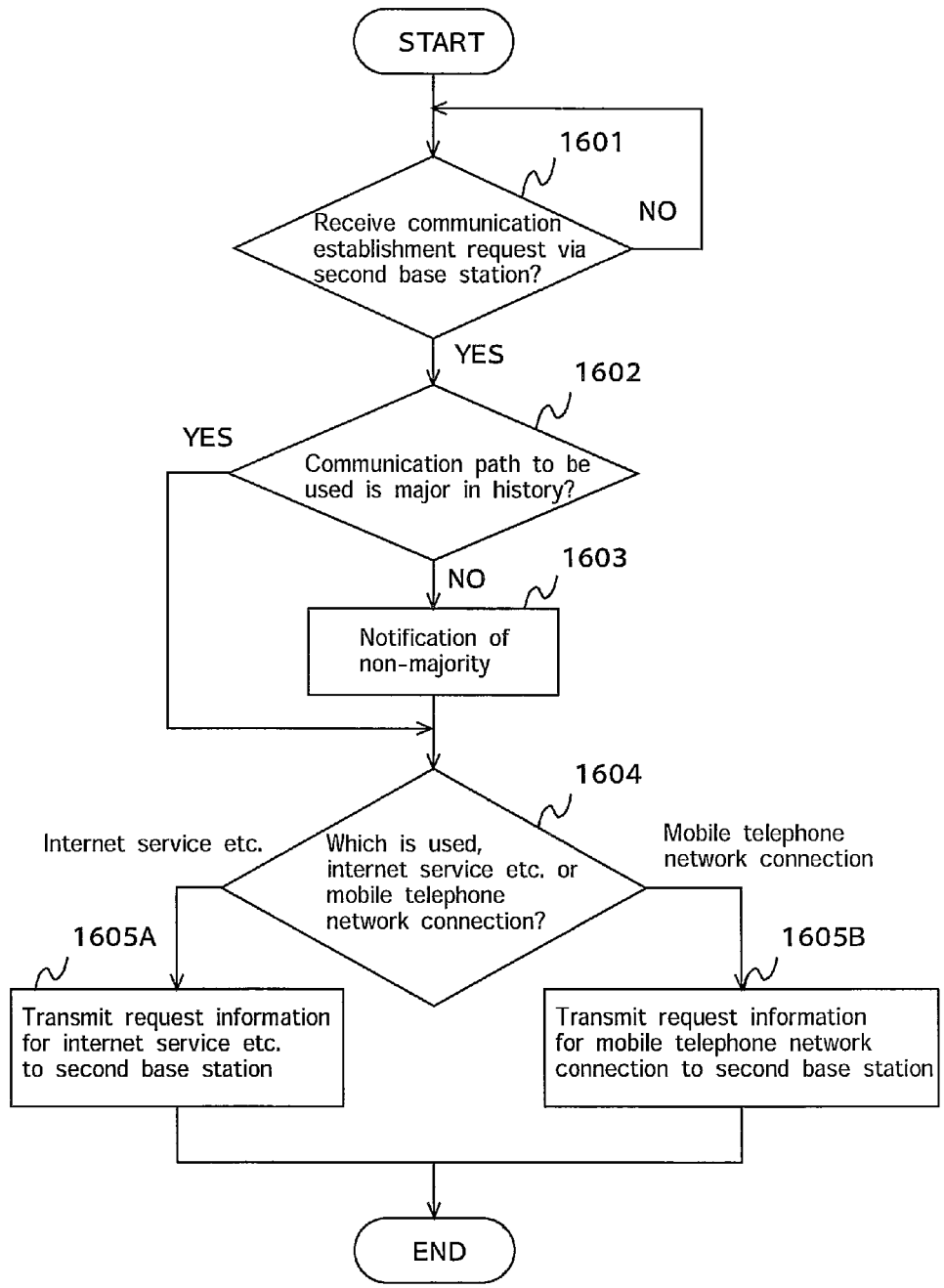
FIG. 16 is a flowchart of process in the communication terminal of the fourth embodiment.

FIG. 16 is a flowchart showing processes in the communication terminal of the fourth embodiment. The processes in FIG. 16 include the following steps. At the outset, in step S1601, it is determined whether the communication establishment request via the third base station has been received. Here, if it is determined that the communication establishment request has been received, step S1602 is carried out. If it is determined that the communication establishment request has not been received, the processing stays in a standby state. This process is mainly carried out by the reception unit for communication establishment request. In step S1602, it is determined whether the communication path used in the communication via the second base station is major in the history. If it is determined that the communication path is not major, step S1603 is carried out. If it is determined that the communication path is major, step S1604 is carried out. This process is mainly carried out by the determination unit for majority. In step S1603, it is notified to the user that the communication path to be used is not major. This process is mainly carried out by the notification unit for non-majority notification. In step S1604, it is determined which of the communication paths, the communication path of the internet service etc. or the communication path of the mobile telephone network, is currently used upon the communication via the second base station. Here, if it is determined that the internet service etc. is currently used, step S1605A is carried out. If it is determined that the mobile telephone network is currently used, step S1605B is carried out. In step S1604A, the request information to connect to the communication destination using the internet service etc. is transmitted to the third base station. This processing is mainly carried out by the output unit for request information for internet service etc. and the communication unit. In step S1605B, the request information to connect to the communication destination using the mobile telephone network is transmitted to the third base station. This processing is mainly carried out by the output unit for request information for mobile telephone network connection and the communication unit.

<Brief Description of Effects of Fourth Embodiment>

As described above, according to the communication terminal of the fourth embodiment, it is possible to select the communication path upon the communication via the third base station, thereby providing a communication method matching the user's needs. Moreover, when the selected communication path has low frequency usage for the communication destination, this is notified to the user, thereby reducing the operational load on the user Fifth Embodiment Concept of Fifth Embodiment A communication terminal of a fifth embodiment is basically the same as that of the first embodiment, and has functions of selecting and transmitting request information to use the internet service etc. or the mobile telephone network upon communication via the third base station. Moreover, in the communication terminal of the fifth embodiment, upon the communication via the second base station, a latest communication path relating to the destination address is selected, thereby easily carrying out the communication matching the usage tendency of the user.

<Configuration of Fifth Embodiment>

Figure 17:
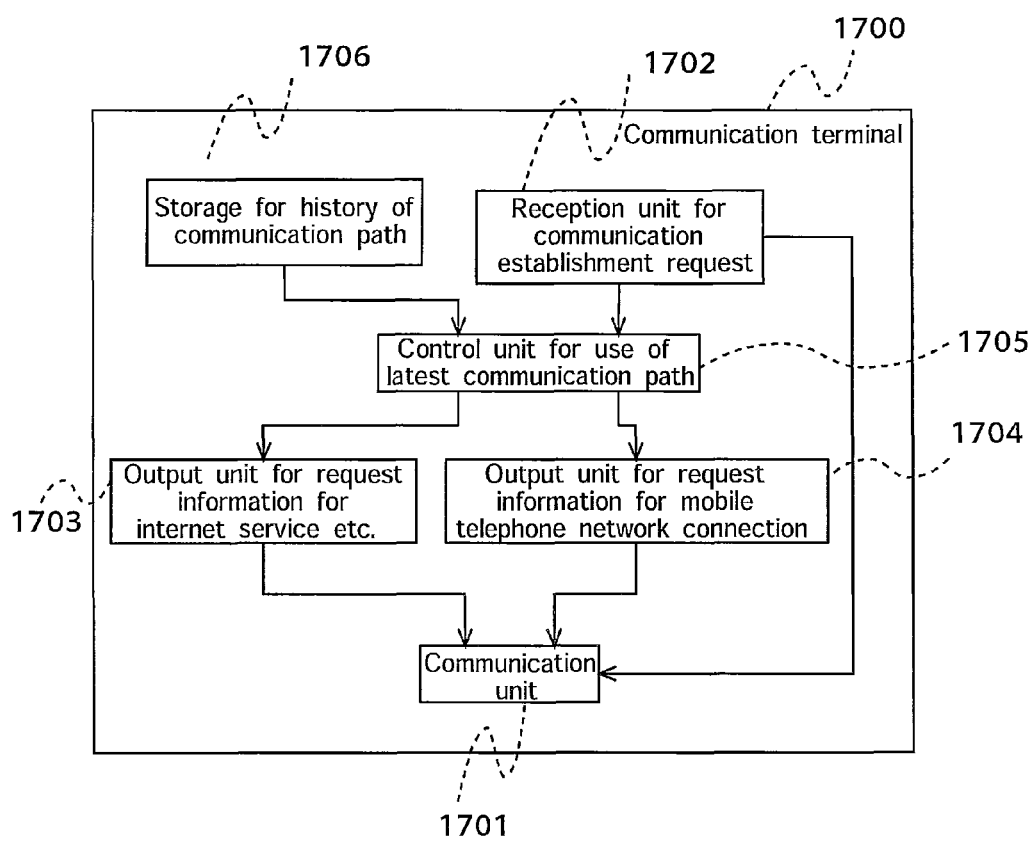
FIG. 17 is a functional block diagram of a communication terminal of a fifth embodiment.

FIG. 17 is a functional block diagram of a communication terminal of a fifth embodiment. In FIG. 17, a 'communication terminal' 1700 of the fifth embodiment comprises, a 'communication unit' 1701, a 'reception unit for communication establishment request' 1702, an 'output unit for request information for internet service etc.' 1703, an 'output unit for request information for mobile telephone network connection' 1704, a 'storage for usage history of communication path' 1705, and a 'control unit for use of latest communication path' 1706. The configuration is basically the same as those of the first and fourth embodiments, so that description of the control unit for use of latest communication path as a difference is provided hereinbelow.

The 'control unit for use of latest communication path' is configured to acquire a latest communication path relating to the destination address, and carrying out control as to which is outputted, the request information for internet service etc. or the request information for mobile telephone network connection, using the latest communication path. Therefore, it enables easy communication using the same communication path as the last time for the designated communication destination.

<Concrete Configuration of Fifth Embodiment>

Figure 18:
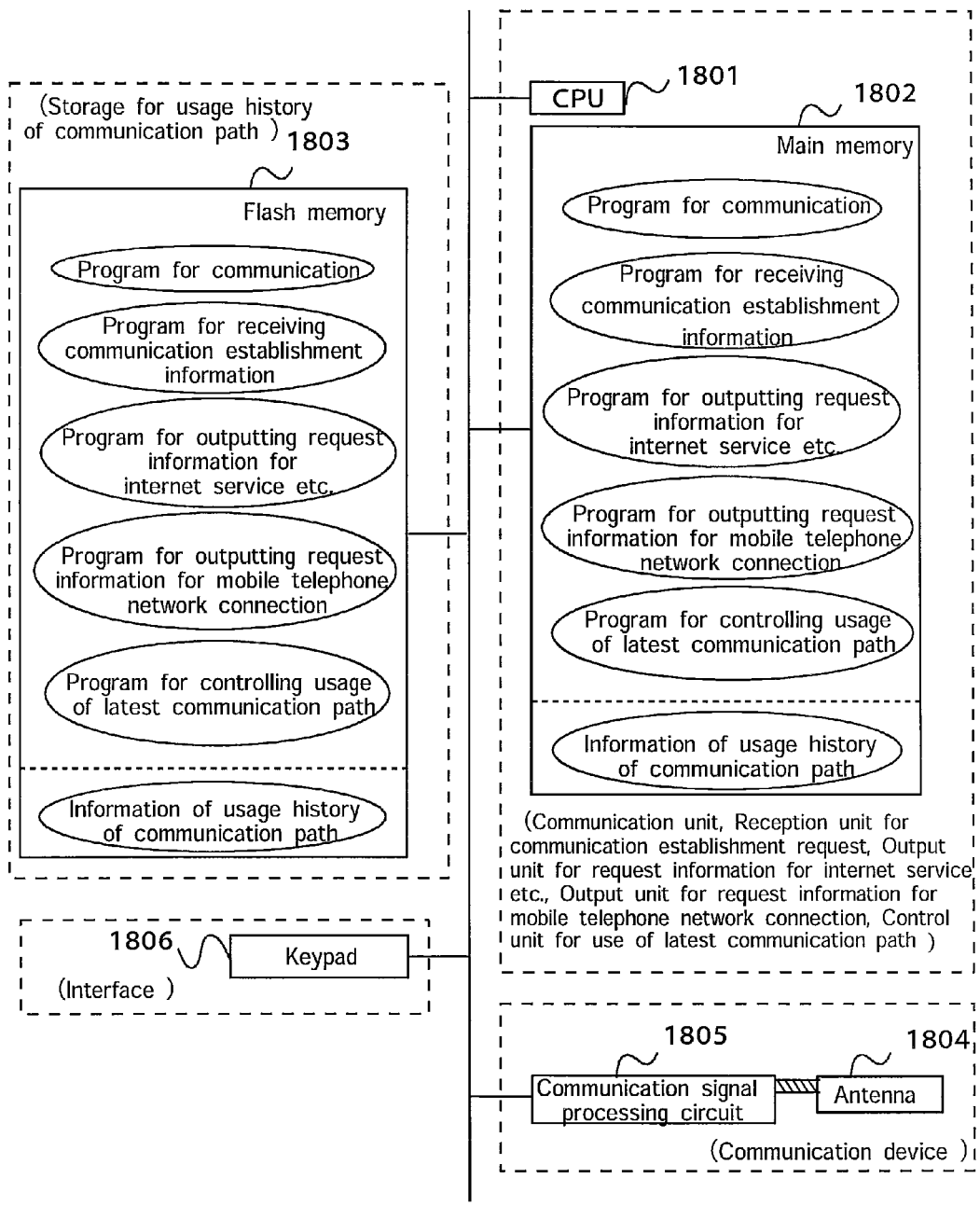
FIG. 18 is a diagram showing a table stored in the communication terminal of the fifth embodiment.

FIG. 18 is a schematic diagram showing an example of a hardware configuration of the communication terminal of the fifth embodiment. The configuration is basically the same as the hardware configuration of the apparatuses of the first and fourth embodiments However, in the apparatus of the fifth embodiment, a 'CPU' 1801 and a 'main memory' 1802 also have functions of the control unit for use of latest communication path.

A program for controlling usage of latest communication path acquires a latest communication path relating to the destination address from the history when acquiring the destination address from the communication establishment information.

Specifically, the program stores the history information of use of communication path at a predetermined address in the main memory, searches for the latest communication path for the destination address from the history, causes the CPU to execute a processing for acquiring the information, and stores the processing result at a predetermined address in the main memory. Here, when the destination address information, acquired from the history, is not included, an input of the information of the communication path may be in a waiting state without determining the communication path.

<Processing Flow of Fifth Embodiment>

Figure 19:
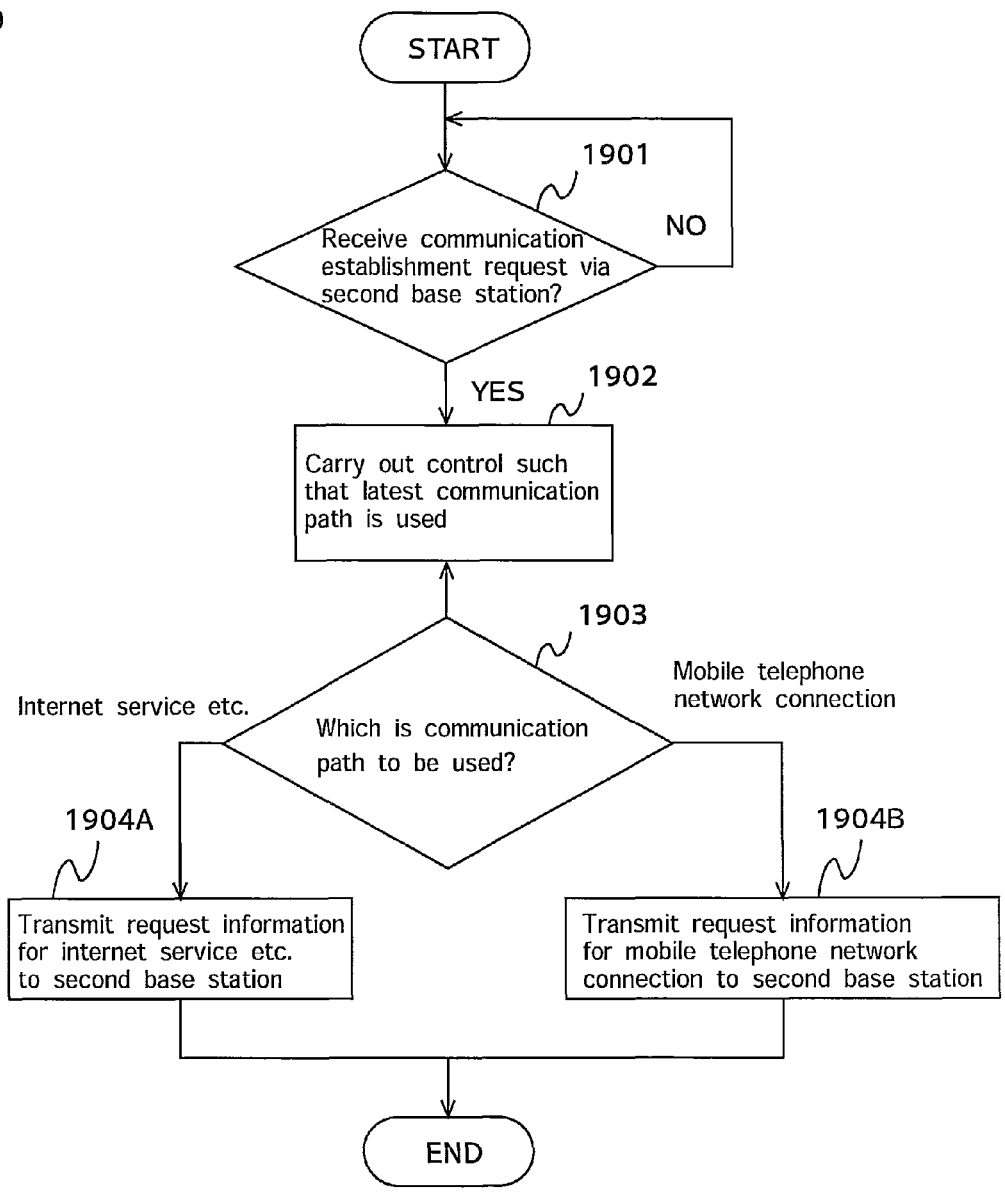
FIG. 19 is a diagram showing a hardware configuration of the communication terminal of the fifth embodiment.

FIG. 19 is a flowchart showing processes in the communication terminal of the fifth embodiment. The processes in FIG. 19 include the following steps. At the outset, in step S1901, it is determined whether the communication establishment request via the third base station has been received. Here, if it is determined that the communication establishment request has been received, step S1902 is carried out. If it is determined that the communication establishment request has not been received, the processing stays in a standby state. This process is mainly carried out by the reception unit for communication establishment request. In step S1902, the latest communication path relating to the destination address is acquired from the history, and control is carried out such that the communication path is currently used. This process is mainly carried out by the control unit for use of latest communication path. In step S1903, it is determined which of the communication paths, the communication path of the internet service etc. or the communication path of the mobile telephone network, is currently used upon the communication via the second base station. Here, if it is determined that the internet service etc. is currently used, step S1904A is carried out. If it is determined that the mobile telephone network is currently used, step S1904B is carried out. In step S1904A, the request information to connect to the communication destination using the internet service etc. is transmitted to the third base station. This processing is mainly carried out by the output unit for request information for internet service etc. and the communication unit. In step S1904B, the request information to connect to the communication destination using the mobile telephone network is transmitted to the third base station. This processing is mainly carried out by the output unit for request information for mobile telephone network connection and the communication unit.

<Brief Description of Effects of Fifth Embodiment>

As described above, according to the communication terminal of the fifth embodiment, it is possible to select the communication path upon the communication via the third base station, thereby providing a communication method matching the user's needs. Moreover, upon the communication via the second base station, the latest communication path relating to the destination address is selected, thereby easily carrying out the communication matching the usage tendency of the user.

Sixth Embodiment

Concept of Sixth Embodiment

Figure 20:
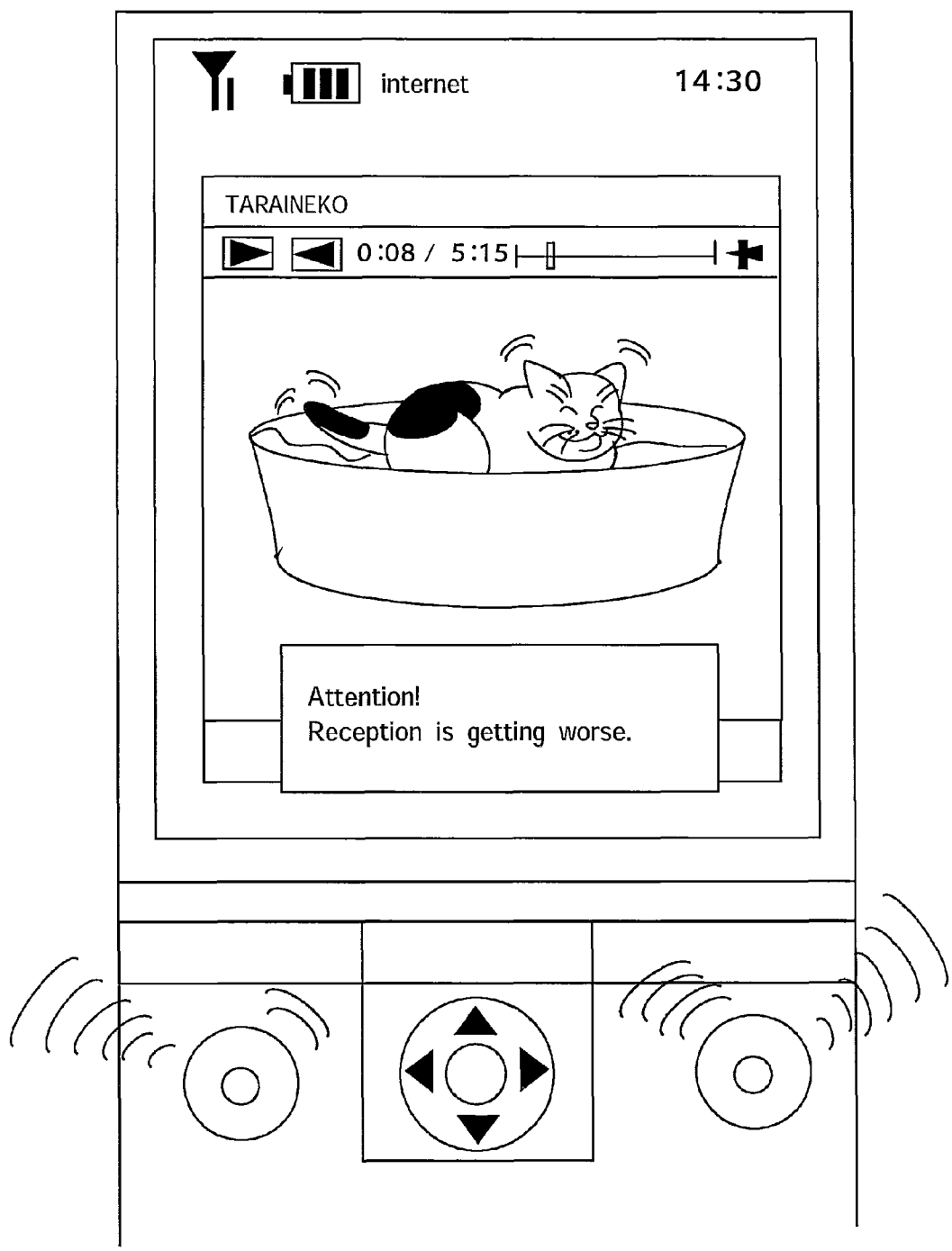
FIG. 20 is a schematic diagram of a communication terminal of a sixth embodiment.

Similar to the first embodiment, a communication terminal of a sixth embodiment has a function of transmitting request information to use the internet service etc. or the mobile telephone network upon communication via the second base station. Moreover, the communication terminal of the sixth embodiment has a function of effective alarm notification when the communication status is not fine upon using the internet service etc. via the first base station (macrocell etc.) or the second base station (femtocell). FIG. 20 is a schematic diagram of a communication terminal of the sixth embodiment. When the user uses the internet service etc. via the second base station (femtocell), if the intensity of electric field decreases, there is a possibility of communication delay or disconnection of communication. In this case, as shown in FIG. 20, the communication terminal of the sixth embodiment effectively notifies that the intensity of electric field decreases by displaying that on the display, by outputting that by voice, or by using a vibration device. Thereby, the user can take appropriate action such as switching the communication to the communication via the first base station (macrocell base station etc.) or staying within the area covered by the second base station.

<Configuration of Sixth Embodiment>

Figure 21:
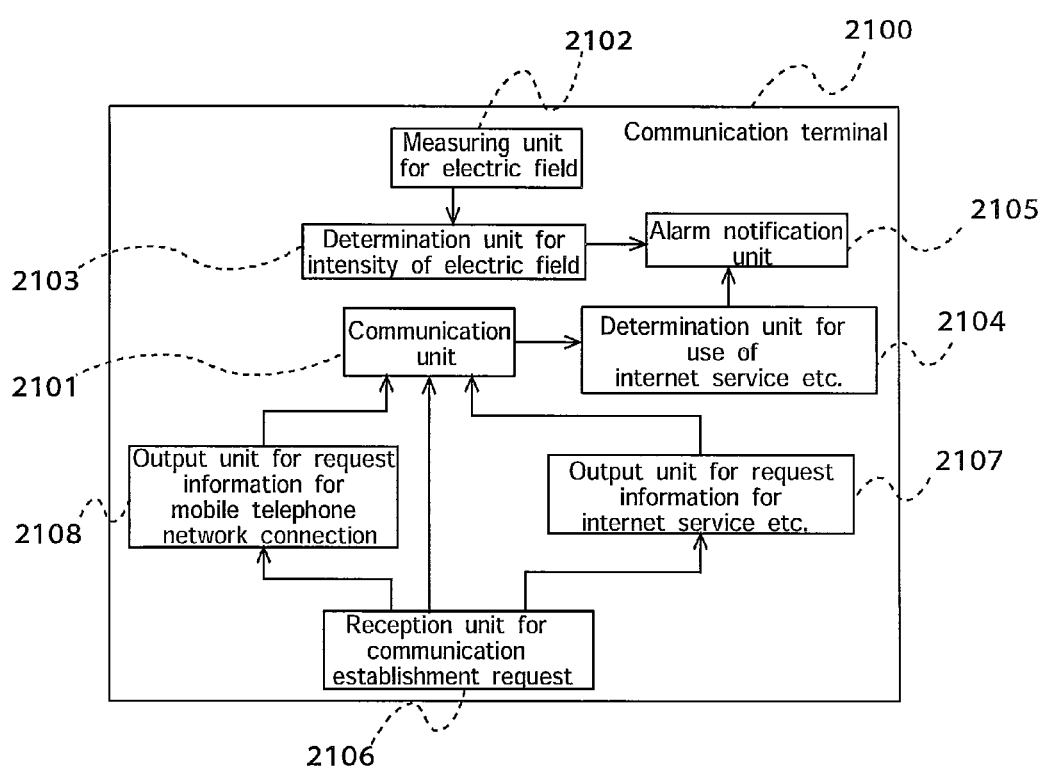
FIG. 21 is a functional block diagram of a communication terminal of the sixth embodiment.

FIG. 21 is a functional block diagram of the communication terminal of the sixth embodiment. The respective units of the present invention can be configured by hardware, software, or both hardware and software. For example, in the case of using a computer, the respective units are implemented by the hardware configured by a CPU, a memory, a bus, an interface, and other peripheral devices etc., and by the software operable on the hardware. Concretely speaking, by sequentially carrying out programs in the memory, the data in the memory and the data inputted via the interface are processed, stored, and outputted etc., thereby implementing functions of the respective units.

In FIG. 21, a 'communication terminal' 2100 of the sixth embodiment comprises, a 'communication unit' 2101, a 'measuring unit for electric field' 2102, a 'determination unit for intensity of electric field' 2103, a 'determination unit for use of internet service etc' 2104, an 'alarm notification unit' 2105, a 'reception unit for communication establishment request' 2106, an 'output unit for request information for internet service etc.' 2107, and an 'output unit for request information for mobile telephone network connection' 2108.

Moreover, the present invention can be implemented not only as an apparatus but also as a method (the same applies throughout the entire specification).

The configuration is basically the same as that of the first embodiment, so that descriptions of the measuring unit for electric field the determination unit for intensity of electric field, the determination unit for use of internet service etc, the reception unit for communication establishment request, the output unit for request information for internet service etc, and the output unit for request information for mobile telephone network connection as differences are provided hereinbelow.

The 'measuring unit for electric field' is configured to measure intensity of a receiving electric field. For example, the intensity of electric field is detected based on the signal from the base station.

The 'determination unit for intensity of electric field' is configured to determine whether the intensity of receiving electric field measured by the measuring unit for electric field is below a predetermined threshold. Here, the predetermined threshold may be preliminarily set, or may be appropriately varied. For example, the user, who desires only that the communication continues without disconnection, sets a low threshold, and the user, who desires that quality of the communication never deteriorates, sets a high threshold.

The 'determination unit for use of internet service etc' is configured to determine whether the internet service etc. is currently used. Here, examples of the 'internet service etc' include internet connection service and IP telephone connection service. In an example of determining whether the internet service etc. is currently used, it is detected whether communication signal data is configured in accordance with the internet protocol. For example, it is possible to determine according to content of a header of the communication signal data. Moreover, it is possible to determine whether the internet service etc. is currently used from a history of instructions to the communication unit.

The 'alarm notification unit' is configured to output an alarm notification to the user when the determination unit for intensity of electric field determines that the intensity of receiving electric field measured by the measuring unit for electric field is below the predetermined threshold, and when determination unit for use of internet service etc. determines that the internet service etc. is currently used. Therefore, when the quality of the communication deteriorates, or when there is high possibility of disconnection of the communication due to inability of handover, the alarm notification to the user is carried out. Here, the 'alarm notification' is a notification of alarm to the user. As shown in FIG. 20, a text message such as 'Attention! Intensity of electric field in femtocell communication is decreasing' or icon etc. is displayed on the display screen, a similar voice message is outputted from the speaker, or control of the vibration device for drawing attention is carried out. These output devices for alarm notification make the user recognize that there is the possibility of the deterioration of the quality of the communication or the disconnection of the communication, and the user can take an appropriate action.

Moreover, by using GPS information etc, it is possible to display a current location of the user and the area covered by the first or second base station on the display screen, thereby displaying information indicating communication coverage for the user. Thereby, the user can confirm the communication coverage and communicate.

<Concrete Configuration of Sixth Embodiment>

Figure 22:
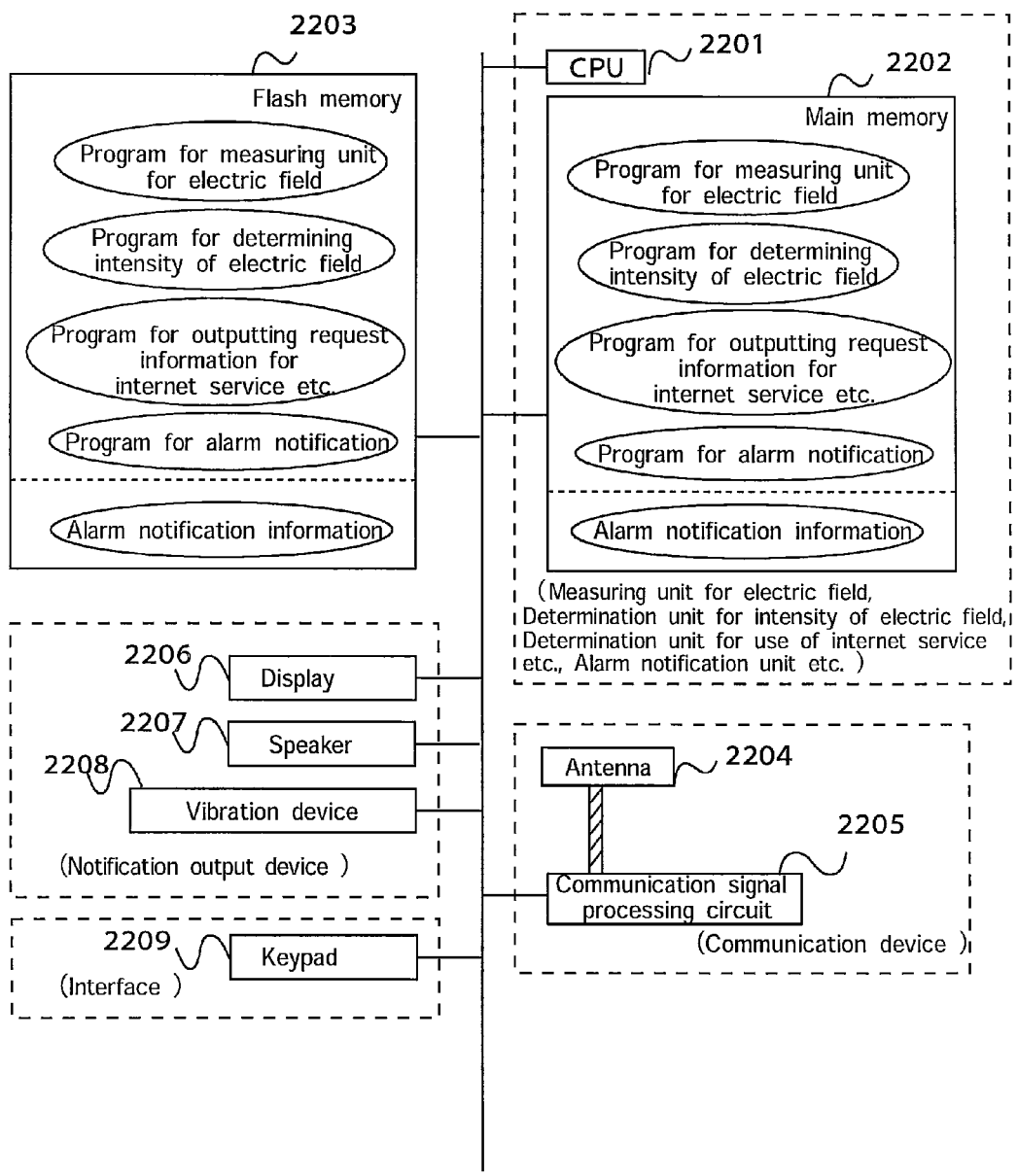
FIG. 22 is a diagram showing a table stored in the communication terminal of the sixth embodiment.

Subsequently, the respective hardware configurations of the communication terminal of the sixth embodiment will be described. FIG. 22 is a schematic diagram showing an example of a hardware configuration of the communication terminal of the sixth embodiment. With reference to this diagram, the respective hardware configurations of the communication terminal of the first embodiment will be described. As shown in FIG. 22, the comprise a 'CPU' 2201 and a 'main memory' 2202 as the measuring unit for electric field, the determination unit for intensity of electric field, the determination unit for use of internet service etc, the alarm notification unit. Moreover, the communication terminal comprises a 'flash memory' 2203 for storing program and alarm notification information etc. Moreover, as communication devices, an 'antenna' 2204 and a 'communication information processing circuit' 2205 are comprised. Moreover, as notification output units, a 'display' 2206, a 'speaker' 2207, a 'vibration device' 2208, and a 'keypad' 2209 are comprised. These are mutually connected through a system bus, thereby carrying out transmission/reception and processing of the information. Note that, the 'flash memory' and the 'main memory' may be configured by the same component. Note that, in FIG. 22, the program for communication, the program for receiving communication establishment request, the program for outputting request information for internet service etc. and the program for outputting request information for mobile telephone network connection, which have been shown in FIG. 3 of the first embodiment, are omitted.

The flash memory carries out nonvolatile storage of various programs executed by the CPU. The main memory provides work area used upon execution of the programs by the CPU. In addition, a plurality of memory addresses are assigned to the main memory and the storage respectively, so that the program executed by the CPU specifies the memory address and accesses thereto, thereby mutually exchanging data and carrying out processing. Moreover, in the description below, although the program is preliminarily developed and resident in the work area of the main memory, it is possible to call the program from the flash memory as necessary.

When the communication signal is received through the antenna, the signal is converted by the communication signal processing circuit such that the communication terminal can process the signal. A program for measuring electric field causes the CPU to execute calculation for determining the intensity of receiving electric field in the communication unit from the signal data provided from the communication unit. The CPU executes the calculation for determining, and stores the calculation result at a predetermined address in the main memory. A program for determining intensity of electric field causes the CPU to execute calculation for determining whether the intensity of electric field in the communication unit, stored at predetermined address in the main memory, is below the predetermined threshold. The CPU executes the calculation for determining, and stores the calculation result at a predetermined address in the main memory.

A program for determining use of internet service etc. stores the communication signal data, converted by the communication signal processing circuit, at a predetermined address in the main memory, and causes the CPU to execute calculation for determining the content of the header of the communication signal data. Specifically, unique information indicating IP header preliminarily stored in the flash memory etc. is stored at a predetermined address in the main memory, and the information and the header of the communication signal data are compared. The CPU executes the calculation for determining, and stores the calculation result at a predetermined address in the main memory.

Moreover, a program for alarm notification executes a processing for the alarm notification to the user when the determination result by the program for determining intensity of electric field, stored at the predetermined address in the main memory, indicates that the intensity of electric field is 'below the predetermined threshold', and when the determination result by the program for determining use of internet service etc. indicates that the 'internet service etc. is currently used'. Specifically, the alarm notification information, stored in the flash memory etc, is stored at a predetermined address in the main memory, and the alarm notification information is outputted to the notification output device such as the display, speaker, or vibration device.

<Processing Flow of Sixth Embodiment>

Figure 23:
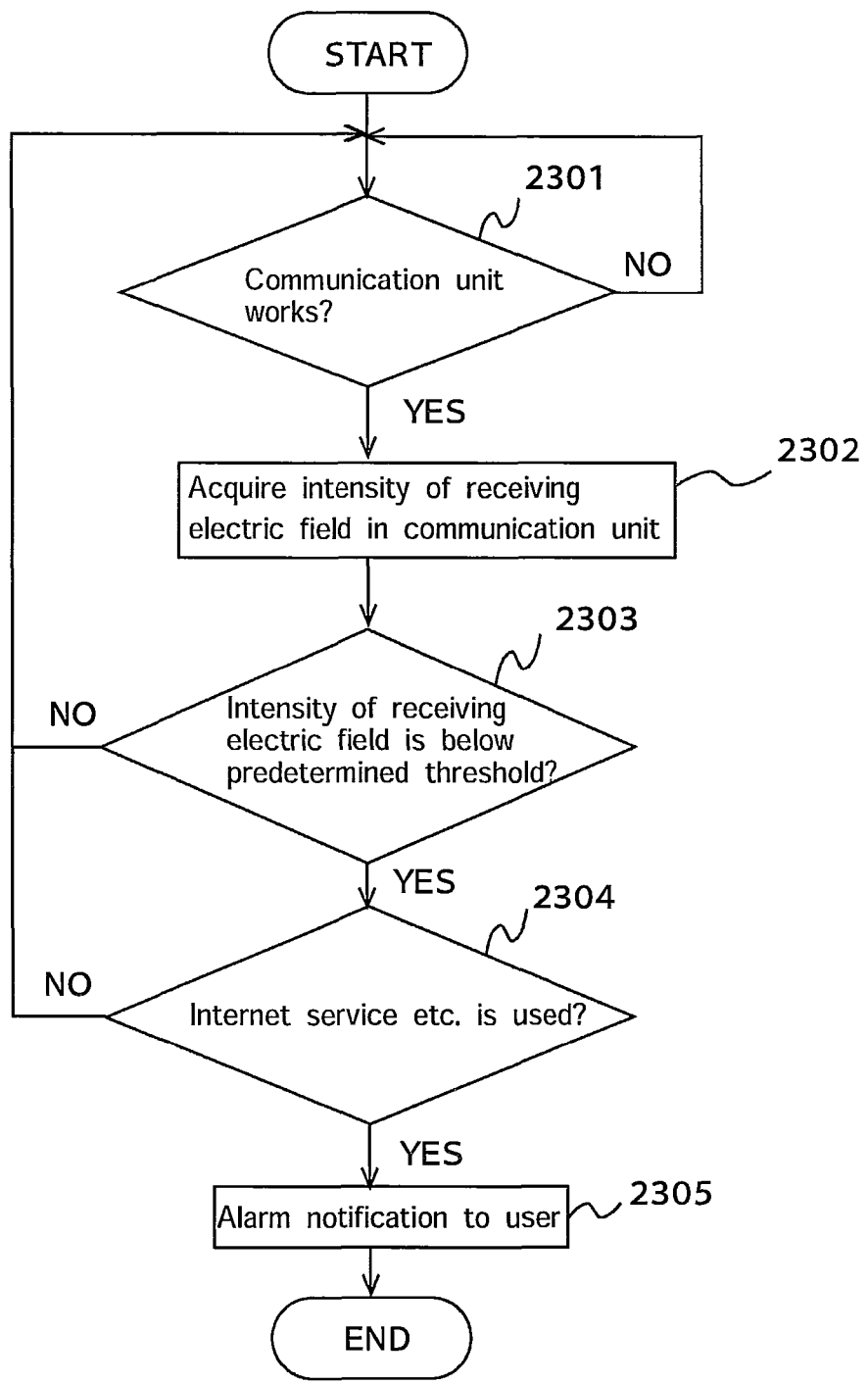
FIG. 23 is a diagram showing a hardware configuration of the communication terminal of the sixth embodiment.

FIG. 23 is a flowchart showing processes in the communication terminal of the sixth embodiment. The processes in FIG. 23 include the following steps. At the outset, in step S2301, it is determined whether the communication unit works. For example, it is determined whether the mobile phone is in a 'communication-OFF' mode etc., which stops the communication function of the mobile phone. Here, if it is determined that the communication unit works, step S2302 is carried out. If it is determined that the communication unit does not work, the processing stays in a standby state. In step S2302, the intensity of receiving electric field in the communication unit is acquired. This processing is mainly carried out by the measuring unit for electric field. In step S2303, it is determined whether the intensity of receiving electric field measured by the measuring unit for electric field is below a predetermined threshold. Here, if it is determined that the intensity of receiving electric field is below the predetermined threshold, step S2304 is carried out. If it is determined that the intensity of receiving electric field is not below the predetermined threshold, the process returns to step S2301. This processing is mainly carried out by the determination unit for intensity of electric field. In step S2304, it is determined whether the internet service etc. is currently used. If it is determined that the internet service etc. is currently used, step S2305 is carried out. If it is determined that the internet service etc. is not used, the process returns to step S2301. This processing is mainly carried out by the determination unit for use of internet service etc. In step S2305, a processing for alarm notification to the user is executed. This processing is mainly carried out by the alarm notification unit. Although the communication terminal of the sixth embodiment may carry out the processes shown in FIG. 4 of the first embodiment, the description thereof is omitted.

The above processes can be executed by the program to cause a computer to execute, and the program can be recorded in a recording medium readable by the computer (the same applies to the entire specification).

<Brief Description of Effects of Sixth Embodiment>

As described above, according to the communication terminal of the sixth embodiment, when the user uses the internet service etc. via the second base station (femtocell), even if the intensity of electric field decreases, it is possible to carry out effective alarm notification, so that the user can take appropriate action such as switching the communication to the communication via the first base station (macrocell base station etc.) or staying within the area covered by the second base station.

Seventh Embodiment

Concept of Seventh Embodiment

Figure 24:
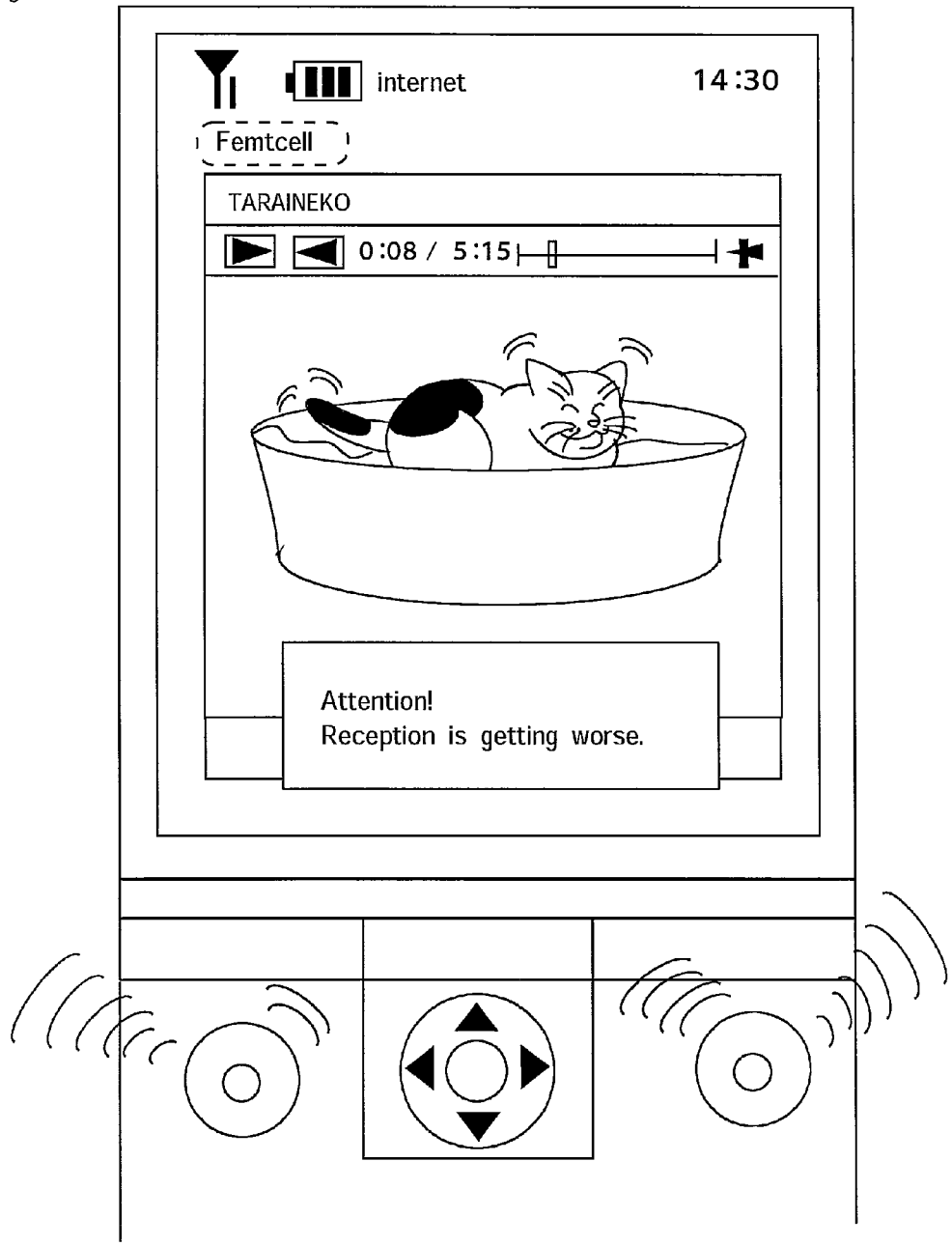
FIG. 24 is a schematic diagram of a communication terminal of a seventh embodiment.

Similar to the first embodiment, a communication terminal of a seventh embodiment has a function of transmitting request information to use the internet service etc. or the mobile telephone network upon communication via the second base station. FIG. 24 is a schematic diagram of a communication terminal of the seventh embodiment. Similar to the sixth embodiment, the communication terminal of the seventh embodiment effectively notifies that the intensity of electric field decreases by displaying that on the display, by outputting that by voice, or by using a vibration device. Moreover, the communication terminal of the seventh embodiment displays which of the base stations is currently used, the first base station (macrocell etc.) or the second base station (femtocell). For example, as shown in the diagram, when using the second base station (femtocell), an indication of 'Femtcell' flashes on the display, and when using the first base station (macrocell etc.), an indication of 'Normalcell' flashes on the display. Thereby, the user can confirm on the display etc. that the user currently uses the second base station, and can take appropriate action such as switching the communication to the communication via the first base station or staying within the area covered by the second base station.

<Configuration of Seventh Embodiment>

Figure 25:
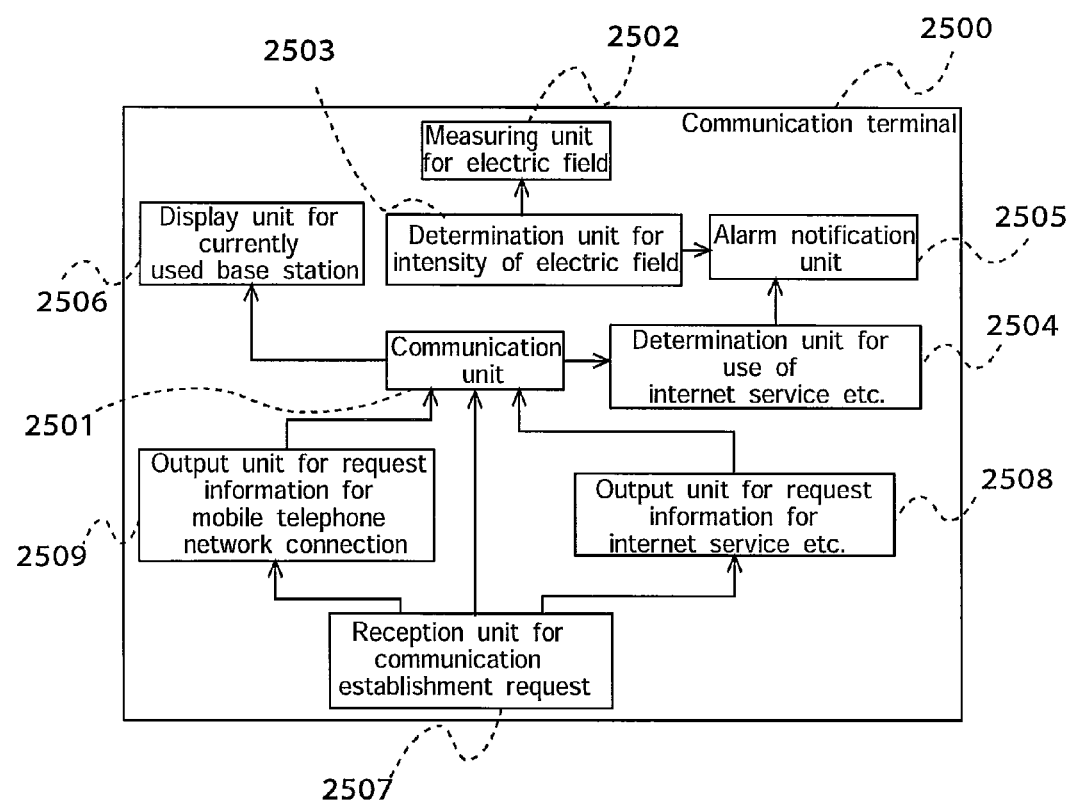
FIG. 25 is a functional block diagram of a communication terminal of the seventh embodiment.

FIG. 25 is a functional block diagram of the communication terminal of the seventh embodiment. In FIG. 25, a 'communication terminal' 2500 of the seventh embodiment comprises, a 'communication unit' 2501, a 'measuring unit for electric field' 2502, a 'determination unit for intensity of electric field' 2503, a 'determination unit for use of internet service etc' 2504, an 'alarm notification unit' 2505, a 'display unit for currently used base station' 2506, a 'reception unit for communication establishment request' 2507, an 'output unit for request information for internet service etc.' 2508, and an 'output unit for request information for mobile telephone network connection' 2509.

The configuration is basically the same as that of the sixth embodiment, so that a description of the display unit for currently used base station as a difference is provided hereinbelow.

The 'display unit for currently used base station' is configured to display which of the base stations is currently used, the first base station or the second base station. Therefore, it is possible to provide a visual notification to the user such that the user can clearly recognize the case of using the first base station or the case of using the second base station. Here, as a determination of the currently used base station, the determination may be executed based on ID etc. included in the communication signal. As an example of a display method, as shown in FIG. 6, it is possible to display the currently used base station additionally using a text or an icon etc, or to display the base station with variation of screen color and pattern etc. with respect to each base station.

<Concrete Configuration of Seventh Embodiment>

Figure 26:
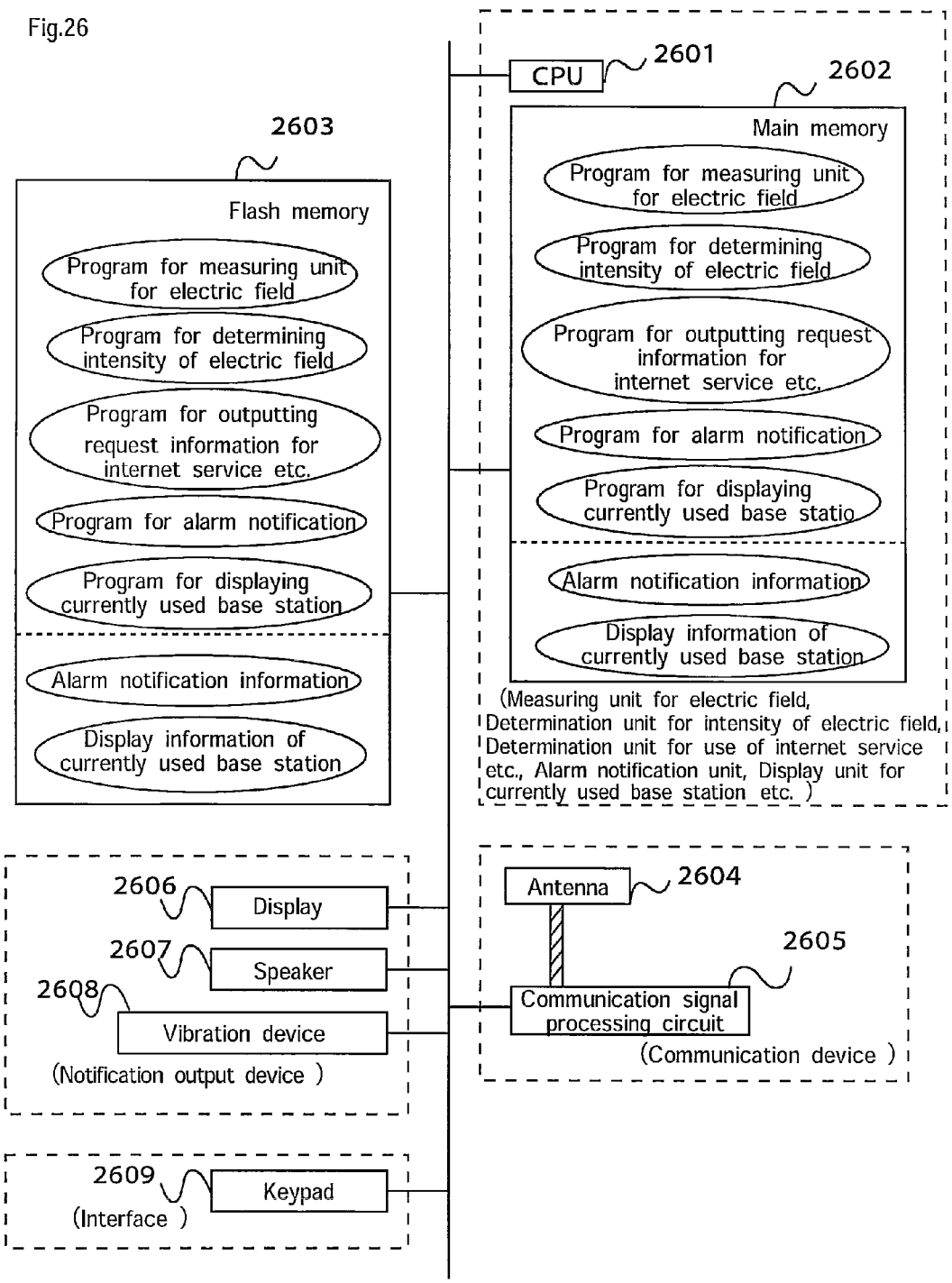
FIG. 26 is a diagram showing a table stored in the communication terminal of the seventh embodiment.

FIG. 26 is a schematic diagram showing an example of a hardware configuration of the communication terminal of the seventh embodiment. The configuration is the same as that of the apparatus of the sixth embodiment described with reference to FIG. 22. Meanwhile, the apparatus of the seventh embodiment comprises a 'CPU' 2601 and a 'main memory' 2602 as the display unit for currently used base station. Note that, in FIG. 26, the program for communication, the program for receiving communication establishment request, the program for outputting request information for internet service etc. and the program for outputting request information for mobile telephone network connection, which have been shown in FIG. 3 of the first embodiment, are omitted.

A program for displaying currently used base station, based on the information from the communication signal processing circuit, determines which of the base stations is currently used for the communication, the first base station or the second base station, and stores the data indicating the currently used base station at a predetermined address in the main memory. Subsequently, based on the data, the program stores the display information of currently used base station corresponding to the respective communications (text display data or icon display data etc.), stored in the flash memory, at a predetermined address in the main memory, thereby outputting the display information to the display etc. as an output device for displaying currently used base station.

<Processing Flow of Seventh Embodiment>

Figure 27:
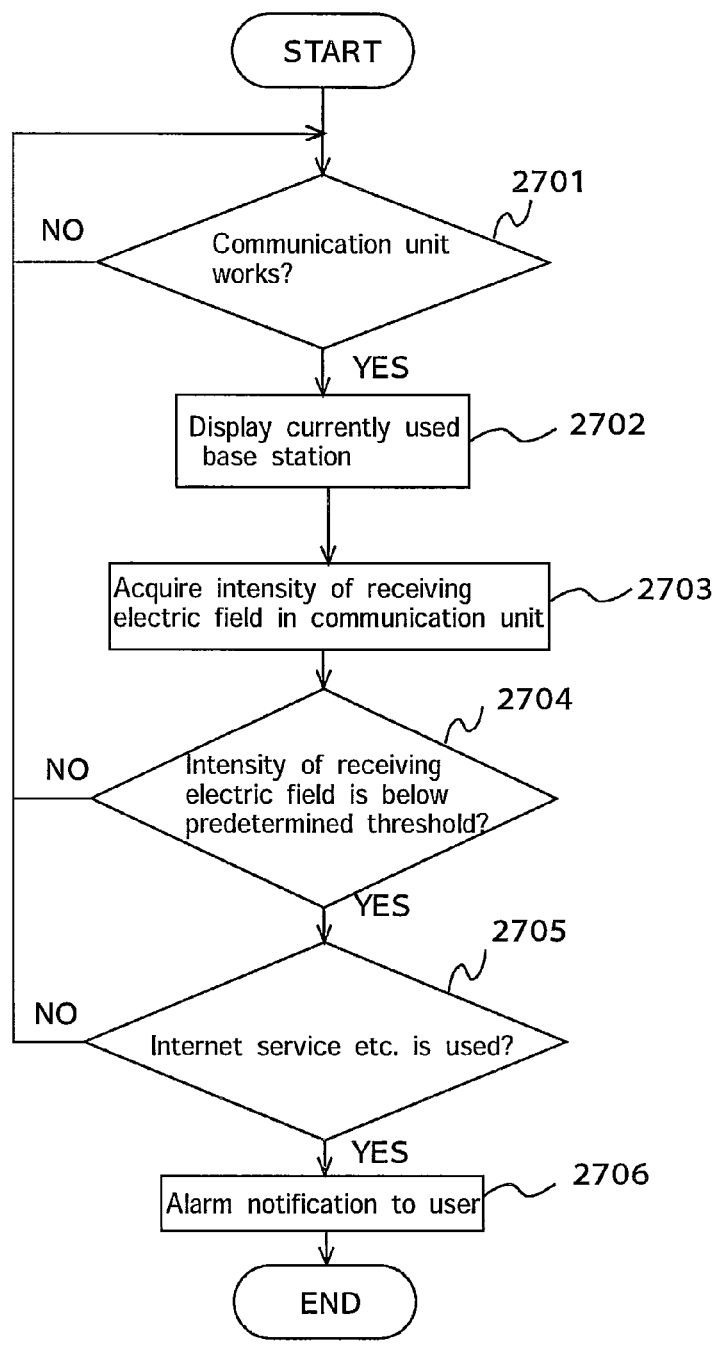
FIG. 27 is a diagram showing a hardware configuration of the communication terminal of the seventh embodiment.

FIG. 27 is a flowchart showing processes in the communication terminal of the seventh embodiment. The processes in FIG. 27 include the following steps. At the outset, in step S2701, it is determined whether the communication unit works. Here, if it is determined that the communication unit works, step S2702 is carried out. If it is determined that the communication unit dose not works, the processing stays in a standby state. In the step S2702, the information of currently used base station is displayed. This processing is mainly carried out by the display unit for currently used base station. In step S2703, the intensity of receiving electric field in the communication unit is acquired. This processing is mainly carried out by the measuring unit for electric field. In step S2704, it is determined whether the intensity of receiving electric field measured by the measuring unit for electric field is below a predetermined threshold. Here, if it is determined that the intensity of receiving electric field is below the predetermined threshold, step S2705 is carried out. If it is determined that the intensity of receiving electric field is not below the predetermined threshold, the process returns to step S2701. This processing is mainly carried out by the determination unit for intensity of electric field. In step S2705, it is determined whether the internet service etc. is currently used. If it is determined that the internet service etc. is currently used, step S2706 is carried out. If it is determined that the internet service etc. is not used, the process returns to step S2701. This processing is mainly carried out by the determination unit for use of internet service etc. In step S2706, a processing for alarm notification to the user is executed. This processing is mainly carried out by the alarm notification unit. Although the communication terminal of the seventh embodiment may carry out the processes shown in FIG. 4 of the first embodiment, the description thereof is omitted.

<Brief Description of Effects of Seventh Embodiment>

As described above, according to the communication terminal of the seventh embodiment, when the user uses the internet service etc. via the second base station, even if the intensity of electric field decreases, it is possible to carry out effective alarm notification, and the user can recognize the currently used base station on the display, so that the user can take appropriate action such as switching the communication to the communication via the first base station or staying within the area covered by the second base station.

Eighth Embodiment

Concept of Eighth Embodiment

Figure 28:
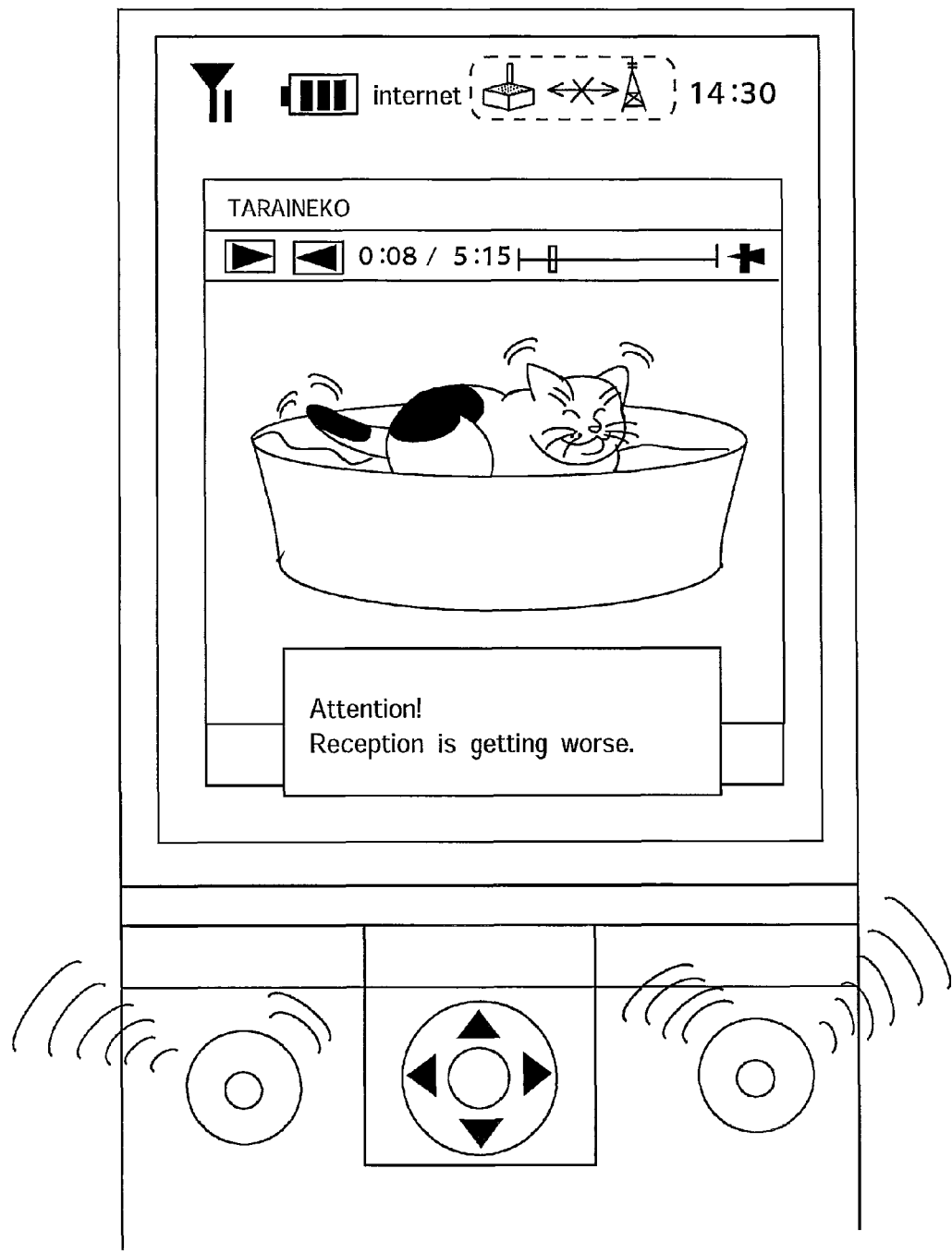
FIG. 28 is a schematic diagram of a communication terminal of an eighth embodiment.

Similar to the first embodiment, a communication terminal of an eighth embodiment has a function of transmitting request information to use the internet service etc. or the mobile telephone network upon communication via the second base station. FIG. 28 is a schematic diagram of a communication terminal of the eighth embodiment. Similar to the sixth embodiment, the communication terminal of the eighth embodiment effectively notifies that the intensity of electric field decreases by displaying that on the display, by outputting that by voice, or by using the vibration device. Moreover, the communication terminal of the eighth embodiment outputs an alarm notification indicating that the internet service etc. cannot be continuously used (by handover) upon communication via the second base station. For example, as shown in the diagram, it is possible to display an icon etc. such that the user recognizes at a glance that the internet service etc. cannot be continuously used. Thereby, the user can confirm on the display etc. that the internet service etc. cannot be continuously used, and can take appropriate action such as switching the communication to the communication via the first base station or staying within the area covered by the second base station.

<Configuration of Eighth Embodiment>

Figure 29:
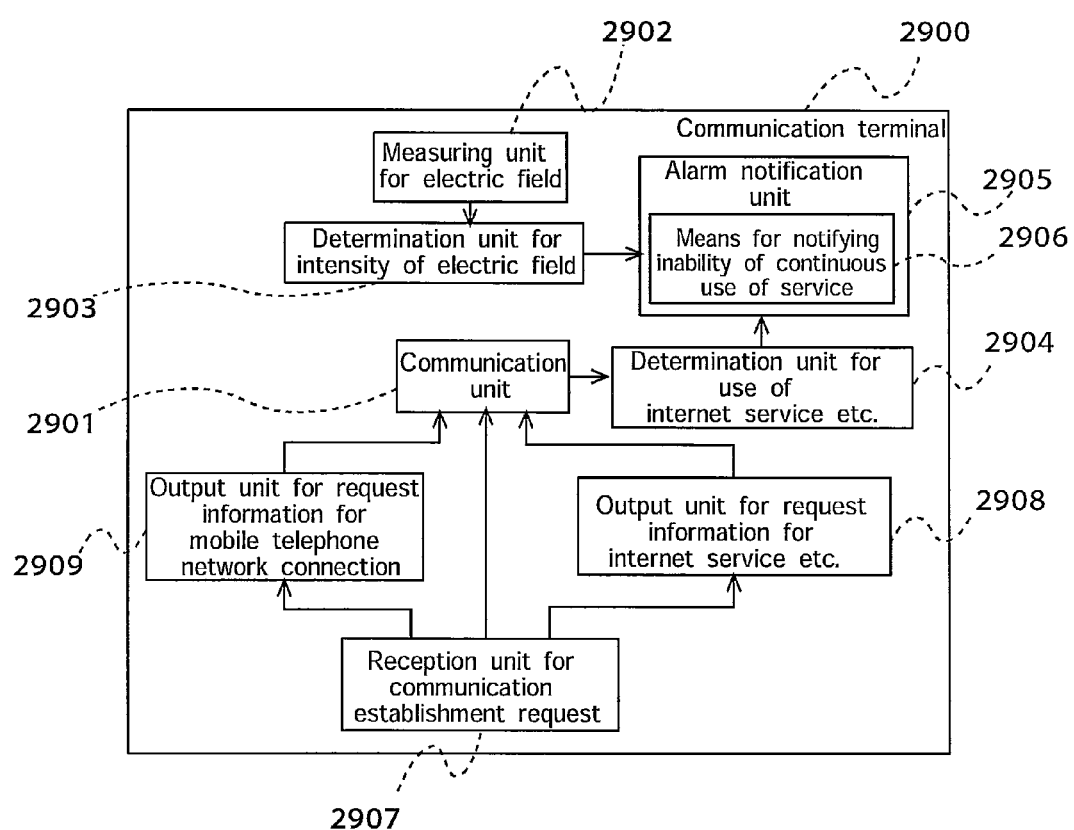
FIG. 29 is a functional block diagram of a communication terminal of the eighth embodiment.

FIG. 29 is a functional block diagram of the communication terminal of the eighth embodiment. In FIG. 29, a 'communication terminal' 2900 of the eighth embodiment comprises, a 'communication unit' 2901, a 'measuring unit for electric field' 2902, a 'determination unit for intensity of electric field' 2903, a 'determination unit for use of internet service etc' 2904, an 'alarm notification unit' 2905, a 'reception unit for communication establishment request' 2907, an 'output unit for request information for internet service etc.' 2908, and an 'output unit for request information for mobile telephone network connection' 2909. Moreover, the 'alarm notification unit' 2905 comprises 'means for notifying inability of continuous use of service' 2906.

The configuration is basically the same as that of the sixth embodiment, so that a description of the means for notifying inability of continuous use of service as difference is provided hereinbelow.

The 'means for notifying inability of continuous use of service' is configured to notify that the internet service etc. cannot be continuously used upon communication via the second base station. Here, in order to continuously use the internet service etc, it is necessary to carry out the control (handover) by the mobile switching center etc. such that the communication is automatically switched to the communication via the first base station when in outside the coverage of the second base station. However, the handover from the second base station to the first base station is possibly not supported. In such case, it is necessary to output the alarm notification to the user, who believes that the communication is seamlessly switched from the second base station to the first base station.

Examples of the alarm notification include displaying a text on the display, outputting by voice, and using the vibration device, in addition to the icon display of FIG. 28.

<Concrete Configuration of Eighth Embodiment>

Figure 30:
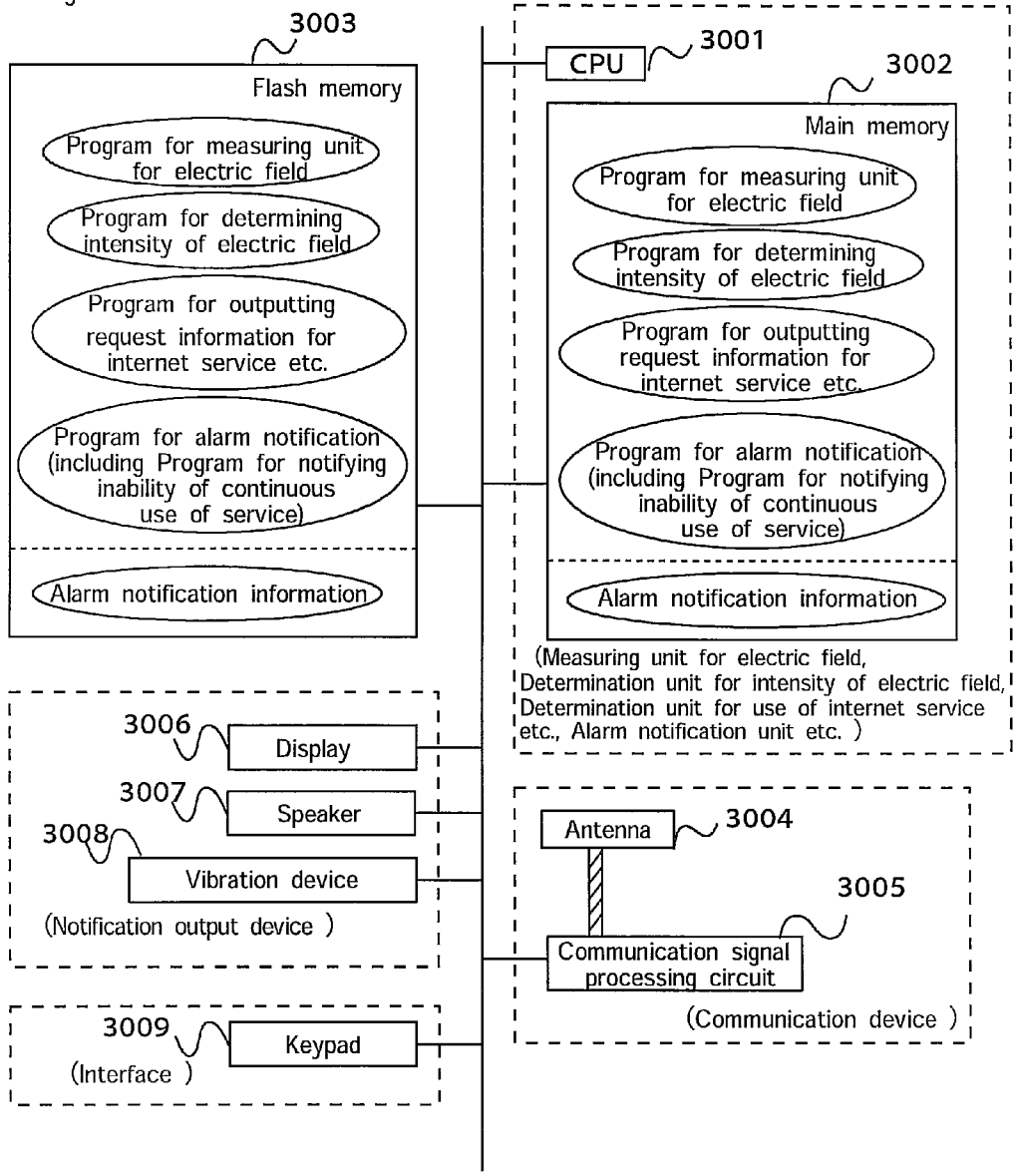
FIG. 30 is a diagram showing a table stored in the communication terminal of the eighth embodiment.

FIG. 30 is a schematic diagram showing an example of a hardware configuration of the communication terminal of the eighth embodiment. The configuration is the same as that of the apparatus of the sixth embodiment described with reference to FIG. 22. Meanwhile, the apparatus of the eighth embodiment includes a program for notifying inability of continuous use of service as the program for alarm notification. Note that, in FIG. 30, the program for communication, the program for receiving communication establishment request, the program for outputting request information for internet service etc. and the program for outputting request information for mobile telephone network connection, which have been shown in FIG. 3 of the first embodiment, are omitted.

A program for notifying inability of continuous use of service determines that the communication is carried out using the second base station based on the information from the communication signal processing circuit, and executes a processing for the alarm notification, including the notification of inability of continuous use of service, to the user when the determination result by the program for determining intensity of electric field, stored at the predetermined address in the main memory, indicates that the intensity of electric field is 'below the predetermined threshold', and when the determination result by the program for determining use of internet service etc. indicates that the 'internet service etc. is currently used'. Specifically, the alarm notification information, stored in the flash memory etc, is stored at a predetermined address in the main memory, and the alarm notification information is outputted to the notification output device such as the display, speaker, or vibration device.

<Processing Flow of Eighth Embodiment>

Figure 31:
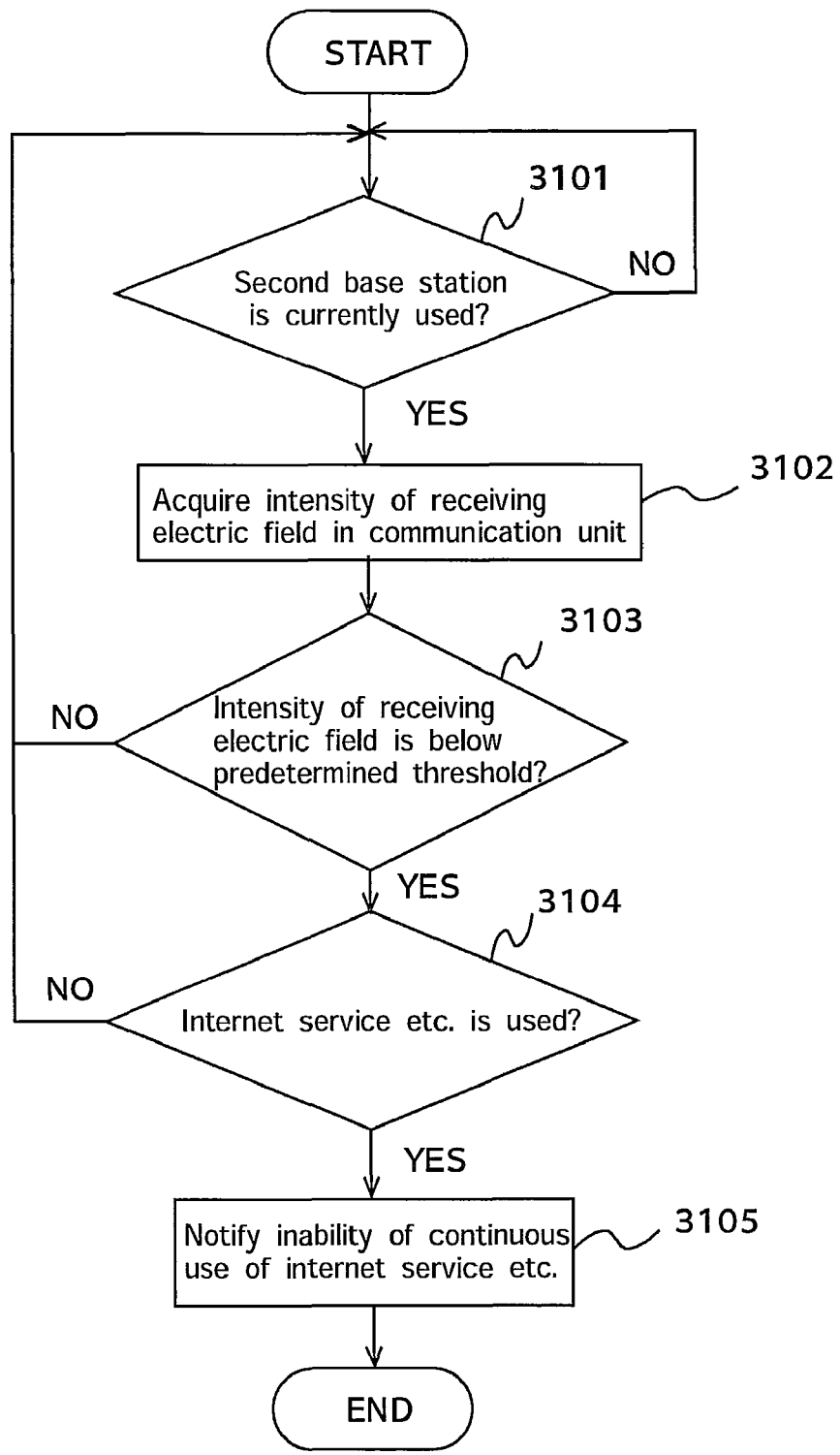
FIG. 31 is a diagram showing a hardware configuration of the communication terminal of the eighth embodiment.

FIG. 31 is a flowchart showing processes in the communication terminal of the eighth embodiment. The processes in FIG. 31 include the following steps. At the outset, in step S3101, it is determined whether the second base station is currently used. Here, if it is determined that the second base station is currently used, step S3102 is carried out. If it is determined that the second base station is not currently used, the processing stays in a standby state. In step S3102, the intensity of receiving electric field in the communication unit is acquired. This processing is mainly carried out by the measuring unit for electric field. In step S3103, it is determined whether the intensity of receiving electric field measured by the measuring unit for electric field is below a predetermined threshold. Here, if it is determined that the intensity of receiving electric field is below the predetermined threshold, step S3104 is carried out. If it is determined that the intensity of receiving electric field is not below the predetermined threshold, the process returns to step S3101. This processing is mainly carried out by the determination unit for intensity of electric field. In step S3104, it is determined whether the internet service etc. is currently used. If it is determined that the internet service etc. is currently used, step S3105 is carried out. If it is determined that the internet service etc. is not used, the process returns to step S3101. This processing is mainly carried out by the determination unit for use of internet service etc. In step S3105, a processing for alarm notification, including the notification of inability of continuous use of service, to the user is executed. This processing is mainly carried out by the alarm notification unit. Although the communication terminal of the eighth embodiment may carry out the processes shown in FIG. 4 of the first embodiment, the description thereof is omitted.

<Brief Description of Effects of Eighth Embodiment>

As described above, according to the communication terminal of the eighth embodiment, when the user uses the internet service etc. via the second base station, even if the intensity of electric field decreases, it is possible to carry out effective alarm notification, including the notification of inability of continuous use of service, so that the user can take appropriate action such as switching the communication to the communication via the first base station or staying within the area covered by the second base station.

Ninth Embodiment

Concept of Ninth Embodiment

Figure 32:
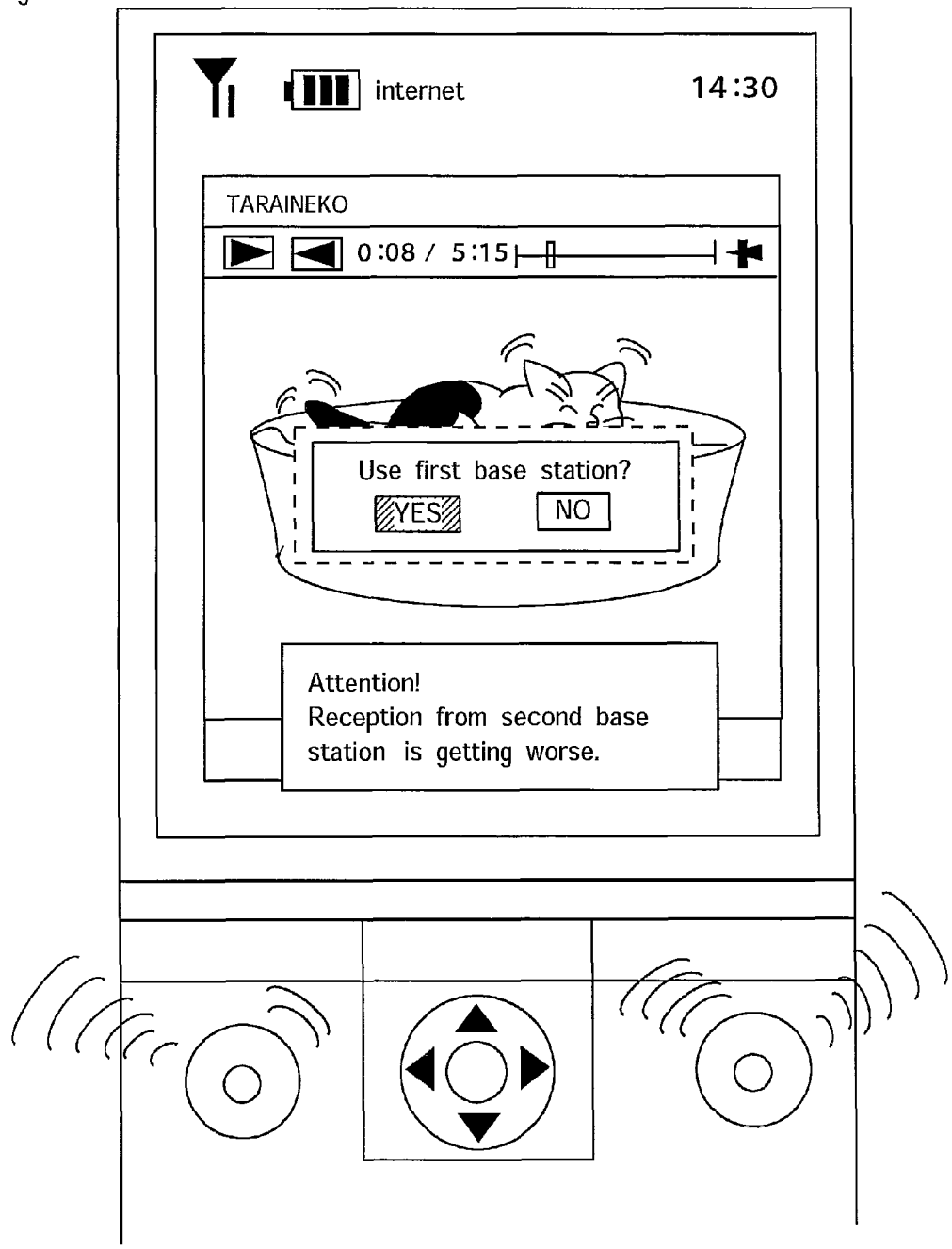
FIG. 32 is a schematic diagram of a communication terminal of a ninth embodiment.

Similar to the first embodiment, a communication terminal of a ninth embodiment has a function of transmitting request information to use the internet service etc. or the mobile telephone network upon communication via the second base station. FIG. 32 is a schematic diagram of a communication terminal of the ninth embodiment. Similar to the sixth embodiment, the communication terminal of the ninth embodiment effectively notifies that the intensity of electric field decreases by displaying that on the display, by outputting that by voice, or by using the vibration device. Moreover, the communication terminal of the ninth embodiment outputs an instruction request to request the user to provide an instruction as to reconnection via the first base station upon communication via the second base station (femtocell). For example, as shown in the diagram, it is possible to carry out displaying such that the reconnection via the first base station (macrocell etc.) is selectable. Thereby, the user can take appropriate action such as switching the communication to the communication via the first base station in an easy manner, and when not switching, can stay within the area covered by the second base station.

<Configuration of Ninth Embodiment>

Figure 33:
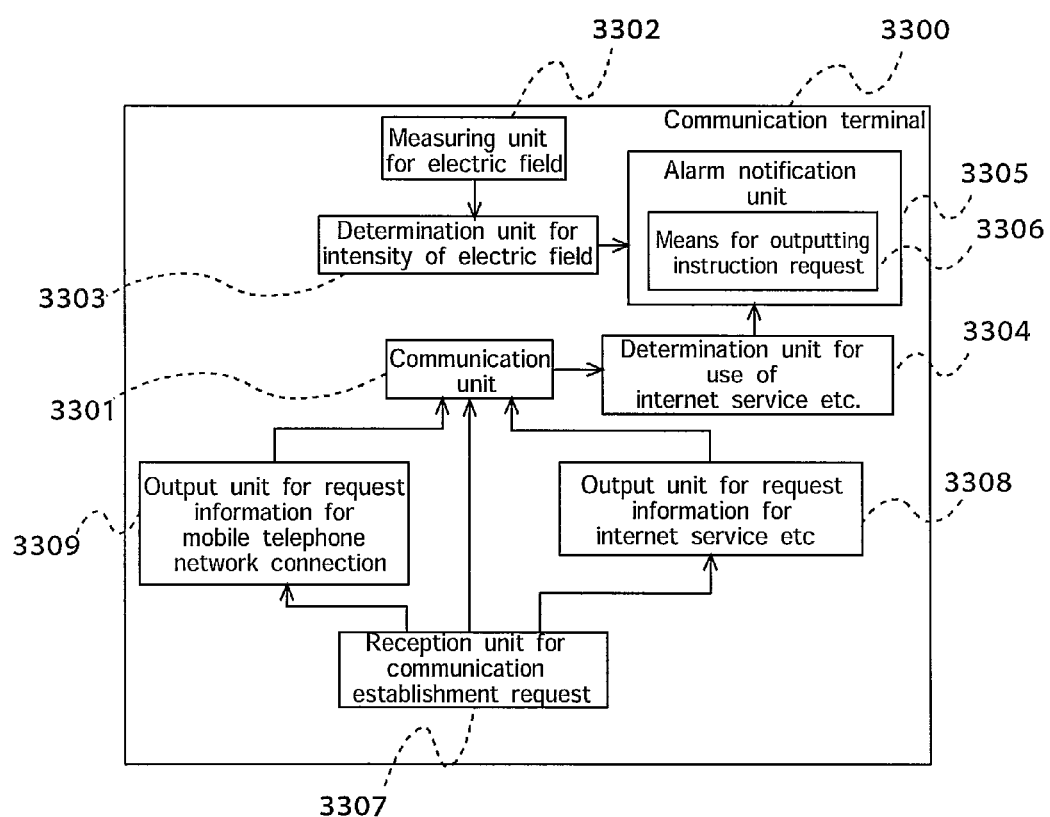
FIG. 33 is a functional block diagram of a communication terminal of the ninth embodiment.

FIG. 33 is a functional block diagram of the communication terminal of the ninth embodiment. In FIG. 33, a 'communication terminal' 3300 of the ninth embodiment comprises, a 'communication unit' 3301, a 'measuring unit for electric field' 3302, a 'determination unit for intensity of electric field' 3303, a 'determination unit for use of internet service etc' 3304, an 'alarm notification unit' 3305, a 'reception unit for communication establishment request' 3307, an 'output unit for request information for internet service etc.' 3308, and an 'output unit for request information for mobile telephone network connection' 3309. Moreover, the 'alarm notification unit' 3305 comprises "means for outputting instruction request' 3306.

The configuration is basically the same as that of the sixth embodiment, so that a description of the means for outputting instruction request as difference is provided hereinbelow.

The 'means for outputting instruction request' is configured to output an instruction request to request the user to provide an instruction as to reconnection via the first base station. According to this, when the user uses the internet service etc. via the second base station, even if the intensity of electric field decreases, it is possible not only to carry out effective alarm notification to the user, but also to output the instruction request to request the user to provide the instruction as to reconnection. Examples of the instruction request include displaying an icon on the display, outputting by voice, and using the vibration device with the other means, in addition to the text display of FIG. 32. Note that, the instruction request does not force the user to give the instruction, and when there is no response from the user to the instruction request for a predetermined amount of time, the output of the instruction request may be canceled. For example, when displaying the instruction request on the display screen, the display is deleted after the predetermined amount of time.

<Concrete Configuration of Ninth Embodiment>

Figure 34:
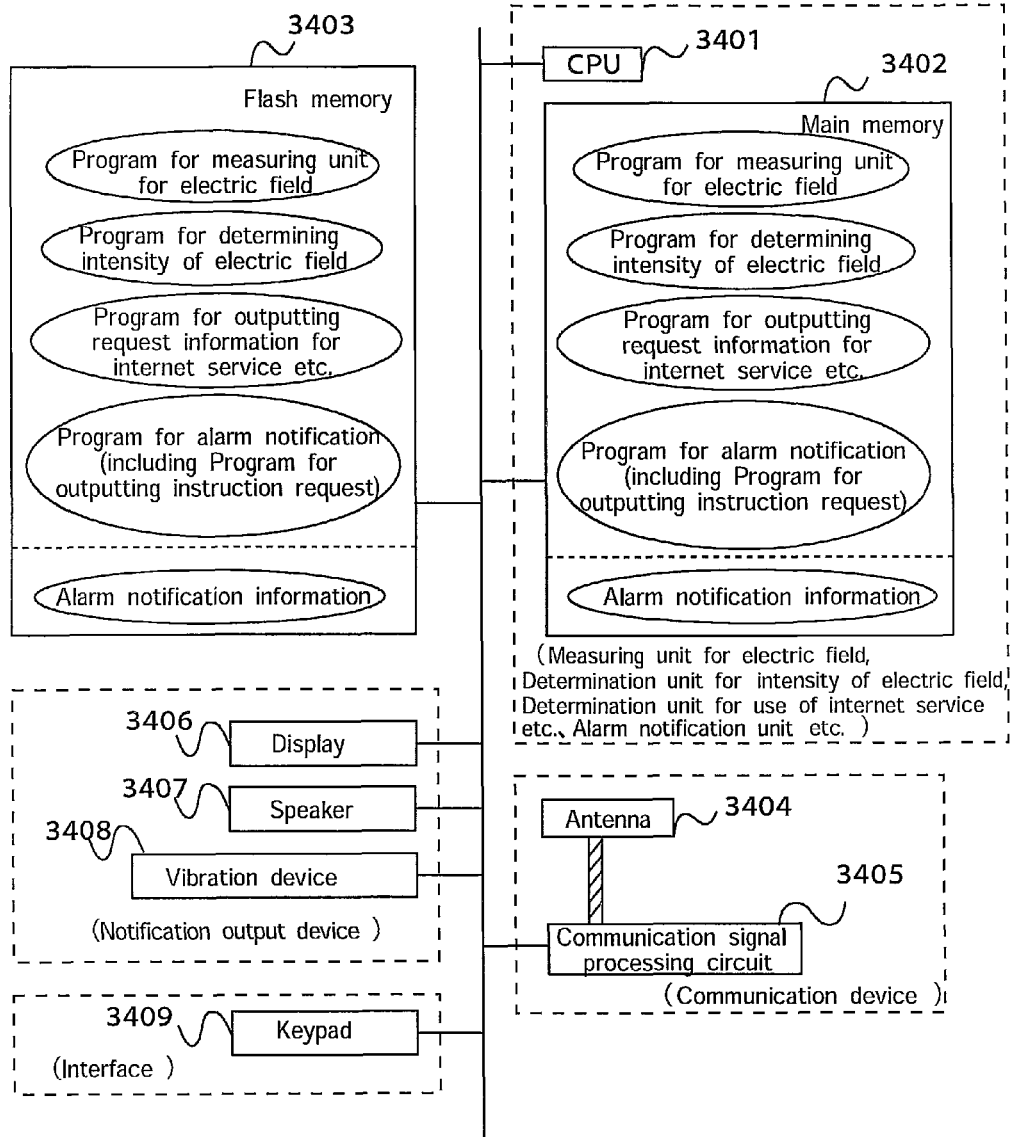
FIG. 34 is a diagram showing a table stored in the communication terminal of the ninth embodiment.

FIG. 34 is a schematic diagram showing an example of a hardware configuration of the communication terminal of the ninth embodiment. The configuration is the same as that of the apparatus of the sixth embodiment described with reference to FIG. 22. Meanwhile, the apparatus of the ninth embodiment comprises includes a program for outputting instruction request as the program for alarm notification. Note that, in FIG. 34, the program for communication, the program for receiving communication establishment request, the program for outputting request information for internet service etc. and the program for outputting request information for mobile telephone network connection, which have been shown in FIG. 3 of the first embodiment, are omitted.

A program for outputting instruction request determines that the communication is carried out using the second base station based on the information from the communication signal processing circuit, and executes a processing for the alarm notification to request the user to provide the instruction as to reconnection via the first base station to the user, when the determination result by the program for determining intensity of electric field, stored at the predetermined address in the main memory, indicates that the intensity of electric field is 'below the predetermined threshold', and when the determination result by the program for determining use of internet service etc. indicates that the 'internet service etc. is currently used'. Specifically, the alarm notification information, stored in the flash memory etc, is stored at a predetermined address in the main memory, and the alarm notification information is outputted to the notification output device such as the display, speaker, or vibration device.

<Processing Flow of Ninth Embodiment>

Figure 35:
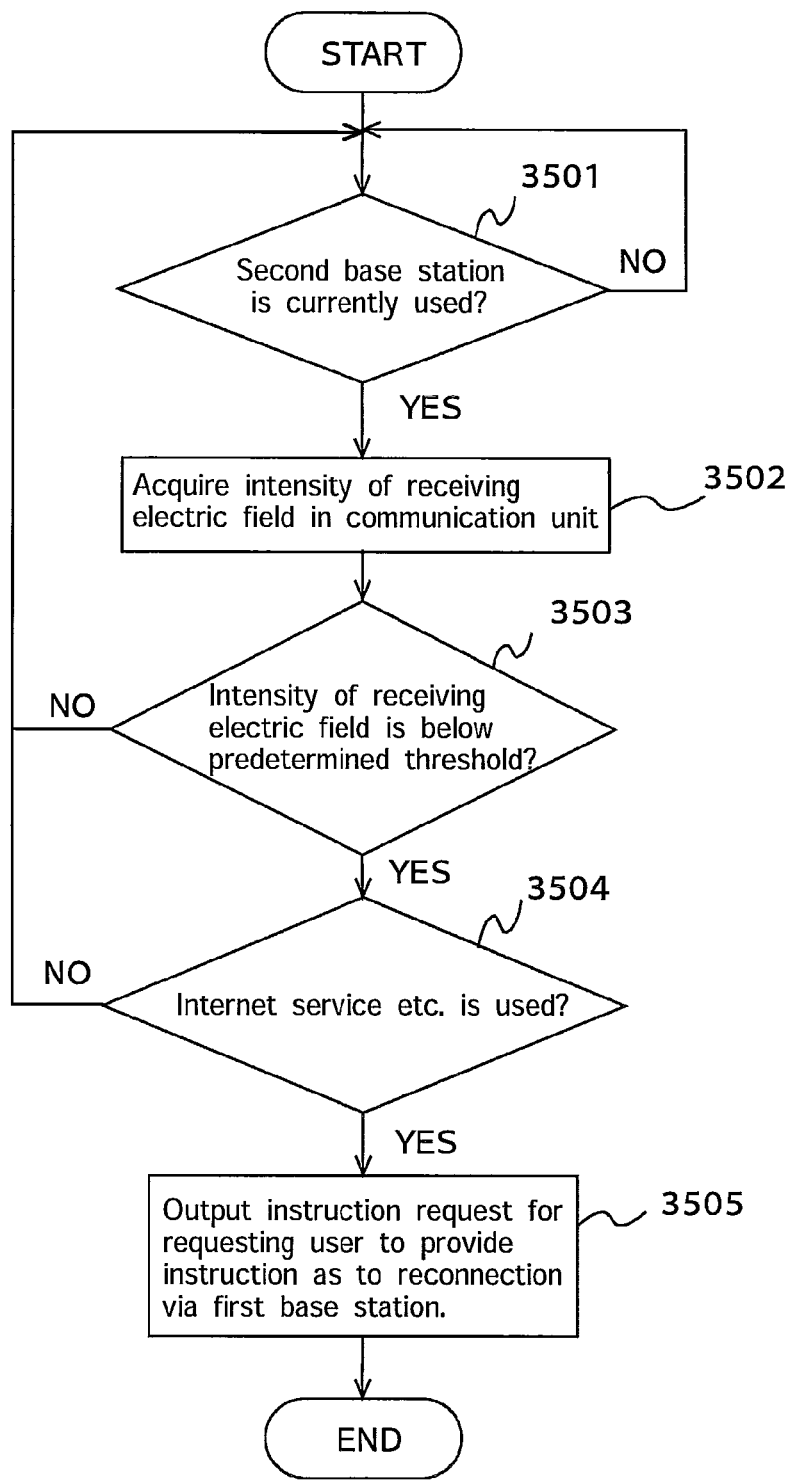
FIG. 35 is a diagram showing a hardware configuration of the communication terminal of the ninth embodiment.

FIG. 35 is a flowchart showing processes in the communication terminal of the ninth embodiment. The processes in FIG. 35 include the following steps. At the outset, in step S3501, it is determined whether the second base station is currently used. Here, if it is determined that the second base station is currently used, step S3502 is carried out. If it is determined that the second base station is not currently used, the processing stays in a standby state. In the step S3502, the intensity of receiving electric field in the communication unit is acquired. This processing is mainly carried out by the measuring unit for electric field. In step S3503, it is determined whether the intensity of receiving electric field measured by the measuring unit for electric field is below a predetermined threshold. Here, if it is determined that the intensity of receiving electric field is below the predetermined threshold, step S3504 is carried out. If it is determined that the intensity of receiving electric field is not below the predetermined threshold, the process returns to step S3501. This processing is mainly carried out by the determination unit for intensity of electric field. In step S3504, it is determined whether the internet service etc. is currently used. If it is determined that the internet service etc. is currently used, step S3505 is carried out. If it is determined that the internet service etc. is not used, the process returns to step S3501. This processing is mainly carried out by the determination unit for use of internet service etc. In step S3505, a processing for alarm notification, including the instruction as to reconnection via the first base station, to the user is executed. This processing is mainly carried out by the alarm notification unit. Although the communication terminal of the ninth embodiment may carry out the processes shown in FIG. 4 of the first embodiment, the description thereof is omitted.

<Brief Description of Effects of Ninth Embodiment>

As described above, according to the communication terminal of the ninth embodiment, when the user uses the internet service etc. via the second base station, even if the intensity of electric field decreases, it is possible to carry out effective alarm notification, including the instruction request to request the user to provide the instruction as to reconnection via the first base station, so that the user can take appropriate action such as switching the communication to the communication via the first base station or staying within the area covered by the second base station.

Tenth Embodiment

Concept of Tenth Embodiment

Similar to the first embodiment, a communication terminal of a tenth embodiment has a function of transmitting request information to use the internet service etc. or the mobile telephone network upon communication via the second base station. Moreover, similar to the ninth embodiment, the communication terminal of the tenth embodiment effectively notifies that the connection status is bad by displaying that on the display etc, and outputs an instruction request to request the user to provide an instruction as to reconnection via the first base station upon communication via the second base station. Moreover, the communication terminal of the tenth embodiment acquires a latest destination ID from the communication history, and carries out reconnection via the first base station, when the user requests the reconnection in response to the output of the instruction request. Thereby, the user can take appropriate action such as switching the communication to the communication via the first base station in an easy manner, and when not switching, can stay within the area covered by the second base station.

<Configuration of Tenth Embodiment>

Figure 36:
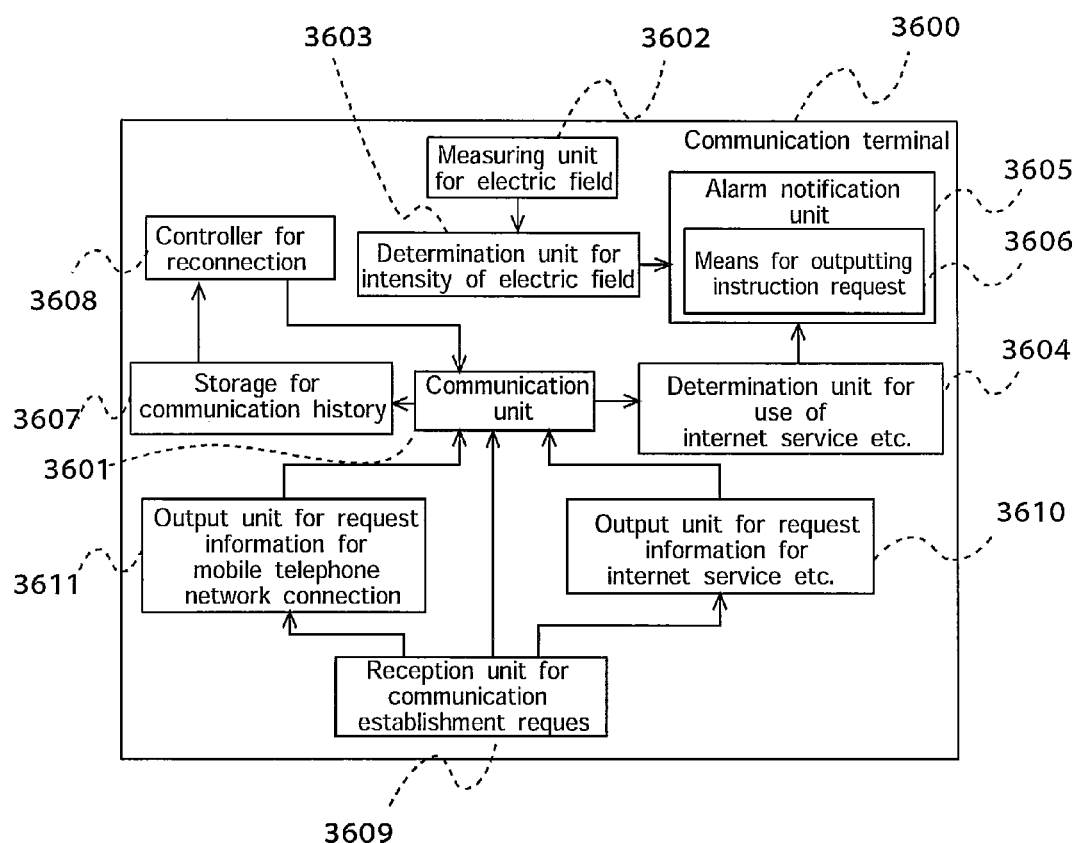
FIG. 36 is a functional block diagram of a communication terminal of a tenth embodiment.

FIG. 36 is a functional block diagram of the communication terminal of the tenth embodiment. In FIG. 36, a 'communication terminal' 3600 of the tenth embodiment comprises, a 'communication unit' 3601, a 'measuring unit for electric field' 3602, a 'determination unit for intensity of electric field' 3603, a 'determination unit for use of internet service etc' 3604, an 'alarm notification unit' 3605, a 'storage for communication history' 3607, a 'controller for reconnection' 3608, a 'reception unit for communication establishment request' 3609, an 'output unit for request information for internet service etc.' 3610, and an 'output unit for request information for mobile telephone network connection' 3611. Moreover, the 'alarm notification unit' comprises 'means for outputting instruction request' 3606. The configuration is basically the same as that of the ninth embodiment, so that descriptions of the storage for communication history and the controller for reconnection as differences are provided hereinbelow.

The 'storage for communication history' is configured to store a history of communication via the second base station. Here a predetermined part of the communication history may be stored, or the communication history with a predetermined number of times may be stored. When updating the communication history, deletion of the communication history may be carried out in the order from old to new. Moreover, the latest communication history may be stored. Furthermore, the communication history may be stored only when disconnection occurs upon communication. Examples of the communication history include destination ID, communication date, communication time, and number of communications in the past.

The 'controller for reconnection' is configured to acquire a latest destination ID from the communication history stored in the storage for communication history, and carrying out reconnection via the first base station, when the user requests the reconnection in response to the output of the instruction request by the alarm notification unit. Here, when the user requests the reconnection via the first base station, the reconnection may be executed in quick response to the instruction even in the coverage of the second base station, or the reconnection may be executed only outside the coverage of the second base station.

<Concrete Configuration of Tenth Embodiment>

Figure 37:
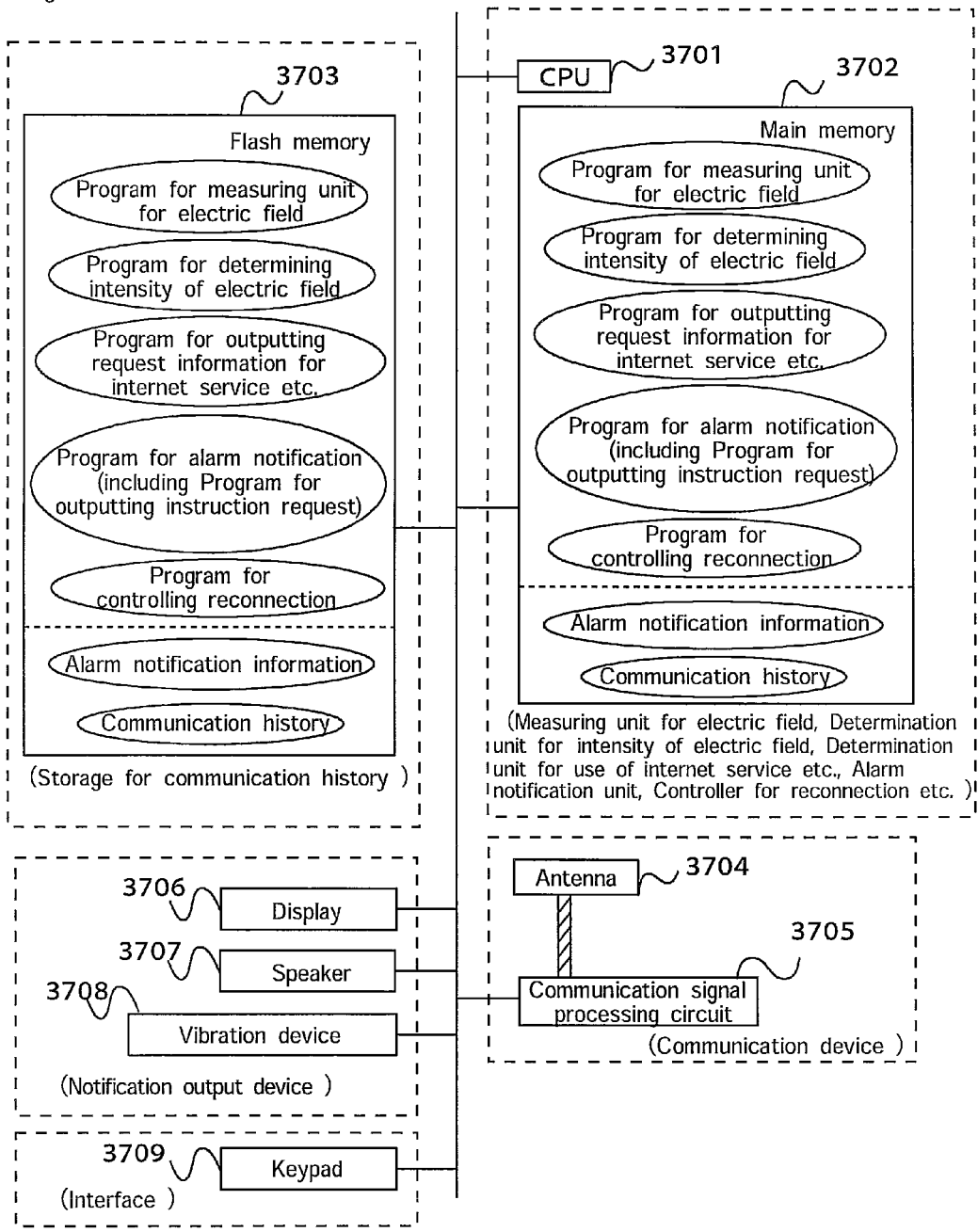
FIG. 37 is a diagram showing a table stored in the communication terminal of the tenth embodiment.

FIG. 37 is a schematic diagram showing an example of a hardware configuration of the communication terminal of the tenth embodiment. The configuration is the same as that of the apparatus of the ninth embodiment described with reference to FIG. 34. Meanwhile, the apparatus of the seventh embodiment comprises a 'flash memory' 3703 as the storage for communication history, a 'CPU' 3701 and a 'main memory' 3702 as the controller for reconnection. Note that, in FIG. 37, the program for communication, the program for receiving communication establishment request, the program for outputting request information for internet service etc. and the program for outputting request information for mobile telephone network connection, which have been shown in FIG. 3 of the first embodiment, are omitted.

When the communication is carried out using the second base station, the information of the communication history is stored in the flash memory. Hereinbelow, the case that the predetermined alarm notification information is outputted to the notification output device such as the display by the program for outputting instruction request described in the ninth embodiment, and the user requests the reconnection in response to the instruction request will be described. A program for controlling reconnection stores the communication history, stored in the flash memory, at a predetermined address in the main memory, and causes the CPU to execute a processing for acquiring the ID of the latest communication destination. The CPU executes the processing, and stores the ID of the communication destination at a predetermined address in the main memory. The program for controlling reconnection transmits the instruction signal for the communication via the first base station to the communication signal processing circuit based on the ID of the communication destination stored at the predetermined address in the main memory.

<Processing Flow of Tenth Embodiment>

Figure 38:
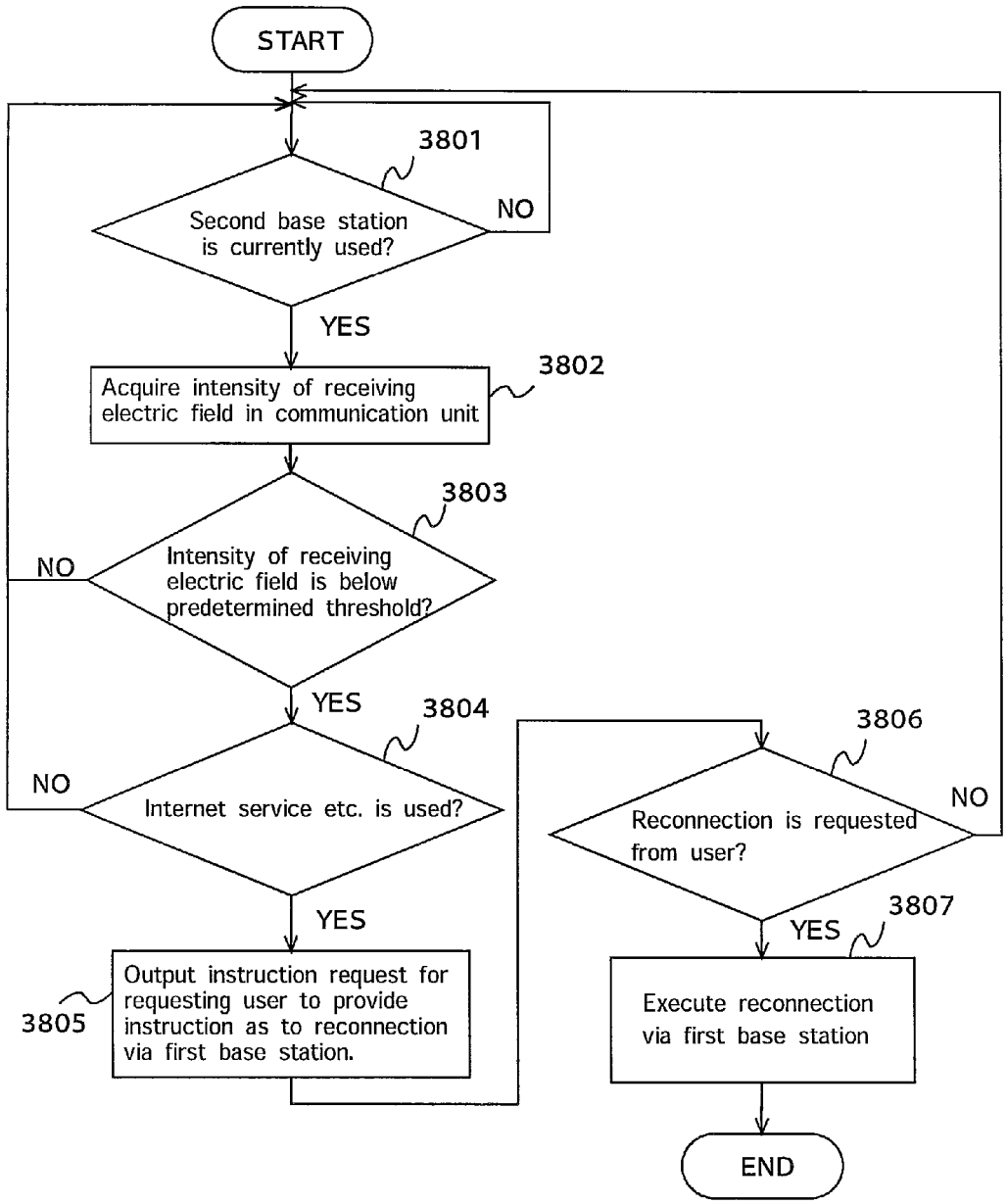
FIG. 38 is a diagram showing a hardware configuration of the communication terminal of the tenth embodiment.

FIG. 38 is a flowchart showing processes in the communication terminal of the tenth embodiment. The processes in FIG. 38 include the following steps. At the outset, in step S3801, it is determined whether the second base station is currently used. Here, if it is determined that the second base station is currently used, step S3802 is carried out. If it is determined that the second base station is not currently used, the processing stays in a standby state. In step S3802, the intensity of receiving electric field in the communication unit is acquired. This processing is mainly carried out by the measuring unit for electric field. In step S3803, it is determined whether the intensity of receiving electric field measured by the measuring unit for electric field is below a predetermined threshold. Here, if it is determined that the intensity of receiving electric field is below the predetermined threshold, step S3804 is carried out. If it is determined that the intensity of receiving electric field is not below the predetermined threshold, the process returns to step S3801. This processing is mainly carried out by the determination unit for intensity of electric field. In the step S3804, it is determined whether the internet service etc. is currently used. If it is determined that the internet service etc. is currently used, step S3805 is carried out. If it is determined that the internet service etc. is not used, the process returns to step S3801. This processing is mainly carried out by the determination unit for use of internet service etc. In step S3805, a processing for alarm notification, including the instruction as to reconnection via the first base station, to the user is executed. This processing is mainly carried out by the alarm notification unit. In step S3806, it is determined whether the instruction as to reconnection via the first base station has been provided from the user. If it is determined that the instruction as to reconnection has been provided, step S3807 is carried out. If it is determined that the instruction as to reconnection has not been provided, the process returns to step S3801. In step S3808, the communication unit executes the reconnection processing via the first base station. This processing is mainly carried out by the control unit for reconnection. Although the communication terminal of the tenth embodiment may carry out the processes shown in FIG. 4 of the first embodiment, the description thereof is omitted.

<Brief Description of Effects of Tenth Embodiment>

As described above, according to the communication terminal of the tenth embodiment, when the user uses the internet service etc. via the second base station, even if the intensity of electric field decreases, it is possible to carry out effective alarm notification, including the instruction request to request the user to provide the instruction as to reconnection via the first base station, so that the user can take appropriate action such as switching the communication to the communication via the first base station or staying within the area covered by the second base station. Moreover, it is possible to execute reconnection to the latest communication destination without excessive operational load on the user when the user requests the reconnection via the first base station.

Eleventh Embodiment

Concept of Eleventh Embodiment

Similar to the first embodiment, a communication terminal of a eleventh embodiment has a function of transmitting request information to use the internet service etc. or the mobile telephone network upon communication via the second base station. Moreover, similar to the sixth embodiment, the communication terminal of the eleventh embodiment effectively notifies that the connection status is bad by displaying that on the display etc, and outputs an instruction request to request the user to provide an instruction as to reconnection via the first base station upon communication via the second base station. Moreover, the communication terminal of the eleventh embodiment can receives scheduling of the communication service upon communication via the first base station, and can execute the scheduled communication service when the communication via the second base station becomes possible.

<Configuration of Eleventh Embodiment>

Figure 39:
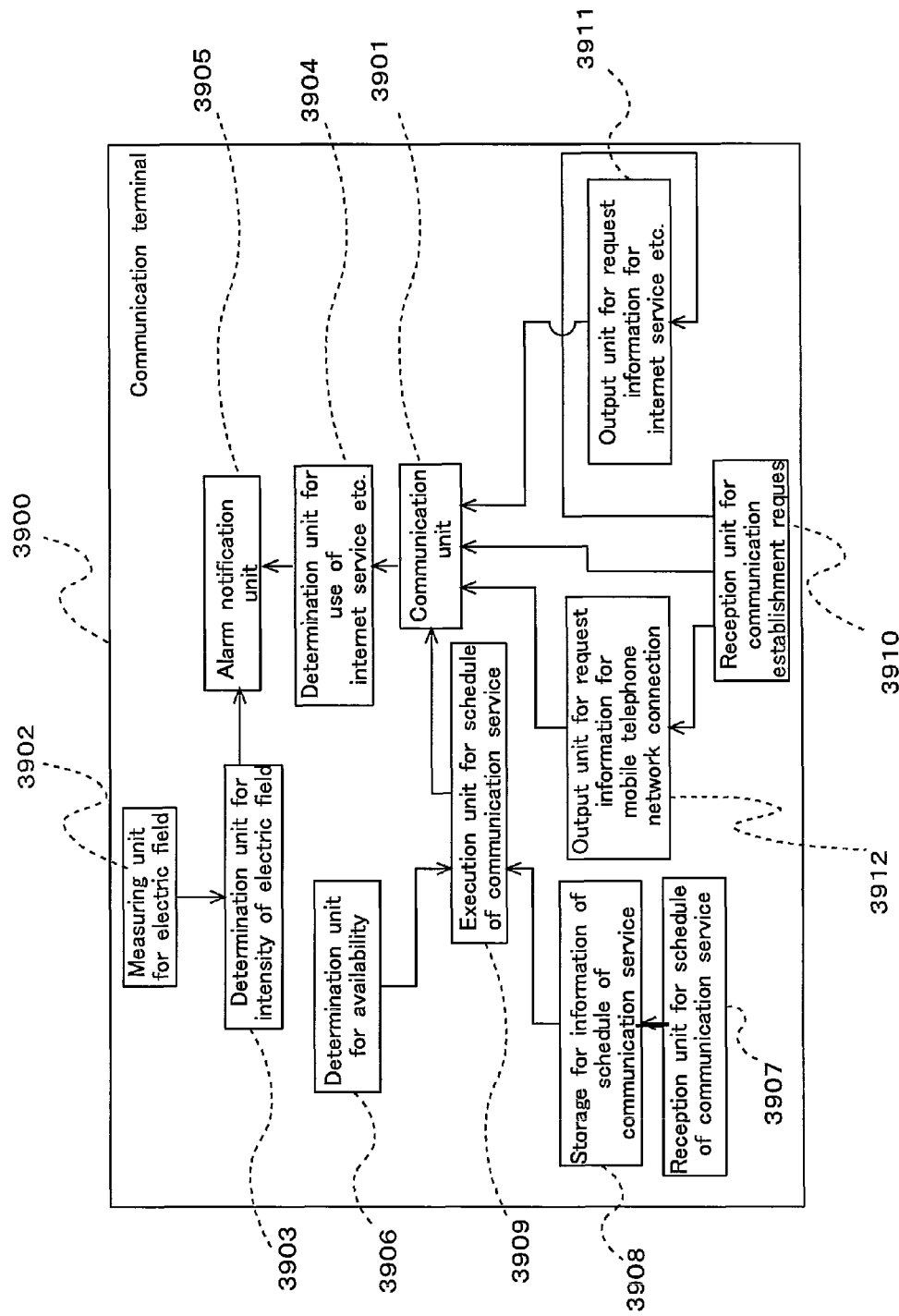
FIG. 39 is a functional block diagram of a communication terminal of an eleventh embodiment.

FIG. 39 is a functional block diagram of the communication terminal of the eleventh embodiment. In FIG. 39, a 'communication terminal' 3900 of the eleventh embodiment comprises, a 'communication unit' 3901, a 'measuring unit for electric field' 3902, a 'determination unit for intensity of electric field' 3903, a 'determination unit for use of internet service etc' 3904, an 'alarm notification unit' 3905, a 'determination unit for availability' 3906, a 'reception unit for schedule of communication service' 3907, a 'storage for information of schedule of communication service' 3908, an 'execution unit for schedule of communication service' 3909, a 'reception unit for communication establishment request' 3910, an 'output unit for request information for internet service etc.' 3911, and an 'output unit for request information for mobile telephone network connection' 3912. The configuration is basically the same as that of the sixth embodiment, so that descriptions of the determination unit for availability, the reception unit for schedule of communication service, the storage for information of schedule of communication service, and the execution unit for schedule of communication service as differences are provided hereinbelow.

The 'determination unit for availability' is configured to determine whether communication via the second base station is possible. In a concrete determination method, it is determined whether the intensity of electric field of the second base station is above a predetermined threshold. Here, the predetermined threshold may be preliminarily set, or may be set by the user.

The 'reception unit for schedule of communication service' is configured to receive a schedule of communication service upon communication via the first base station. Here, in an example of the 'schedule of communication service', a scheduling is carried out such that uploading or downloading etc. of the communication data is executed when a predetermined condition is fulfilled. For example, when the communication speed is slow due to low-intensity of electric field of the first base station, the downloading of the large volumes of data requires long time. Therefore, the scheduling may be carried out such that the communication is restarted when the communication via the second base station is possible. Moreover, it is assumed that downloading etc. of the communication data cannot be completed due to any cause upon communication via the second base station. Specifically, it is possible to request the user to do input to specify the communication information such as a destination address or a destination ID. Moreover, the input may be requested with notification of possibility of scheduling the communication service.

The 'storage for information of schedule of communication service' is configured to store information of schedule of communication service. Examples of the information of schedule of communication service include the above destination address, communication progress information indicating an amount etc. of data already uploaded or downloaded, and information of timing for establishing communication when the communication via the second base station becomes possible. The information may be deleted when the scheduled communication service is carried out.

The 'execution unit for schedule of communication service' is configured to execute the scheduled communication service using the second base station when the determination unit for availability determines that communication is possible. Here, the 'execution of the communication service' may be immediately executed when the communication via the second base station becomes possible, or may be executed at a predetermined timing set upon the scheduling of the communication. Moreover, it is possible to execute an automatically scheduled communication service, or to output a notification of request for acceptance to execute the scheduled communication service to the user before executing the service.

<Concrete Configuration of Eleventh Embodiment>

Figure 40:
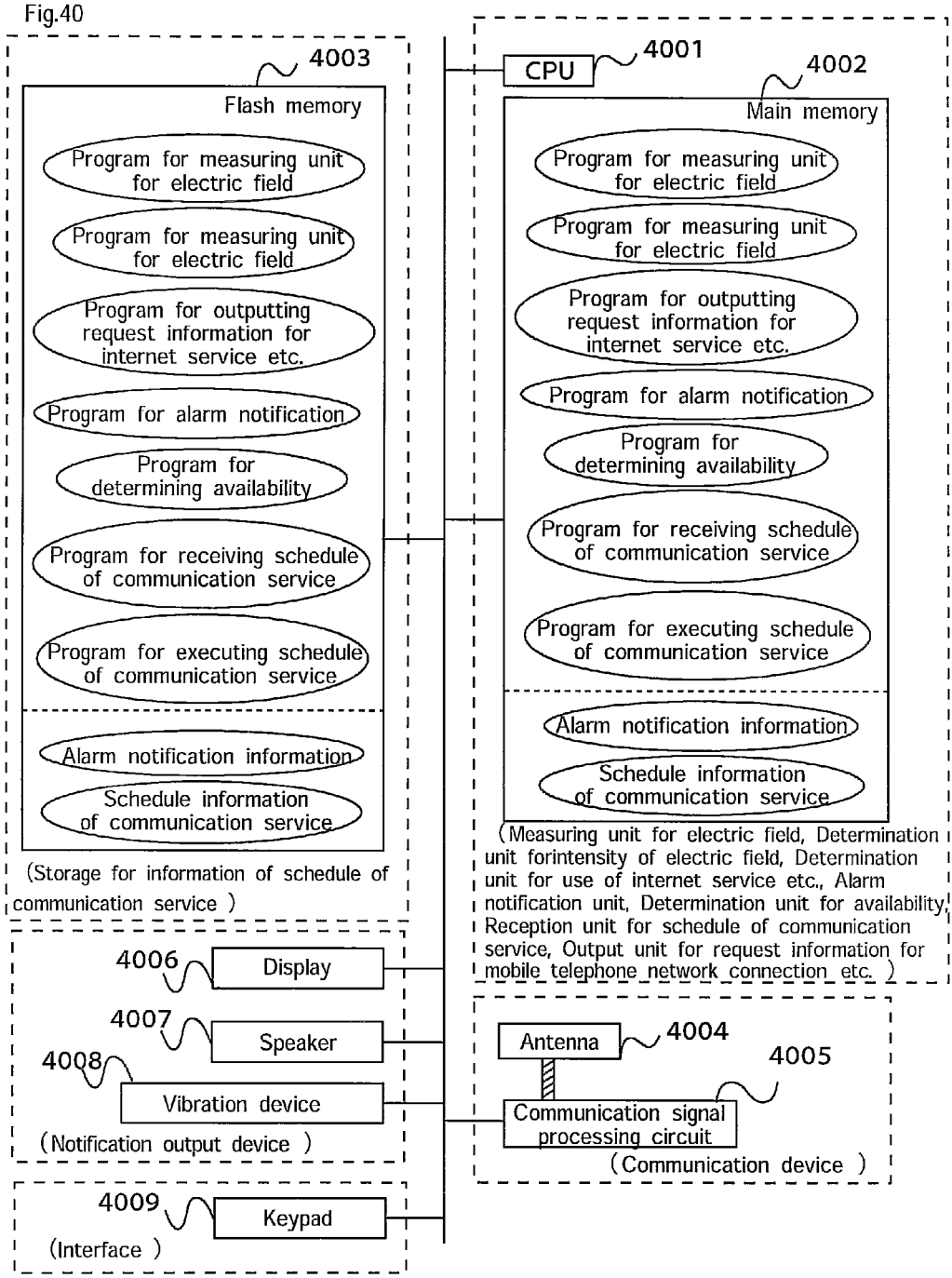
FIG. 40 is a diagram showing a table stored in the communication terminal of the eleventh embodiment.

FIG. 40 is a schematic diagram showing an example of a hardware configuration of the communication terminal of the eleventh embodiment. The configuration is the same as that of the apparatus of the sixth embodiment described with reference to FIG. 22. Meanwhile, the apparatus of the eleventh embodiment comprises a 'CPU' 4001 and a 'main memory' 4002 as the determination unit for availability, the reception unit for schedule of communication service, and the execution unit for schedule of communication service, and a 'flash memory' 4003 as the storage for information of schedule of communication service. Note that, in FIG. 40, the program for communication, the program for receiving communication establishment request, the program for outputting request information for internet service etc. and the program for outputting request information for mobile telephone network connection, which have been shown in FIG. 3 of the first embodiment, are omitted.

A program for receiving schedule of communication service carries out display upon communication via the first base station such that the schedule of communication service can be received through the display, receives input of the schedule of communication service from the user through the keypad, and stores the information of schedule of communication service at a predetermined address in the flash memory.

A program for determining availability determines whether communication via the second base station is possible. Specifically, causes the CPU to execute calculation for determining whether the intensity of electric field of the second base station is above the predetermined threshold, and stores the calculation result at a predetermined address in the main memory.

A program for executing schedule of communication service, when the program for determining availability determines that communication via the second base station is possible, stores the information of schedule of communication service, stored at the predetermined address in the flash memory, at a predetermined address in the main memory, and transmits an instruction signal to carry out the communication based on the schedule information to the communication signal processing circuit.

<Processing Flow of Eleventh Embodiment>

Figure 41:
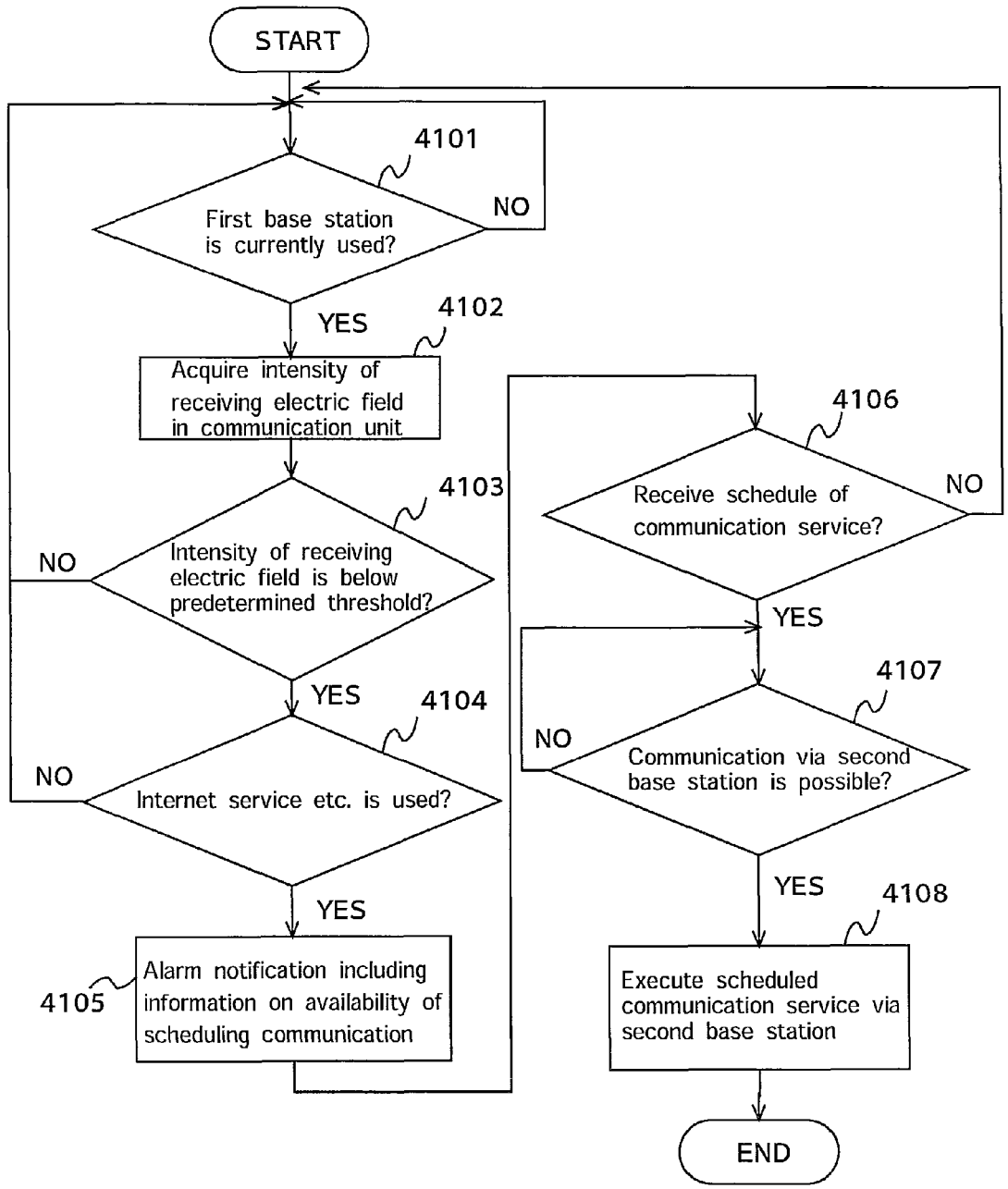
FIG. 41 is a diagram showing a hardware configuration of the communication terminal of the eleventh embodiment.

FIG. 41 is a flowchart showing processes in the communication terminal of the eleventh embodiment. The processes in FIG. 41 include the following steps. At the outset, in step S4101, it is determined whether the communication via the first base station is currently executed. Here, if it is determined that the communication via the first base station is currently executed, step S4102 is carried out. If it is determined that the communication via the first base station is not currently executed, the processing stays in a standby state. In the step S4102, the intensity of receiving electric field in the communication unit is acquired. This processing is mainly carried out by the measuring unit for electric field. In step S4103, it is determined whether the intensity of receiving electric field measured by the measuring unit for electric field is below a predetermined threshold. Here, if it is determined that the intensity of receiving electric field is below the predetermined threshold, step S4104 is carried out. If it is determined that the intensity of receiving electric field is not below the predetermined threshold, the process returns to the step S4101. This processing is mainly carried out by the determination unit for intensity of electric field. In the step S4104, it is determined whether the internet service etc. is currently used. If it is determined that the internet service etc. is currently used, step S4105 is carried out. If it is determined that the internet service etc. is not used, the process returns to the step S4101. This processing is mainly carried out by the determination unit for use of internet service etc. In step S4105, a processing for alarm notification to the user is executed. Here, the alarm notification may include the notification of possibility of scheduling the communication. This processing is mainly carried out by the alarm notification unit.

In step S4106, it is determined whether the schedule of communication service has been received. If it is determined that the schedule of communication service has been received, step S4107 is carried out. If it is determined that the schedule of communication service has not been received, the process returns to the step S4101. This processing is mainly carried out by the reception unit for schedule of communication service. In the step S4107, it is determined whether the communication via the second base station is possible. If it is determined that the communication via the second base station is possible, step S4108 is carried out. If it is determined that the communication via the second base station is not possible, the processing stays in a standby state. This processing is mainly carried out by the determination unit for availability. In the step S4108, the scheduled communication service is executed. This processing is mainly carried out by the execution unit for schedule of communication service. Although the communication terminal of the eleventh embodiment may carry out the processes shown in FIG. 4 of the first embodiment, the description thereof is omitted.

<Brief Description of Effects of Eleventh Embodiment>

As described above, according to the communication terminal of the eleventh embodiment, when the user uses the internet service etc. via the second base station, even if the intensity of electric field decreases, it is possible to carry out effective alarm notification, including the notification of possibility of scheduling the communication service, to receive scheduling of the communication service upon communication via the first base station, and to execute the scheduled communication service when the communication via the second base station becomes possible. Thereby, the user can take appropriate action.

Twelfth Embodiment

Concept of Twelfth Embodiment

Similar to the first embodiment, a communication terminal of a twelfth embodiment has a function of transmitting request information to use the internet service etc. or the mobile telephone network upon communication via the second base station. Moreover, similar to the sixth embodiment, the communication terminal of the twelfth embodiment effectively notifies that the connection status is bad by displaying that on the display etc, and outputs an instruction request to request the user to provide an instruction as to reconnection via the first base station upon communication via the second base station. Moreover, the communication terminal of the twelfth embodiment comprises a measuring unit for error rate, measuring an error rate in the communication unit, in replace of the measuring unit for electric field, and a determination unit for error rate, determining whether the measurement result measured by the measuring unit for error rate is above a predetermined threshold, in replace of the determination unit for intensity of electric field.

<Configuration of Twelfth Embodiment>

Figure 42:
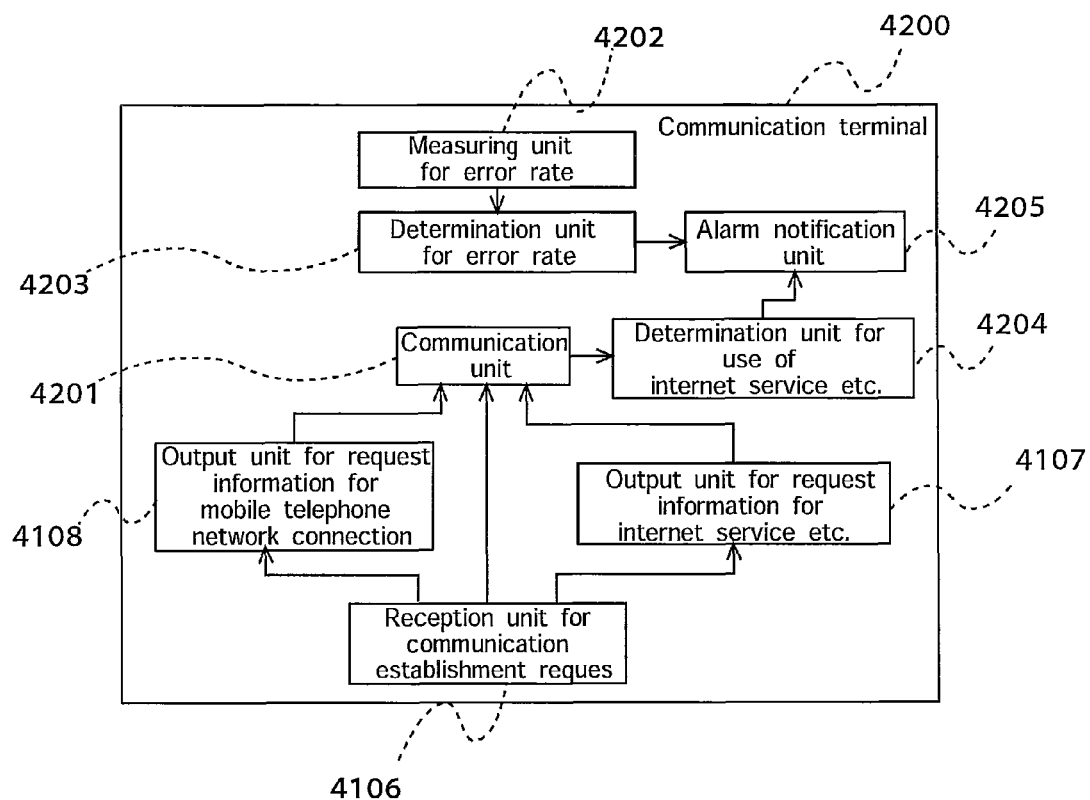
FIG. 42 is a functional block diagram of a communication terminal of a twelfth embodiment.

FIG. 42 is a functional block diagram of the communication terminal of the twelfth embodiment. In FIG. 42, a 'communication terminal' 4200 of the twelfth embodiment comprises, a 'communication unit' 4201, a 'measuring unit for error rate' 4202, a 'determination unit for error rate' 4203, a 'determination unit for use of internet service etc' 4204, an 'alarm notification unit' 4205, a 'reception unit for communication establishment request' 4206, an 'output unit for request information for internet service etc.' 4207, and an 'output unit for request information for mobile telephone network connection' 4208. The configuration is basically the same as that of the sixth embodiment, so that descriptions of the measuring unit for error rate and the determination unit for error rate as differences are provided hereinbelow.

The 'measuring unit for error rate' is configured to measure an error rate in the communication unit. Here, the 'error rate' means percentage of error bit included in the reception data, which differs from that of the transmission data.

The 'determination unit for error rate' is configured to determine whether the measurement result measured by the measuring unit for error rate is above a predetermined threshold. Therefore, based on the result indicating whether the error rate is above the predetermined threshold, it is determined whether communication failure currently occurs. Thereby it is possible to determine the communication status without measuring the intensity of receiving electric field.

Here, the predetermined threshold may be preliminarily set, or may be appropriately varied. For example, the user, who desires only that the communication continues without disconnection, sets a high threshold, and the user, who desires that the quality of the communication never deteriorates, sets a low threshold.

Note that it is possible to determine the communication status only by the level of the error rate, or to determine the communication status by measuring with the intensity of electric field.

<Concrete Configuration of Twelfth Embodiment>

Figure 43:
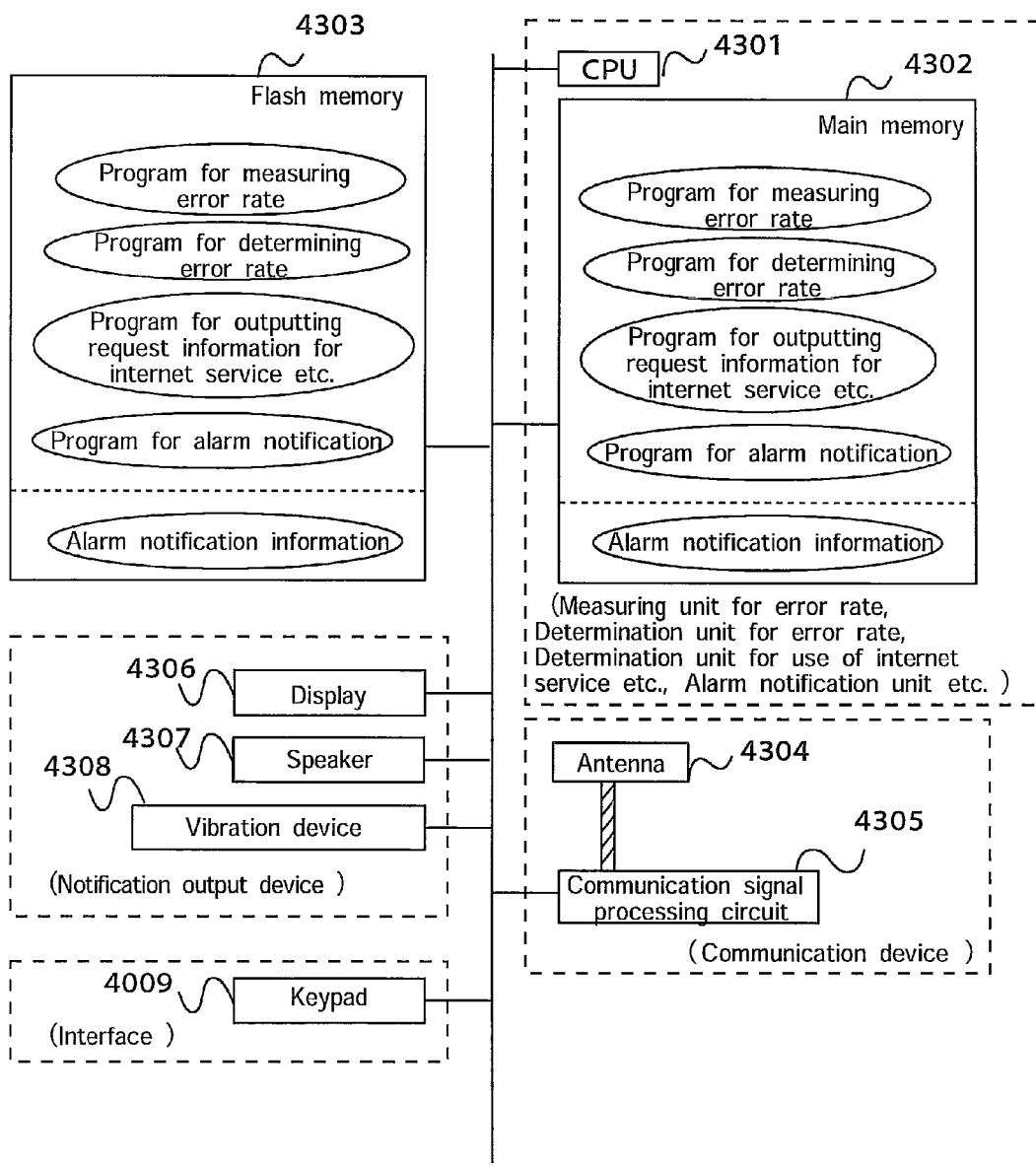
FIG. 43 is a diagram showing a table stored in the communication terminal of the twelfth embodiment.

FIG. 43 is a schematic diagram showing an example of a hardware configuration of the communication terminal of the twelfth embodiment. The configuration is the same as that of the apparatus of the sixth embodiment described with reference to FIG. 22. Meanwhile, the apparatus of the twelfth embodiment comprises a 'CPU' 4301 and a 'main memory' 4302 as the measuring unit for error rate in replace of the measuring unit for electric field and the determination unit for error rate in replace of the determination unit for intensity of electric field. Note that, in FIG. 43, the program for communication, the program for receiving communication establishment request, the program for outputting request information for internet service etc. and the program for outputting request information for mobile telephone network connection, which have been shown in FIG. 3 of the first embodiment, are omitted.

When the communication signal is received through the antenna, the signal is converted by the communication signal processing circuit such that the communication terminal can process the signal. A program for measuring error rate stores the communication data from the communication signal processing circuit at a predetermined address in the main memory, and causes the CPU to execute calculation for measuring the error rate in the communication unit. The CPU executes the calculation for determining, and stores the calculation result at a predetermined address in the main memory. A program for determining error rate causes the CPU to execute calculation for determining whether the error rate in the communication unit, stored at the predetermined address in the main memory, is above the predetermined threshold. The CPU executes the calculation for determining, and stores the calculation result at a predetermined address in the main memory.

<Processing Flow of Twelfth Embodiment>

Figure 44:
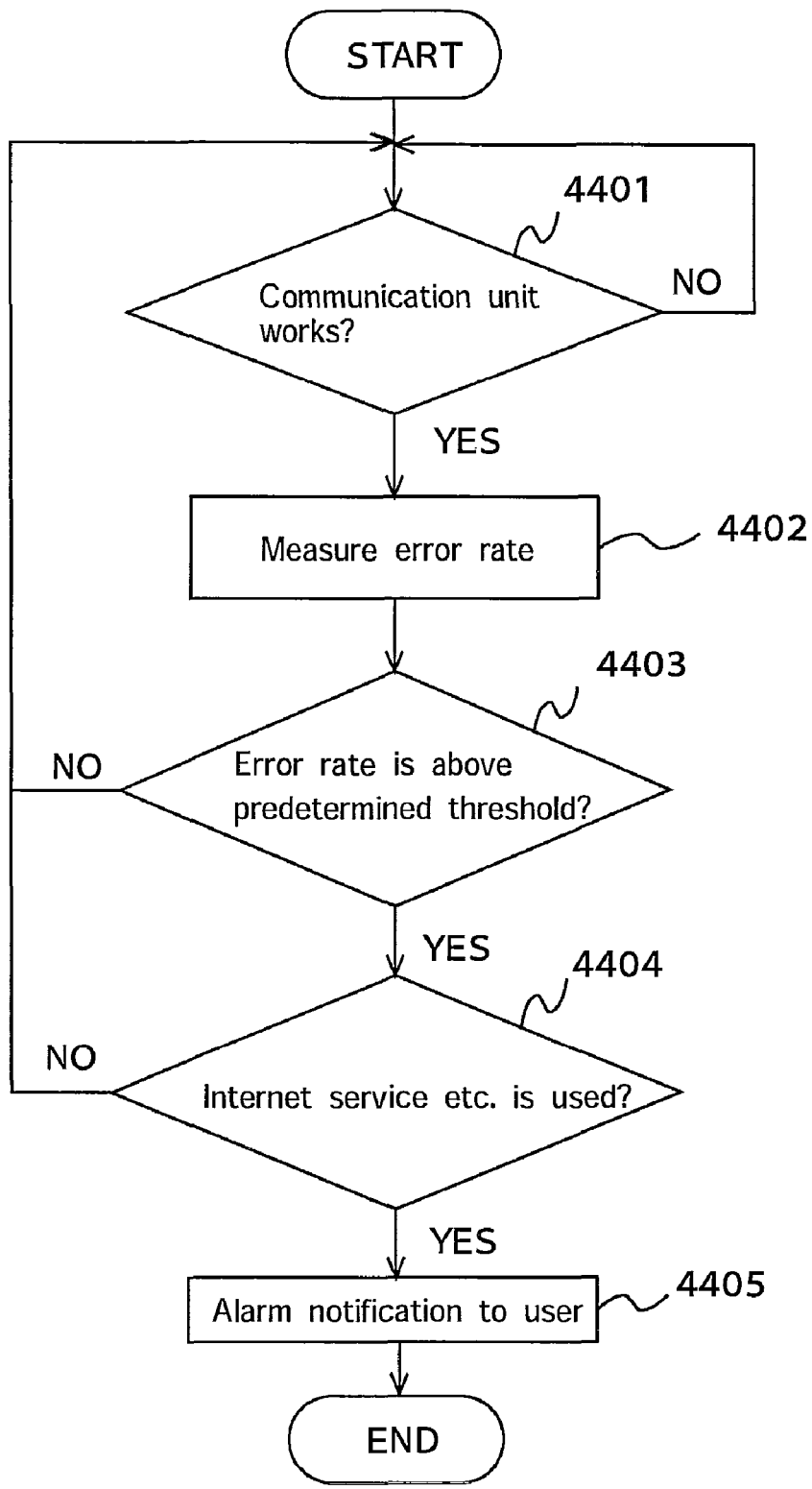
FIG. 44 is a diagram showing a hardware configuration of the communication terminal of the twelfth embodiment.

FIG. 44 is a flowchart showing processes in the communication terminal of the twelfth embodiment. The processes in FIG. 44 include the following steps. At the outset, in step S4401, it is determined whether the communication unit works. Here, if it is determined that the communication unit works, step S4402 is carried out. If it is determined that the communication unit does not work, the processing stays in a standby state. In step S4402, the error rate in the communication unit is acquired. This processing is mainly carried out by the measuring unit for error rate. In step S4403, it is determined whether the error rate is above a predetermined threshold. Here, if it is determined that the error rate is above the predetermined threshold, step S4404 is carried out. If it is determined that the error rate is not above the predetermined threshold, the process returns to step S4401. This processing is mainly carried out by the determination unit for error rate. In the step S4404, it is determined whether the internet service etc. is currently used. If it is determined that the internet service etc. is currently used, step S4405 is carried out. If it is determined that the internet service etc. is not used, the process returns to step S4401. This processing is mainly carried out by the determination unit for use of internet service etc. In step S4405, a processing for alarm notification to the user is executed. This processing is mainly carried out by the alarm notification unit. Although the communication terminal of the sixth embodiment may carry out the processes shown in FIG. 4 of the first embodiment, the description thereof is omitted.

<Brief Description of Effects of Twelfth Embodiment>

As described above, according to the communication terminal of the twelfth embodiment, when the user uses the internet service etc. via the second base station, even if the error rate increases, it is possible to carry out effective alarm notification, so that the user can take appropriate action such as switching the communication to the communication via the first base station, or staying within the area covered by the second base station.

What is claimed is:

1. A communication terminal, comprising:
   a communication unit, communicating with a first base station configuring a mobile telephone network, and communicating with a second base station connectable to the mobile telephone network;
   a reception unit for communication establishment request, receiving communication establishment information;
   an output unit for request information for internet service, outputting request information for internet service, the request information is to use the internet service as a communication path via the second base station; and
   an output unit for request information for mobile telephone network connection, outputting request information for mobile telephone network connection, the request information is to use the mobile telephone network connection as a communication path via the second base station.

2. The communication terminal according to claim 1, further comprising:
   a determination unit for availability of second base station, determining whether the second base station is available; and
   a default control unit, carrying out control such that the request information for mobile telephone network connection is outputted by default upon communication via the second base station when a determination result by the determination unit for availability of second base station indicates that the second base station is available.

3. The communication terminal according to claim 2, further comprising:
   a storage for table, storing a table for determination as to which is currently used, the internet service or the mobile telephone network connection, depending on a destination address; and
   a control unit for destination address, carrying out control as to which of the request information is outputted, the request information for internet service or the request information for mobile telephone network connection, based on the destination address and on the table stored in the storage for table upon the communication via the second base station.

4. The communication terminal according to claim 2, further comprising:
   a storage for usage history of communication path, storing a history, in which the destination address via the second base station and information indicating the use of the internet service or the mobile telephone network connection are correlated;
   a determination unit for majority, determining whether the communication path used in the communication via the second base station is major in the history; and a notification unit for non-majority notification, outputs a non-majority notification to a user when the determination result by the determination unit for majority indicates that the path is not major.

5. The communication terminal according to claim 2, further comprising:
a storage for usage history of communication path, storing a history, in which the destination address via the second base station and information indicating the use of the internet service or the mobile telephone network connection are correlated; and
a control unit for use of latest communication path, acquiring a latest communication path relating to the destination address, and carrying out control as to which is outputted, the request information for internet service or the request information for mobile telephone network connection, using the latest communication path.

6. The communication terminal according to claim 2, further comprising:
a measuring unit for electric field, measuring intensity of a receiving electric field;
a determination unit for intensity of electric field, determining whether the intensity of receiving electric field measured by the measuring unit for electric field is below a predetermined threshold;
a determination unit for use of internet service, determining whether the internet service is currently used; and
a alarm notification unit, outputs an alarm notification to the user when the determination unit for intensity of electric field determines that the intensity of receiving electric field measured by the measuring unit for electric field is below the predetermined threshold, and when determination unit for use of internet service determines that the internet service is currently used.

7. The communication terminal according to claim 1, further comprising:
a storage for table, storing a table for determination as to which is currently used, the internet service or the mobile telephone network connection, depending on a destination address; and
a control unit for destination address, carrying out control as to which of the request information is outputted, the request information for internet service or the request information for mobile telephone network connection, based on the destination address and on the table stored in the storage for table upon the communication via the second base station.

8. The communication terminal according to claim 1, further comprising:
a storage for usage history of communication path, storing a history, in which the destination address via the second base station and information indicating the use of the internet service or the mobile telephone network connection are correlated;
a determination unit for majority, determining whether the communication path used in the communication via the second base station is major in the history; and
a notification unit for non-majority notification, outputs a non-majority notification to a user when the determination result by the determination unit for majority indicates that the path is not major.

9. The communication terminal according to claim 1, further comprising:
a storage for usage history of communication path, storing a history, in which the destination address via the second base station and information indicating the use of the internet service or the mobile telephone network connection are correlated; and
a control unit for use of latest communication path, acquiring a latest communication path relating to the destination address, and carrying out control as to which is outputted, the request information for internet service or the request information for mobile telephone network connection, using the latest communication path.

10. The communication terminal according to claim 1, further comprising:
a measuring unit for electric field, measuring intensity of a receiving electric field;
a determination unit for intensity of electric field, determining whether the intensity of receiving electric field measured by the measuring unit for electric field is below a predetermined threshold;
a determination unit for use of internet service, determining whether the internet service is currently used; and
a alarm notification unit, outputs an alarm notification to the user when the determination unit for intensity of electric field determines that the intensity of receiving electric field measured by the measuring unit for electric field is below the predetermined threshold, and when determination unit for use of internet service determines that the internet service is currently used.

11. The communication terminal according to claim 10, further comprising:
a display unit for currently used base station, displaying which of the base station is currently used, the first station or the second station.

12. The communication terminal according to claim 11, wherein the alarm notification unit comprises
means for notifying inability of continuous use of service, notifying that the internet service cannot be continuously used upon communication via the second base station.

13. The communication terminal according to claim 10, wherein the alarm notification unit comprises
means for notifying inability of continuous use of service, notifying that the internet service cannot be continuously used upon communication via the second base station.

14. The communication terminal according to claim 10, wherein the alarm notification unit comprises
means for outputting instruction request, outputting an instruction request to request the user to provide an instruction as to reconnection via the first base station.

15. The communication terminal according to claim 14, further comprising:
a storage for communication history, storing a history of communication via the second base station, and
a controller for reconnection, acquiring a latest destination ID from the communication history stored in the storage for communication history, and carrying out reconnection via the first base station, when the user requests the reconnection in response to the output of the instruction request by the alarm notification unit.

16. The communication terminal according to claim 10, further comprising:
a determination unit for availability, determining whether communication via the second base station is possible;
a reception unit for schedule of communication service, receiving a schedule of communication service upon communication via the first base station;
a storage for information of schedule of communication service, storing information of schedule of communication service; and an execution unit for schedule of communication service, executing the scheduled communication service using the second base station when the determination unit for availability determines that communication is possible.

17. The communication terminal according to claim 10, further comprising:
a measuring unit for error rate, measuring an error rate in the communication unit, in replace of the measuring unit for electric field; and
a determination unit for error rate, determining whether the measurement result measured by the measuring unit for error rate is above a predetermined threshold, in replace of the determination unit for intensity of electric field.

18. The communication terminal according to claim 1, wherein the first base station is a base station configuring macrocell, and the second base station is a base station configuring a femtocell.

19. The communication terminal according to claim 1, wherein the output unit transmits, to the second base station, the request information to connect to a communication destination using the internet service.

20. The communication terminal according to claim 1, wherein the output unit transmits, to the second base station, the request information to connect to a communication destination using the mobile telephone network.

21. A method for communication, comprising the steps of:
communicating with a first base station configuring a mobile telephone network, and communicating with a second base station connectable to the mobile telephone network;
receiving communication establishment information;
outputting request information for internet service, the request information is to use the internet service as a communication path via the second base station; and
outputting request information for mobile telephone network connection, the request information is to use the mobile telephone network connection as a communication path via the second base station.

22. The method for communication according to claim 21, comprising the steps of:
measuring intensity of a receiving electric field;
determining whether the measured intensity of receiving electric field is below a predetermined threshold;
determining whether the internet service is currently used; and
outputting an alarm notification to the user when the determination result indicates that the intensity of receiving electric field is below the predetermined threshold, and when the determination result indicates that the internet service is used.

23. The method for communication according to claim 21, further comprising: transmitting, to the second base station, the request information to connect to a communication destination using the internet service.

24. The communication terminal according to claim 21, further comprising: transmitting, to the second base station, the request information to connect to a communication destination using the mobile telephone network.

\* \* \* \* \*